United States Patent
Luce et al.

(10) Patent No.: US 11,558,191 B2
(45) Date of Patent: Jan. 17, 2023

(54) KEY PAIR PLATFORM AND SYSTEM TO MANAGE FEDERATED TRUST NETWORKS IN DISTRIBUTED ADVERTISING

(71) Applicant: Commerce Signals, Inc., Jersey City, NJ (US)

(72) Inventors: Marc Luce, Denver, NC (US); Rodney C. Cook, Edmonds, WA (US); Thomas Noyes, Davidson, NC (US)

(73) Assignee: COMMERCE SIGNALS, INC., Jersey City, NJ (US)

( * ) Notice: Subject to any disclaimer, the term of this patent is extended or adjusted under 35 U.S.C. 154(b) by 106 days.

(21) Appl. No.: 17/012,672

(22) Filed: Sep. 4, 2020

(65) Prior Publication Data

US 2021/0126784 A1 Apr. 29, 2021

Related U.S. Application Data

(63) Continuation of application No. 15/477,473, filed on Apr. 3, 2017, now Pat. No. 10,771,247, which is a (Continued)

(51) Int. Cl.
*G06F 21/62* (2013.01)
*H04L 9/14* (2006.01)
(Continued)

(52) U.S. Cl.
CPC .............. *H04L 9/14* (2013.01); *G06F 16/254* (2019.01); *G06F 21/6254* (2013.01);
(Continued)

(58) Field of Classification Search
CPC .................... G06F 21/6254; G06F 21/6263
See application file for complete search history.

(56) References Cited

U.S. PATENT DOCUMENTS

| | | |
|---|---|---|
| 5,077,665 A | 12/1991 | Silverman et al. |
| 6,216,129 B1 | 4/2001 | Eldering |

(Continued)

FOREIGN PATENT DOCUMENTS

| | | |
|---|---|---|
| EP | 2063387 A1 | 5/2009 |
| JP | 2002049844 A | 2/2002 |
| WO | 2008051807 A1 | 5/2008 |

OTHER PUBLICATIONS

Bui et al., A Multi-Attribute Negotiation Support System with Market Signaling for Electronic Markets, http://fulltext.calis.edu.cn/kluwer/pdf/09262644/10/383020.pdf (Year: 2001).

(Continued)

*Primary Examiner* — Nelson S. Giddins
(74) *Attorney, Agent, or Firm* — Neo IP

(57) ABSTRACT

Systems and methods are provided for object identifier translation using a key pairs platform in a virtualized or cloud-based computing system. A key pair refers to a pair of identifiers held by an entity. Each key pair includes at least one anonymized object identifier. Advantageously, the key pair system protects privacy and provides anonymity for objects by not disclosing the identity of the objects or the underlying data associated with the objects.

10 Claims, 22 Drawing Sheets

Related U.S. Application Data continuation-in-part of application No. 14/677,315, filed on Apr. 2, 2015, now abandoned, which is a continuation-in-part of application No. 14/633,770, filed on Feb. 27, 2015, now abandoned, which is a continuation-in-part of application No. 14/214,253, filed on Mar. 14, 2014, now Pat. No. 10,713,669, said application No. 14/677,315 is a continuation-in-part of application No. 14/214,223, filed on Mar. 14, 2014, now Pat. No. 10,157,390, said application No. 14/633,770 is a continuation-in-part of application No. 14/214,232, filed on Mar. 14, 2014, now Pat. No. 10,275,785.

(60) Provisional application No. 61/791,297, filed on Mar. 15, 2013.

(51) Int. Cl.
   *G06Q 30/02* (2012.01)
   *G06F 16/25* (2019.01)
   *G06Q 30/08* (2012.01)
   *G06Q 30/06* (2012.01)

(52) U.S. Cl.
   CPC ..... *G06F 21/6263* (2013.01); *G06Q 30/0201* (2013.01); *G06Q 30/0202* (2013.01); *G06Q 30/0206* (2013.01); *G06Q 30/0244* (2013.01); *G06Q 30/0277* (2013.01); *G06Q 30/0611* (2013.01); *G06Q 30/08* (2013.01)

(56) References Cited

U.S. PATENT DOCUMENTS

| | | |
|---|---|---|
| 6,275,824 B1 | 8/2001 | O'Flaherty et al. |
| 6,324,519 B1 | 11/2001 | Eldering |
| 6,363,488 B1 | 3/2002 | Ginter et al. |
| 6,381,602 B1 | 4/2002 | Shoroff et al. |
| 6,850,900 B1 | 2/2005 | Hare et al. |
| 7,233,948 B1 | 6/2007 | Shamoon et al. |
| 7,415,432 B1 | 8/2008 | Gianakouros et al. |
| 7,542,951 B1 | 6/2009 | Chakrabarti et al. |
| 7,630,986 B1 | 12/2009 | Herz et al. |
| 8,224,725 B2 | 7/2012 | Grim et al. |
| 8,229,902 B2 | 7/2012 | Vishniac et al. |
| 8,285,610 B2 | 10/2012 | Engle et al. |
| 8,355,955 B1 | 1/2013 | Mirchandani et al. |
| 8,380,738 B2 | 2/2013 | Tatemura et al. |
| 8,671,353 B1 | 3/2014 | Varadarajan |
| 8,812,355 B2 | 8/2014 | Angell et al. |
| 8,914,903 B1 | 12/2014 | Lee et al. |
| 9,286,391 B1 | 3/2016 | Dykstra et al. |
| 9,749,780 B2 | 8/2017 | Huang et al. |
| 9,799,042 B2 | 10/2017 | Noyes |
| 2001/0004733 A1 | 6/2001 | Eldering |
| 2003/0115129 A1 | 6/2003 | Feaver et al. |
| 2003/0144924 A1 | 7/2003 | McGee |
| 2004/0148290 A1 | 7/2004 | Merenda et al. |
| 2004/0267630 A1 | 12/2004 | Au et al. |
| 2005/0004789 A1 | 1/2005 | Summers |
| 2005/0044423 A1 | 2/2005 | Mellmer et al. |
| 2005/0177742 A1 | 8/2005 | Benson et al. |
| 2006/0136402 A1 | 6/2006 | Lee |
| 2006/0167779 A1 | 7/2006 | Turner |
| 2006/0168059 A1 | 7/2006 | Chang et al. |
| 2006/0200556 A1 | 9/2006 | Brave et al. |
| 2006/0230053 A1 | 10/2006 | Eldering |
| 2007/0011050 A1 | 1/2007 | Klopf et al. |
| 2007/0067297 A1 | 3/2007 | Kublickis |
| 2007/0110240 A1 | 5/2007 | Moskowitz et al. |
| 2007/0130070 A1 | 6/2007 | Williams |
| 2007/0174119 A1 | 7/2007 | Ramsey et al. |
| 2007/0208630 A1 | 9/2007 | Chatter et al. |
| 2007/0271297 A1 | 11/2007 | Jaffe et al. |
| 2008/0005002 A1 | 1/2008 | Ferris |
| 2008/0059624 A1 | 3/2008 | Groz et al. |
| 2008/0103795 A1 | 5/2008 | Jakubowski et al. |
| 2008/0103902 A1 | 5/2008 | Burdick et al. |
| 2008/0189232 A1 | 8/2008 | Dunning et al. |
| 2008/0222170 A1 | 9/2008 | Farnham et al. |
| 2008/0248815 A1 | 10/2008 | Busch |
| 2008/0262925 A1 | 10/2008 | Kim et al. |
| 2008/0270426 A1 | 10/2008 | Flake et al. |
| 2009/0018918 A1 | 1/2009 | Moneypenny et al. |
| 2009/0119172 A1 | 5/2009 | Soloff |
| 2009/0132353 A1 | 5/2009 | Maggenti et al. |
| 2009/0177591 A1 | 7/2009 | Thorpe et al. |
| 2009/0177612 A1 | 7/2009 | Gorham |
| 2009/0222329 A1 | 9/2009 | Ramer et al. |
| 2009/0228397 A1 | 9/2009 | Tawakol et al. |
| 2009/0234711 A1 | 9/2009 | Ramer et al. |
| 2009/0240568 A1 | 9/2009 | Ramer et al. |
| 2009/0240569 A1 | 9/2009 | Ramer et al. |
| 2009/0307085 A1 | 12/2009 | Lejano et al. |
| 2009/0327150 A1 | 12/2009 | Flake et al. |
| 2010/0131835 A1 | 5/2010 | Kumar et al. |
| 2010/0156933 A1 | 6/2010 | Jones et al. |
| 2010/0250336 A1 | 9/2010 | Selinger et al. |
| 2010/0262497 A1 | 10/2010 | Karlsson |
| 2010/0317420 A1 | 12/2010 | Hoffberg |
| 2011/0137786 A1 | 6/2011 | Lutnick et al. |
| 2011/0178845 A1 | 7/2011 | Rane et al. |
| 2011/0225037 A1 | 9/2011 | Tunca et al. |
| 2011/0230114 A1 | 9/2011 | Preez et al. |
| 2011/0246299 A1 | 10/2011 | Satyavolu et al. |
| 2011/0246309 A1 | 10/2011 | Shkedi |
| 2011/0258049 A1 | 10/2011 | Ramer et al. |
| 2011/0264497 A1 | 10/2011 | Clyne |
| 2011/0264567 A1 | 10/2011 | Clyne |
| 2011/0283365 A1 | 11/2011 | Moritz et al. |
| 2012/0042280 A1 | 2/2012 | Hoffman |
| 2012/0054189 A1 | 3/2012 | Moonka et al. |
| 2012/0066062 A1 | 3/2012 | Yoder et al. |
| 2012/0066064 A1 | 3/2012 | Yoder et al. |
| 2012/0066234 A1 | 3/2012 | Lee et al. |
| 2012/0072846 A1 | 3/2012 | Curtis |
| 2012/0179543 A1 | 7/2012 | Luo et al. |
| 2012/0185349 A1 | 7/2012 | Soroca et al. |
| 2012/0232960 A1 | 9/2012 | Smith |
| 2012/0233206 A1 | 9/2012 | Peterson et al. |
| 2012/0239479 A1 | 9/2012 | Amaro et al. |
| 2012/0266081 A1 | 10/2012 | Kao |
| 2012/0271748 A1 | 10/2012 | DiSalvo |
| 2012/0284317 A1 | 11/2012 | Dalton |
| 2012/0290518 A1 | 11/2012 | Flinn et al. |
| 2012/0323674 A1 | 12/2012 | Simmons et al. |
| 2012/0323954 A1 | 12/2012 | Bonalle et al. |
| 2013/0046723 A1 | 2/2013 | Sweeney et al. |
| 2013/0066592 A1 | 3/2013 | Aupetit et al. |
| 2013/0066771 A1 | 3/2013 | Ciurea et al. |
| 2013/0073366 A1 | 3/2013 | Heath |
| 2013/0073568 A1 | 3/2013 | Federov et al. |
| 2013/0097052 A1 | 4/2013 | Dicker et al. |
| 2013/0191213 A1 | 7/2013 | Beck et al. |
| 2013/0212041 A1 | 8/2013 | Feldman et al. |
| 2013/0262510 A1 | 10/2013 | Smith et al. |
| 2013/0275178 A1 | 10/2013 | Flake et al. |
| 2013/0297608 A1 | 11/2013 | Etoh et al. |
| 2013/0332987 A1 | 12/2013 | Tenneti et al. |
| 2013/0346545 A1 | 12/2013 | Petersen et al. |
| 2014/0052712 A1 | 2/2014 | Savage et al. |
| 2014/0101685 A1 | 4/2014 | Kitts et al. |
| 2014/0129499 A1 | 5/2014 | Hawkins |
| 2014/0149273 A1 | 5/2014 | Angell et al. |
| 2014/0229351 A1 | 8/2014 | Lutnick et al. |
| 2014/0278762 A1 | 9/2014 | Noyes |
| 2014/0278763 A1 | 9/2014 | Noyes |
| 2014/0278764 A1 | 9/2014 | Noyes |
| 2014/0278776 A1 | 9/2014 | Noyes et al. |
| 2015/0095145 A1 | 4/2015 | Shulman et al. |
| 2015/0121066 A1* | 4/2015 | Nix ............... H04L 63/123 713/155 |
| 2015/0178744 A1 | 6/2015 | Noyes |

(56) References Cited

U.S. PATENT DOCUMENTS

| | | |
|---|---|---|
| 2015/0199699 A1 | 7/2015 | Milton et al. |
| 2015/0213465 A1 | 7/2015 | Noyes et al. |
| 2015/0220972 A1 | 8/2015 | Subramanya et al. |
| 2015/0222604 A1 | 8/2015 | Ylonen |
| 2016/0048900 A1 | 2/2016 | Shuman et al. |
| 2016/0055129 A1 | 2/2016 | Kan et al. |
| 2016/0162573 A1 | 6/2016 | Fadel |
| 2016/0335270 A1 | 11/2016 | Garg et al. |
| 2016/0352730 A1 | 12/2016 | Spagnola |
| 2017/0076109 A1* | 3/2017 | Kaditz .................. G16H 40/20 |
| 2017/0148048 A1 | 5/2017 | Cook et al. |
| 2017/0207916 A1 | 7/2017 | Luce et al. |
| 2017/0302696 A1* | 10/2017 | Schutz .................. H04L 9/0894 |
| 2018/0040009 A1 | 2/2018 | Noyes |
| 2018/0096365 A1 | 4/2018 | Noyes et al. |
| 2018/0096417 A1 | 4/2018 | Cook et al. |
| 2020/0211083 A1 | 7/2020 | Mao |

OTHER PUBLICATIONS

Magid Abraham and Leonard M. Lodish, Getting the Most Out of Advertising and Promotion, 1990 (Year: 1990).

Real-Time Ad Targeting (Published online on Apr. 26, 2016 on https://www.quantcast.com/blog/real-time-ad-targeting-scalingquantcast-advertisng-to-100-million-machine-learning-predictions-per-second/).

Mobasher, Bamshad, et al. "Improving the effectiveness of collaborative filtering on anonymous web usage data." Proceedings of the IJCAI 2001 Workshop on Intelligent Techniques for Web Personalization (ITWP01). 2001. (Year: 2001).

* cited by examiner

Use Case 1 – Batch Attribution Request

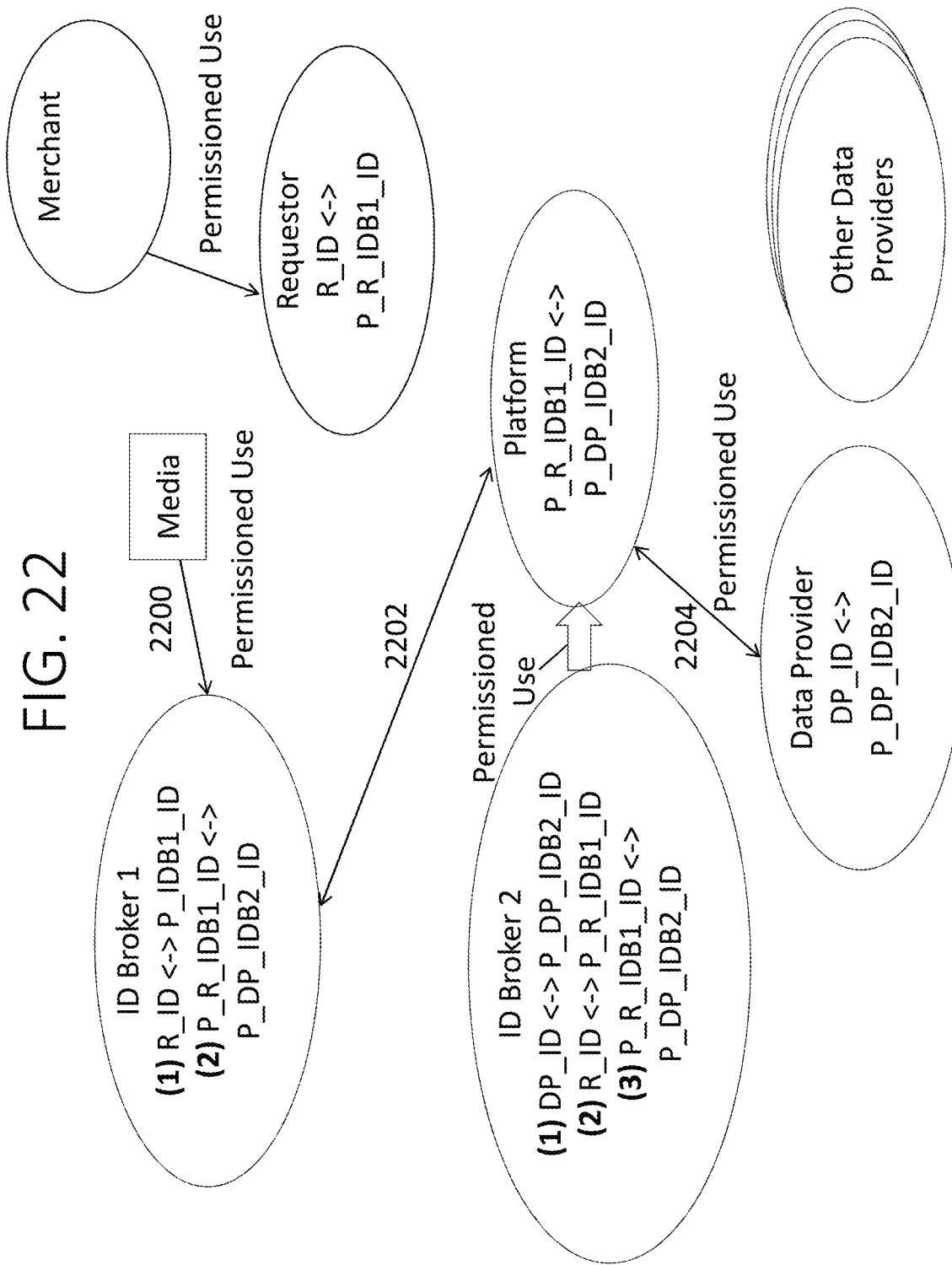

KEY PAIR PLATFORM AND SYSTEM TO MANAGE FEDERATED TRUST NETWORKS IN DISTRIBUTED ADVERTISING

CROSS REFERENCE TO RELATED APPLICATIONS

This application relates to and claims priority from the following applications. It is a Continuation of U.S. application Ser. No. 15/477,473, filed Apr. 3, 2017, which is a Continuation-in-Part of U.S. application Ser. No. 14/677, 315, filed Apr. 2, 2015, which is a Continuation-in-Part of U.S. application Ser. No. 14/214,253, filed Mar. 14, 2014, which claims the benefit of U.S. Provisional Application No. 61/791,297, filed Mar. 15, 2013. U.S. application Ser. No. 14/677,315 is also a Continuation-in-Part of U.S. application Ser. No. 14/214,232, filed Mar. 14, 2014, which claims the benefit of U.S. Provisional Application No. 61/791,297, filed Mar. 15, 2013. U.S. application Ser. No. 14/677,315 is also a Continuation-in-Part of U.S. application Ser. No. 14/214, 233, filed Mar. 14, 2014, which claims the benefit of U.S. Provisional Application No. 61/791,297, filed Mar. 15, 2013. U.S. application Ser. No. 14/677,315 is also a Continuation-in-Part of U.S. application Ser. No. 14/633,770, filed Feb. 27, 2015, which is a Continuation-in-Part of U.S. application Ser. No. 14/214,253, filed Mar. 14, 2014, which claims the benefit of U.S. Provisional Application No. 61/791,297, filed Mar. 15, 2013. U.S. application Ser. No. 14/633,770 is also a Continuation-in-Part of U.S. application Ser. No. 14/214,232 filed Mar. 14, 2014, which claims the benefit of U.S. Provisional Application No. 61/791,297, filed Mar. 15, 2013. Each of the above referenced applications is incorporated herein by reference in its entirety.

BACKGROUND OF THE INVENTION

1. Field of the Invention

The present invention relates to methods and systems for providing object identifier translation in a federated data exchange or federated data marketplace to facilitate the transfer of at least one signal from a signal seller to a signal buyer for use toward advertising or other objectives.

2. Description of the Prior Art

Generally, it is known in the prior art to provide market data or signals as information passed between participants, particularly in a marketplace. Examples of relevant art documents include the following:

U.S. Patent Application Publication No. 2011/0178845 for "System and Method for Matching Merchants to a Population of Consumers" by inventors Rane, et al., filed Jan. 20, 2010, describes a process of data analysis for the purpose of improving targeted advertising and analytics of data, with the major focus on drawing useful inferences for various entities from aggregated data, wherein entities are not limited to businesses and may include government agencies (census, polling data, etc.).

U.S. Patent Application Publication No. 2012/0233206 for "Methods and Systems for Electronic Data Exchange Utilizing Centralized Management Technology" by inventors Peterson, et al., filed May 24, 2012, describes an exchange of data among business entities and the process of disclosing/receiving data and a central management system for companies engaged in strategic partnership or alliance, whereas patent 1 deals with a market place dynamic rather than a data exchange within a locked-in partnership management.

U.S. Patent Application Publication No. 2012/0066062 for "Systems and Methods to Present Triggers for Real-Time Offers" by inventors Yoder, et al., filed Aug. 8, 2011, describes collecting consumer transaction data for the benefit of targeted advertisements and an auctioning process (auction engine) for providing data clusters to clients. For example, cardholders may register in a program to receive offers, such as promotions, discounts, sweepstakes, reward points, direct mail coupons, email coupons, etc. The cardholders may register with issuers, or with the portal of the transaction handler. Based on the transaction data or transaction records and/or the registration data, the profile generator is to identify the clusters of cardholders and the values representing the affinity of the cardholders to the clusters. Various entities may place bids according to the clusters and/or the values to gain access to the cardholders, such as the user. For example, an issuer may bid on access to offers; an acquirer and/or a merchant may bid on customer segments. An auction engine receives the bids and awards segments and offers based on the received bids. Thus, customers can get great deals; and merchants can get customer traffic and thus sales.

U.S. Patent Application Publication No. 2011/0246309 for "Method, stored program, and system for improving descriptive profiles" by inventor Shkedi, filed May 25, 2011, describes a process that enables entities to acquire databanks of user profiles that can add to existing knowledge of user profile data and the process is described as a transaction in that the entities disclose a set of profile information in exchange for additional, helpful data relevant to the disclosed data.

U.S. Patent Application Publication No. 2012/0323954 for "Systems and methods for cooperative data exchange" by inventors Bonalle, et al., filed Jun. 14, 2011, describes methods that enable business entities to gain greater, useful insights on their customers and build upon their relatively limited data via consumer data exchange, wherein upon sharing/merging/exchanging customer data, businesses can perform analysis to improve their business performance, and provides an example wherein original data may consist of a list of consumers, which can be enriched with the consumers' transaction history, search history, etc. via data exchange with other entities that own such information.

U.S. Patent Application Publication No. 2010/0262497 for "System and Methods for Controlling Bidding on Online Advertising Campaigns" by inventor Karlsson, filed Apr. 10, 2009, describes a system for managing bid prices of an online advertising campaign. The system includes a memory storing instructions for adjusting bid prices, and a campaign controller for generating a nominal bid price and a perturbation parameter, based on an ad request received from an advertiser. The system further includes an engine for generating a perturbed bid price based on the nominal bid price and the perturbation parameter, according to the instructions stored in the memory. The system further includes a serving unit for serving an ad impression based on the perturbed bid price. Also discloses that advertisers can bid on desired online ad delivery for their ad campaigns, describes management of the bidding process by managing and adjusting the bid price and describes systems and methods for a biddable multidimensional marketplace for advertising.

European Patent Application Publication No. 2063387 for "Systems and methods for a biddable multidimensional marketplace for advertising on a wireless communication device" by inventors Maggenti, et al., filed Mar. 31, 2008, describes providing targeted advertisements via mobile devices, and systems, methods and apparatus for a multidimensional bidding marketplace for providing advertising content to wireless devices. In particular, aspects allows advertising providers, to define and/or identify a one or more wireless device-based transient factors from a plurality of factors, which serve to define a targeted advertising audience and to bid on advertising based on the selected or identified transient factors.

European Patent Application No. 2076877 (also published as U.S. Patent Application Publication No. 2008/0103795) for "Lightweight and heavyweight interfaces to federated advertising marketplace" by inventors Biggs, et al., filed Oct. 18, 2007, describes a multi-party advertising exchange including advertising and publishing entities from different advertising networks, the invention provides architectures for an online advertising marketplace that range from lightweight to heavyweight implementations. A lightweight client side implementation of an interface includes centralized processing and storage of federated advertising marketplace data by centralized servers or services. A heavyweight client side implementation of an interface for advertising entities includes providing a peer instance of a federated advertising exchange application or set of processes is provided to each advertising entity as an interface for advertising entities where processing and storage are performed locally to each peer instance. Distributed advertising data can be replicated or synchronized with other peer instances.

U.S. Pat. No. 8,224,725 for "Escrowing digital property in a secure information vault" by inventors Grim, et al., filed Sep. 15, 2005, describes that data can be escrowed by receiving escrow parameters including a condition(s) for releasing the escrowed data, and an escrow recipient. An escrow contract is then created based upon the specified escrow parameters. The escrowing further includes storing the digital data in a secure information vault, and storing the escrow contract, along with a pointer to the stored data, in a database. When the condition has been satisfied, the data is released to the escrow recipient. The condition(s) for release can be a payment sum, a date, an indication from a depositor, a trustee or a vault administrator, and/or fulfillment of another escrow contract; also describes keeping data secure and releasing data to certain parties upon satisfaction of certain criteria.

U.S. Pat. No. 8,285,610 for "System and method of determining the quality of enhanced transaction data" by inventors Engle, et al., filed Mar. 26, 2009, describes "enhanced data", non-financial data beyond the primary transaction data and includes invoice level and line item details (for examples see background section) which is collected at the merchant and delivered to a financial service network.

U.S. Patent Application Publication No. 2011/0264497 for "Systems and Methods to Transfer Tax Credits" by inventor Clyne, filed Apr. 25, 2011, includes disclosure for a list of references describing acquiring consumer purchase data.

U.S. Patent Application Publication No. 2011/0264567 for "Systems and Methods to Provide Data Services" by inventor Clyne, filed Apr. 25, 2011, describes providing access to data of diverse sources in general, and more particularly, transaction data, such as records of payment made via credit cards, debit cards, prepaid cards, etc., and/or information based on or relevant to the transaction data; also describes that transaction data can be used for various purposes and that transaction data or information derived from transaction data may be provided to third parties.

U.S. Patent Application Publication No. 2012/0066064 for "Systems and Methods to Provide Real-Time Offers via a Cooperative Database" by inventors Yoder, et al., filed Sep. 2, 2011, describes a computing apparatus is configured to: store transaction data recording transactions processed by a transaction handler; organize third party data according to community, where the third party data includes first data received from a first plurality of entities of a first community and second data received from a second plurality of entities of a second community; and responsive to a request from a merchant in the second community, present an offer of the merchant in the second community to users identified via the transaction data and the first data received from the first plurality of entities of the first community. In one embodiment, the first data provides permission from the merchant in the first community to allow the merchant in the second community to use intelligence information of the first community to identify users for targeting offers from the merchant in the second community.

U.S. Patent Application Publication No. 2012/0054189 for "User List Identification" by inventors Moonka, et al., filed Aug. 30, 2011, describes systems, methods, computer program products are provided for presenting content. An example computer implemented method includes identifying, by a data exchange engine executing on one or more processors, one or more user lists based on owned or permissioned data, each user list including a unique identifier; associating metadata with each user list including data describing a category for the user list, population data describing statistical or inferred data concerning a list or members in a given user list and subscription data including data concerning use of a given user list; storing in a searchable database a user list identifier and the associated metadata; and publishing for potential subscribers a list of the user lists including providing an interface that includes for each user list the unique identifier and the associated metadata.

U.S. Pat. No. 6,850,900 for "Full service secure commercial electronic marketplace" by inventors Hare, et al., filed Jun. 19, 2000, describes an electronic marketplace, and in particular to a full service secure commercial electronic marketplace which generically organizes, stores, updates, and distributes product information from a plurality of suppliers to facilitate multiple levels of sourcing, including contract and off-contract purchasing between the suppliers and a plurality of buyers.

SUMMARY OF THE INVENTION

The present invention relates to methods and systems for translating anonymized object identifiers using a key value pair platform within a federated data exchange, by way of example within a federated data marketplace, in a virtualized or cloud-based computing environment. The present invention provides object identifier translation using the key value pairs (also referred to as "key pairs"), which is an important function within methods and systems for using, buying and selling distributed data through a federated data exchange or marketplace using signals or indicators that represent the data without disclosing the data associated with the object, such as personally identifiable information of an object. As used in this application, the term "objects" includes consumers, electronic devices (such as mobile phones, laptops, tablets, desktops), vehicles (including cars, planes, boats, etc.), and any other object with trackable behavior. Notably, in one use case, the present invention enables feedback to an advertiser on the effectiveness of the advertisements to groups of objects selected by the advertiser or its agents.

One aspect of the present invention provides a key pair platform system for facilitating electronic exchange of data including a source set of anonymized object identifiers mapped to a source set of virtual internally held object identifiers, the source set of virtual internally held object identifiers corresponding to a source set of object information for a set of objects, a destination set of anonymized object identifiers mapped to a destination set of virtual internally held object identifiers, the destination set of virtual internally held object identifiers corresponding to a destination set of object information for the set of objects, and a virtual key pair platform server computer operable to perform an object identifier translation between the source set of anonymized object identifiers and the destination set of anonymized object identifiers upon receiving a permission file over a network authorizing the key pair platform to perform the object identifier translation, wherein the source set of anonymized object identifiers and the destination set of anonymized object identifiers are anonymized such that identities of the multiplicity of objects are not disclosed by the source set of anonymized object identifiers or the destination set of anonymized object identifiers, and wherein the key pair platform server computer does not receive the source set of virtual internally held object identifiers or the destination set of virtual internally held object identifiers.

Another aspect of the present invention provides a method for facilitating electronic transfer of data via a key pair platform including a virtual key value platform server computer receiving a request over a network for a report for a multiplicity of objects, wherein the request includes a first set of anonymized object identifiers, at least one permission file, and at least one destination, the virtual key value platform server computer performing object identifier translation on the first set of anonymized object identifiers to convert the first set of anonymized object identifiers to a second set of anonymized object identifiers, and based upon the second set of anonymized object identifiers, the key value pair platform receiving the report for the multiplicity of objects, wherein each anonymized object identifier in the first set of anonymized object identifiers is mapped to first virtual internally held object identifiers, wherein each anonymized object identifier in the second set of anonymized object identifiers is mapped to second virtual internally held object identifiers, and wherein the platform does not receive any first virtual internally held object identifiers, any second virtual internally held object identifiers, raw data, or underlying data for any object.

These and other aspects of the present invention will become apparent to those skilled in the art after a reading of the following description of the preferred embodiment when considered with the drawings, as they support the claimed invention.

BRIEF DESCRIPTION OF THE DRAWINGS

FIG. 22 is a mapping of the entity architecture which shows the operational data flows among entities of the present invention and the key pair(s) held by each of the entities, the entities including the platform, a data provider, two ID Brokers, a merchant, and a requestor.

DETAILED DESCRIPTION

Figure 1:
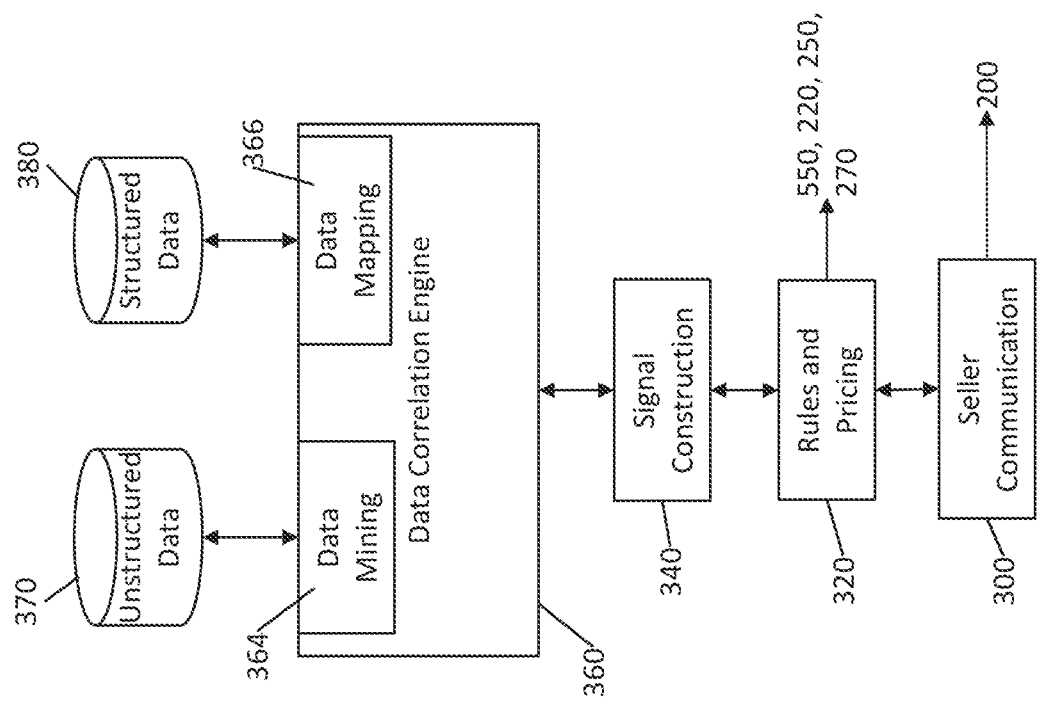
FIG. 1 is a flow diagram of an embodiment of the invention.

Referring now to the drawings in general, the illustrations are for the purpose of describing a preferred embodiment of the invention and are not intended to limit the invention thereto.

The present invention provides methods and systems for providing object identifier translation using a key pairs platform within a federated data exchange or a federated marketplace in a virtualized or cloud-based computing system.

A key pair refers to virtual or electronic data structured in a pair format, with one member of the pair being an anonymized object identifier that is operable to facilitate anonymized and secure exchange of data based on one or more predefined uses agreed upon by parties to a transaction. The term "anonymized object identifier" refers to an anonymized identifier which is held, used, and/or owned by an entity in a data exchange or data marketplace. The anonymized object identifier is an electronic data construct which represents an underlying, internally held object identifier stored in an electronic database on a party computer. Notably, the anonymized object identifier does not disclose any information about the internally held object identifier or any underlying information associated with the internally held object identifier or the object. Rather, the anonymized object identifier is an electronic data construct, similar to electronically encrypted data, which allows for parties to exchange signals and reports which are constructed based on underlying data without disclosing any internally held object identifiers or raw data underlying the signals and/or reports. Thus, like electronic encrypted data, the anonymized object identifiers of the present invention are inextricably tied to computer technology.

The anonymized object identifier is associated with a second member of the key pair, with the composition of the second member of the key pair being dependent upon the party that owns or holds the key pair. In one embodiment, the second member of the key pair is a second anonymized object identifier. In another embodiment, the second member of the key pair is an internally held object identifier, which is the object identifier an entity uses to identify an object internally. Preferably, internally held object identifiers are stored in electronic databases within the entity's computer network, including server computers and other distributed computers. Examples of internal object identifiers include Primary Account Numbers (PANs), physical addresses, and email addresses. Within the entity's electronic databases, each internally held object identifier is associated with raw data or underlying data for that object, such as on-line purchase history (including one or more specific purchase histories such as mobile application purchase history), off-line purchase history, advertisement exposure data, web browsing history, etc.

Anonymized object identifiers are used in a federated data exchange or signal marketplace to provide secure transfer of anonymized data, preferably in a signal format. The term "signal" as used throughout this application refers to a virtual data construct which represents raw data but does not disclose the raw data itself. A signal is a virtual data construct that is used and transmitted electronically over a network for exchange in a signal marketplace or for use by a signal buyer with permissions and/or restrictions of use by a signal owner. Signals are constructed from raw data via data mining unstructured raw data and data mapping structured raw data. One advantageous feature of the federated data exchange or marketplace of the present invention is in providing a uniform or common format to which the unstructured data is converted that enables exchange of electronic derivations from the unstructured data among parties in a data exchange or data marketplace, all while protecting the raw unstructured data. Structured data is typically stored in a particular file format in data "silos" or electronic databases on separate computers. Unstructured data is not stored in organized databases, but is rather stored on a variety of remote computers in a variety of electronic data formats. Examples of unstructured data include log files or stream files of electronic data. The present invention provides a technological solution to the challenge of obtaining value from the unstructured data by creating electronic indicators, i.e. signals, based on the raw unstructured electronic data, which is stored in a variety of file formats. These electronic signals are operable to be exchanged over a network, thus providing value through use of, but not disclosure of, raw data which was previously inaccessible to a data exchange because of the disparate file formats of the raw data. Exchange of these electronic signals is possible because of the conversion of the raw data into a common file format.

In one embodiment, unstructured data includes a stream file or a log file including historical information or recency or freshness information regarding when an object or user last clicked on a hyperlink, such as a link to an advertisement. In other embodiments, stream files or log files include browsing history or on-line purchase history for an object or user. Stream files and log files which include click history or recency, browsing history or browsing recency, and/or on-line purchase history or on-line purchase recency are provided as examples only. Other electronic data files which represent or correspond to trackable on-line and off-line activity are also examples of unstructured data within the scope of the present invention, by way of example but not limitation, phone calls, location data, web search history, etc. File formats for unstructured electronic data files include JavaScript, iframes, images, cookies, tags, tag containers, click redirects, pixels, etc.

Unstructured data files have previously been inaccessible because the format of these files differs among entities which store the files on the remote server computers, making it difficult for exchange of these files or information derived from these files. The present invention provides for deriving value from these unstructured data files by converting these files to a signal format which provides for use of the underlying unstructured data without disclosing the underlying unstructured data. By way of example and not limitation, conversion of unstructured data files into a signal file format in one embodiment involves converting a JavaScript file and a cookie file (unstructured data) into two separate XML files (signals). In another embodiment, a JavaScript file and a cookie file (unstructured data) are converted into one aggregate XML files (signal). These file format conversions include, by way of example and not limitation, inputting an independent variable derived from the JavaScript file and an independent variable derived from the cookie file into a discriminant function to obtain a result which is used in construction of the signal(s). By way of example, the independent variable is a number of clicks for a certain web site over a specified time period or the time expired from the most recent click on the website. In one embodiment, the result from the discriminant function indicates a prediction on future object behavior or state based on the independent variables derived from the unstructured data files.

Several independent variables can be utilized in a discriminant function to provide a result. Referring to the example above, the JavaScript file includes the number of clicks for a certain web site over a specified time period and the cookie file includes the time expired from the most recent click on a different website. The federated data exchange or federated data marketplace allows for the JavaScript file and the cookie file, which come from different source computers, to be utilized together to generate independent variables for input into a discriminant function and for subsequent signal creation, which in one embodiment is an XML file. In another embodiment, an adaptrode is utilized in conjunction with unstructured data to provide predictive data for use in signal construction. Signals are also constructed from structured data which is stored in structured databases on remote computers. Combinations of unstructured data and structured data are also utilized in signal construction.

The federated data exchange or marketplace is a technological solution to the technological problem of providing conformable electronic data files from unstructured data and structured data which is stored in differing file formats. The present invention is also inextricably tied to computer technology because the invention addresses the challenges of converting a first set of raw data files with different formats into a second set of signal files with one format, all while protecting the underlying data of the first set of raw data files and deriving value from the raw data files. The signal represents, but does not disclose, the underlying raw data and provides security inasmuch as the signal can be transmitted or exchanged without exposing any raw data.

Similarly, the anonymized object identifier is an electronic data construct that provides security for internally held object identifiers, object information, and any raw data associated with the internally held object identifiers. The anonymized object identifier provides security by allowing parties to transact in a data exchange or data marketplace using anonymized object identifiers without exposing any internally held object identifiers or raw data. An outside party which acquires the internally held object identifier could potentially link the internally held object identifier or raw data to the object, thus violating the anonymity and privacy of the object and causing the value of the internally held object identifier and the associated underlying information or raw data to decrease. Anonymized object identifiers are used in a federated data exchange or signal marketplace to provide secure transfer of anonymized data without disclosing the internally held object identifier, underlying information, or raw data associated with the internally held object identifier. Preferably, anonymized object identifiers provide for transmission of signals between participants in the federated data exchange or federated data marketplace.

None of the prior art discloses a platform which provides for secure and permissive transactions between entities within an exchange or marketplace, with the transactions informing a requesting entity of the utility of the data, such as effectiveness of advertising campaigns. In an advertising use case, the present invention provides the results achieved by the advertising while not disclosing the underlying data, all while preserving consumer privacy and anonymity through the use of key value pairs.

Additionally, none of the prior art discloses the systems and methods of the present invention for managing signals by signal owners or signal sellers, either in their interactions directly with signal buyers and/or within a signals marketplace for value-based exchange of signals information between buyers and sellers, while ensuring protection of the underlying data represented by the signals; or pricing data signals based upon value derived from the use of data signals as observed from consumer behavior; or for maintaining data in a federated model in control of the data owner; or for allowing signal owners to set rules and parameters for the release of information to approved buyers; or for consumers to permission use of signals and other data taken by third parties through observations. Thus, the creation and management of signals by signal owners is important for providing secure, private and controlled release of information for value that is determined by a structured and rules-based management for signals.

Entities or parties that participate directly or indirectly in an exchange or marketplace and/or provide identifiers to a marketplace or otherwise include the following:

ID Broker: An entity which can associate objects across parties. The ID Broker creates anonymized object identifiers for key value pairs, and maintains key value pairs which include the anonymized object identifiers and/or internally held object identifiers. Underlying data for transactions is also preferably not disclosed in the anonymized object identifier. Notably, the ID broker holds different key pairs for the same consumer or same object. The makeup of these key pairs varies based upon the identity of the party for which the key pair is created. The ID Broker maintains a separate key pair for each party the ID Broker interacts with. Preferably, each key pair is assigned a unique identifier by the ID Broker. Each ID Broker operates within a regulatory compliance environment which requires documentation and approval of parties that obtain access to each anonymized object identifier. Depending on the desired use, ID Brokers are an established credit bureau or an entity with an inventory of digital identifiers that operate within the advertising environment (by way of example, Identifiers for Advertisers (IDFAs), Advertiser IDs, Pixels, cookies, click redirects, image tags, tag containers, etc.). Digital identifiers are related to a person, group of people, phone, computer, or other device or group of devices.

Platform: An entity which facilitates the exchange of permissioned federated data between parties, including a marketplace. Such parties include merchants, marketing entities, advertising entities and agencies, payment networks, payment processors, financial institutions, and credit bureaus. Notably, the platform does not facilitate permissioned data exchange between or among consumers or interact directly with consumers. Key pairs enable interaction of disparate parties within the context of permissioned use and anonymized key pairs, without requiring the use of personally identifiable information of consumers. The platform does not provide the services of originating, clearing, or settling financial transactions, or related banking services. Similarly, the platform does not provide verification, manipulation, or evaluation of the content of the data which is transferred through the platform. The platform does evaluate the conformance of the data format and transmission protocols. The platform preferably includes "checkpoints" which verify the format of the anonymized object identifiers and other information sent with the anonymized object identifiers at predetermined steps in transactions. Importantly, the platform maintains an agreement with every entity involved in data transactions. Each agreement provides pre-defined permissive uses of the data by one or more entities and the services that the platform provides. By performing these functions, the platform addresses a long-felt unmet need as a neutral party which provides facilities for entities to exchange information and authorize detailed, permissioned access to data and insights in an exchange, a marketplace, or otherwise. In an exemplary embodiment, the platform is Commerce Signals, Inc.

Data Provider: An entity that provides a response or report to a request for data within the parameters requested. Examples of data providers include entities with consumer purchase history data, such as banks, retailers or mobile operators.

Requestor: A business entity that initiates a request to a data provider for a specific use, such as a publisher or an outside advertising platform that serves digital sales or other ads on websites or elsewhere that requests information from a data provider. By way of example, the requestor requests information relating to purchase history associated with the requestor's advertising campaign. Requests are preferably requests for deterministic data, but requests for probabilistic data are also within the scope of the present invention. In one example, aggregate measurement data is requested. However, systems and methods of the present invention also provide for non-aggregate or individualized data to be requested as well.

Merchant: A merchant that sells goods to consumers. The merchant is also preferably an advertiser by virtue of purchasing ads with a publisher or outside ad platform.

Exposed Group: The aggregate group of consumers that has been served, shown, viewed or otherwise interacted with an advertisement (by way of example, a TV commercial, e-mail, display ad, or audio ad). Exposed groups are represented to other parties using anonymized object identifiers instead of internally held object identifiers such as (Personally Identifiable Information (PII) held by the relevant party to protect the privacy of the members of the exposed group.

Actions that are performed within the marketplace or are performed ancillary to the marketplace include the following:

Off-line purchases: Information concerning purchases made at a physical store with a payment card (card present.) Off-line purchases include, but are not limited to, card-swipe transactions, Near Field Communications (NFC) transactions, radiofrequency (RF) transactions, Europay MasterCard VISA (EMV) transactions, etc. Off-line purchases information is preferably aggregate data.

On-line purchases: Information concerning purchases made in a card not present environment with a payment card. On-line purchases include, but are not limited to, purchases made on laptops, PCs, tablets, smart TVs, smart phones, smart appliances, or any other electronic device connected to a network. On-line purchases information is preferably aggregate data.

ID Mapping: The one-time process of mapping an anonymized object identifier to an internally held object identifier such as PII or any other information related to an object or a consumer. ID Mapping is preferably performed by an ID Broker. For example, the ID Broker maps the anonymized object identifier "CS-DP-IDBR-ID" to a PAN held by a data provider. Importantly, the platform does not hold the internally held object identifier or map to the internally held object identifier. The key value platform only uses and translates anonymized object identifiers. Thus, the internally held object identifier, such as PII, and other sensitive information is maintained locally at the data provider, the merchant, or the requestor, but is not shared between or among these parties.

Object identifier translation: The process of translating a first anonymized object identifier associated with a first entity to a second anonymized object identifier associated with a second entity. This is a key function performed by the platform of the present invention. Typically, one anonymized object identifier is associated with data provided by a requestor and the other anonymized object identifier is associated with data provided by a data provider. An anonymized object identifier is originally issued by the ID Broker to the relevant party as one key of a key pair.

Each anonymized object identifier in a key pair is known to or held by a maximum of three parties; no other parties are able to interpret the anonymized object identifier or map it back to the constituent or underlying information. This prevents parties from interacting with each other without the permission of the ID Broker that creates and maintains the key pairs and also prevents parties other than the ID Broker from obtaining or holding information on the object. The methods and systems of the present invention prevent disclosure of information which is held by entities within the data exchange or marketplace, therefore preserving the value of the information. In one use case, the systems and methods of the present invention prevent disclosure of underlying data, including but not limited to PII. Although the term "PII" is used throughout this application, this term also includes personal information which does not explicitly fall under the umbrella of what is commonly considered as PII under United States laws, such as the Gramm-Leach-Bliley Act (GLBA), also known as the Financial Services Modernization Act of 1999, (Pub.L. 106-102, 113 Stat. 1338) enacted Nov. 12, 1999.

Anonymized object identifiers prevent parties from obtaining object information data which they do not internally hold. A party which acquires object information without authorization could potentially link the information or data to the object, thus violating the anonymity and privacy of the object. Notably, in many use cases, the disclosure of this virtual information or data would cause the virtual information or data to decline in value. The present invention preserves the value of the object information through the use of anonymized object identifiers. Each anonymized object identifier in a key pair is known to or held by a maximum of three parties; no other parties are able to interpret the anonymized object identifier or map it back to the constituent or underlying information. This prevents parties from interacting with each other without the permission of the ID Broker that creates and maintains the key pairs and also prevents parties other than the ID Broker from obtaining or holding information on the object.

Another benefit of this framework is that leakage of a key pair is useless to any party that does not have permissive use. The internally held object identifier in a key pair varies based on the identity of the entity which holds the key pair because each entity typically does not identify consumers or objects with the same information. By way of example, a financial services company identifies a consumer using a PAN whereas an advertiser identifies a consumer using an email address. Key pairs held by the platform of the present invention include two anonymized object identifiers, and do not include internally held object identifiers, to protect the identity and privacy of the consumer or the object associated with the anonymized object identifiers.

Translation key pairs are defined as key pairs which include two anonymized object identifiers, and are held by the platform and ID Brokers. Translation key pairs provide numerous advantages over the prior art. Although the translation key pairs correspond to internally held object identifiers or underlying data, which in an exemplary embodiment is specific information such as PII, the platform does not hold the internally held object identifiers or have access to the underlying data. Thus, it is not possible to derive the information through the translation key pairs. This provides an improvement over encryption technology. Commonly used encryption technology today includes symmetric encryption, encrypted file systems, and asymmetric encryption. Symmetric encryption uses a private key to decrypt data, with the security of the encryption depending upon the character length of the private key. One drawback of symmetric encryption is that the holder of the private key can use the private key to decrypt the encrypted data. In encrypted file systems, a computer encrypts and decrypts data on demand. Each user has a personal decryption key which allows them to access and manipulate the data as long as they hold the decryption key. This is disadvantageous because it allows for any holder of the decryption key to decrypt the data. Thus, interception of the decryption key by a third party gives the third party the ability to access and manipulate the data. Asymmetric decryption operates using a public key and a private key. The public key can only encode data while the private key can only decode it, with the holder of the public key and the private key being able to decrypt the encrypted data. This is disadvantageous because if the private key and public key are obtained by a third party, that third party can decrypt the encrypted data.

In contrast, the key pairs held by the platform are not encrypted, but in fact are an improvement over encryption. Like encryption technology, the present invention is inextricably tied to computer technology. However, the key pair constructs of the present invention, each of which includes at least one anonymized object identifier, solve prior art technological problems associated with encryption and electronic data security. No encryption or decryption is required in sending translation key pairs from a source computer to the platform or from the platform to a destination computer. Additionally, no encryption is utilized in object identifier translation. Reverse engineering of the key pair held by the platform to the underlying data is not possible. Thus, the key pair represents an improvement in data security without using encryption. In fact, utilizing translation key pairs provide improvements to computer technology because transmission of anonymized object identifiers is performed without encryption while providing more security for the transmission than if encryption were being used in the transmission. This provides for faster processing from when a request for an anonymized object identifier is received to when the anonymized object identifier is sent, as the anonymized object identifier does not need to be encrypted. Additionally, the object identifier translation provided by the platform server computer of the present invention provides improved processing times over decryption. In a preferred embodiment, object identifier translation involves an electronic data translation from one anonymized object identifier in one data column of an electronic data table to another anonymized object identifier in another data column of the electronic data table. This translation provides for improvements in processing speeds compared to encryption and decryption. Any of the prior art methods of encryption and decryption involve additional processing steps which causes a delayed translation time when compared to the object identifier translation of the present invention. Because the anonymized object identifiers which are translated via the object identifier translation do not disclose any internally held object identifiers, object information, or raw data, it is not necessary to encrypt the anonymized object identifiers. This protects consumer or object privacy and anonymity and preserves the value of the underlying data associated with the object while providing for improved electronic processing speeds and electronic data transmission speeds when compared with the prior art.

In fact, the anonymized object identifiers provide for improved security over the prior art. The present invention represents an improvement in privacy and security for data storage and data transfer on and between electronic devices. Leakage of the translation key pair is useless to any party as no internally held object identifiers, underlying data, or meaningful information can be derived from the holder of the translation key pair. This is in contrast to encryption where the holder of a private key and a public key (asymmetric encryption), a private key (symmetric encryption), or a personal decryption key (encrypted file system) can access and manipulate the underlying data. The present invention is an improvement over encryption technology because the present invention prevents the holder of the translation key pair from obtaining any underlying data associated with the translation key pair. Thus, the systems and methods of the present invention are similar to encryption technology only inasmuch that the systems and methods of the present invention solve are inextricably tied to computer technology.

Object identifier translation services are provided by the platform under specific, named, and controlled uses, wherein only the results of the uses are reported as opposed to the underlying data. The "chain of command" on data flow and reports provided by the platform provides for anonymized object identifier types, volume, uses, and permissions throughout the exchange of information. The platform enables ID Brokers to expand the capabilities of the anonymized object identifiers. The present invention also allows for requestors of data to choose an ID Broker based upon a variety of factors including match rate, price, constraints, and destination.

Thus, the present invention enables federated trust networks that provide innovative benefits over the prior art. In particular, the use of federated data provides for improvements in security of information and privacy for the objects associated with the data. The platform addresses a long-felt unmet need as a neutral party which provides facilities for entities in the marketplace to exchange information and authorize detailed permissioned access to data and insights through management of permissions and enforcements of agreements between parties. Established transactions in the marketplace become extensible among parties, which enables scalability for federated marketing. By building in systematic privacy and anonymity into the platform, trust is secured among networked parties that their private data will not be disclosed, thus maintaining the value of the data. Additionally, the agreements in the platform ensure that data will not be used for any purpose other than the permission which is explicitly given by the party for their data. Thus, one application of the present invention meets the needs of advertisers and marketers by providing feedback in the form of purchases after exposure to advertising and/or marketing campaigns while maintaining the value of the data.

One embodiment of the present invention provides a key pair platform system for facilitating electronic exchange of data including a first set of anonymized object identifiers mapped to a multiplicity of objects, wherein each anonymized object identifier in the first set of anonymized object identifiers is mapped to first virtual internally held object identifiers, a second set of anonymized object identifiers mapped to the multiplicity of objects, wherein each anonymized object identifier in the second set of anonymized object identifiers is mapped to second virtual internally held object identifiers, and a virtual key pair platform server computer operable to perform an object identifier translation between the first set of anonymized object identifiers and the second set of anonymized object identifiers upon receiving a permission file over a network authorizing the key pair platform to perform the object identifier translation, wherein the first set of anonymized object identifiers and the second set of anonymized object identifiers are anonymized such that identities of the multiplicity of objects are not disclosed by the first set of anonymized object identifiers or the second set of anonymized object identifiers, and wherein the key pair platform server computer does not receive the first virtual internally held object identifier or the second virtual internally held object identifier.

Another embodiment of the present invention provides a method for facilitating electronic transfer of data via a key pair platform including a key value pair platform server computer receiving a request over a network for a report for a multiplicity of objects, wherein the request includes a first set of anonymized object identifiers, at least one permission file, and at least one destination, the key value pair platform server computer performing object identifier translation on the first set of anonymized object identifiers to convert the first set of anonymized object identifiers to a second set of anonymized object identifiers, and based upon the second set of anonymized object identifiers, the key value pair platform receiving the report for the multiplicity of objects, wherein each anonymized object identifier in the first set of anonymized object identifiers is mapped to first virtual internally held object identifiers, wherein each anonymized object identifier in the second set of anonymized object identifiers is mapped to second virtual internally held object identifiers, and wherein the platform does not receive any first virtual internally held object identifiers, any second virtual internally held object identifiers, raw data, or underlying data for any object.

Importantly, the use of each key pair is approved by each party in a data exchange transaction. Within the platform, key pairs are associated with a defined owner and permissioned uses. Tracking the ownership of key pairs allows management of use of each "pair table" sourced from a defined ID Broker. The platform does not manage object identifier translation in one table with many columns of IDs, as it would be difficult to ascertain the use permissions associated with the anonymized object identifiers. Rather, the platform maintains a separate pair table for each pair of parties that transact through the platform. By way of example, the platform holds and maintains a first key pair table for data provider 1 and requestor 1, a second key pair table for data provider 1 and requestor 2, a third key pair table for data provider 2 and requestor 2, etc. Each key pair table includes two columns, with the first column including rows of anonymized object identifiers from a first party and the second column including rows of anonymized object identifiers from a second party. The platform enforces the permissions granted by the requestor and the data provider and thus provides for sensitive and complex multi-party transactions.

Preferably, the platform facilitates transactions through a user interface on a web browser, with the requestor able to submit a request through the interface and the data provider able to submit a report based on the request through the interface. In an alternative embodiment, a user interface is not used and standard methods of communication over networks known by one of ordinary skill in the art are utilized. The key pairs are preferably transferred as Extensible Markup Language (XML) files. However, other file types known by one of ordinary skill in the art for storing data are also utilized.

The present invention relates to the inventions described in U.S. application Ser. No. 14/214,269, filed Mar. 14, 2014, U.S. application Ser. No. 14/214,743, filed Mar. 15, 2014, and U.S. application Ser. No. 14/951,561, filed Nov. 25, 2015, each of which is incorporated herein by reference in its entirety.

By way of additional background and definitions, within the federated data exchange or marketplace, the distributed signals are constructed by signal sellers by transforming raw data into signals or indicators, which facilitate buying and selling distributed information through these signals or indicators without disclosing the underlying data. The signals are derived from data sources and abstracted to protect the underlying data. Signals are constructed in such a way that they protect the underlying data, but have consistency and relevance toward a given objective. Signal owners or sellers first convert data into a "signal" or indicator, the construction of the signal is in the control of the data owner, different signal constructs will have relevance toward different objectives and signal buyers. The signal or indicator construct allows the signal seller to abstract the underlying data without being or disclosing the actual data itself, i.e., the signal functions like metadata. The economic value of the signal depends on the price each buyer is willing to pay, which depends on the value that the signal has toward a given objective. The virtual marketplace brings buyers and sellers of signals together and communicates the history of signal effectiveness for each objective. Sellers of signals define rules governing how to sell signals directly to buyers and/or based upon virtual marketplace historical data, buyer, agreements, price, effectiveness, consumer permissions, local laws, regulation and other rules. Buyers have the opportunity to bid for information within the rules of the marketplace and the rules of the seller. Signals (or indicators of data that do not disclose the data), and the associated virtual marketplace facilitate the discovery of signals for a use, pricing of signals for a defined use, the creation of agreements for use, the regulatory and consumer permission of use, the transmission and tracking during use, the value created after the use, and for the clearing and settlement based upon observations after the use and under the terms of the agreement.

Also, at least one agreement is provided between signal buyers and signal sellers (also referenced buyers and sellers); examples of important agreements within the federated data object identifier translation systems and methods of the present invention include: an object identifier translation agreement that is provided within the system for use between distributed signal buyers and signal sellers within the federated data marketplace; an attribution agreement generated by the at least one server computer for use between distributed signal buyers and signal sellers within the federated data marketplace.

In methods of the present invention, the following steps are included: providing a distributed data structure that is transformed into at least one signal that is stored in at least one remote server computer constructed and configured for network-based communication with a multiplicity of distributed signal owner computers; the at least one remote server computer further including at least one data correlation engine operable to perform the steps of: receiving at least two signals from the multiplicity of distributed signal owner computers; automatically translating identities of signal owners with at least one ID Broker; automatically generating a signal index for associating the at least two signals with their corresponding signal owner data and the purpose (and/or use) with which the signals interact, which is stored remotely within the corresponding signal owner computer(s); populating a data structure with vectors of raw signal data that contain at least one object or consumer identifier; generating key fields and/or integration methods from signal data for combining and/or integrating raw signal data vectors; generating experimental designs and combinatorial patterns through exploratory data analysis based on the federated distributed data. Notably, while distributed data structures themselves are not within the control of the remote server(s) of the systems and methods of the present invention, these distributed data structures are transformed into signals or signal payloads for a given use within the present invention. Also, notably, the signals index is generated as a "discovery" mechanism for a specific use, i.e., these signals are indexed against an objective (by way of example and not limitation, hungry, thirsty, measure ad performance, etc.). Preferably, neither the sender nor the receiver are in possession of the identifier of the other.

As described herein, each of the at least two signals corresponds to or represents a behavior of an object and/or an activity and/or an event associated with the object, wherein each of the at least two signals includes information about recency, frequency, scale (monetary measures), and affinity, and wherein the behavior includes information about behavior recency, behavior frequency, scale, and behavior affinity.

Also, the at least one remote server computer is operable for transmitting the experimental designs and/or combinatorial patterns via the network to at least one signal buyer computer. The at least one server computer is operable for receiving a signal request from at least one signal buyer; processing the signal request by validating the source and format of the signal request, translating all authorized identities; sending the signal request to all authorized signal sellers; computer transmitting the data structure as an array to the signal buyer(s); and combinations thereof. Additional steps in the systems and methods of the present invention include retaining control of signal data within a defined use of the signal by a registered buyer, based upon at least one rule and/or the signal owner limiting signal availability to signal buyers within the federated data marketplace based upon at least one rule, wherein the at least one rule includes factors regarding: buyer identity, campaign type, signal requested, price, redemption signal type, purchase quantity, past performance of signal, past performance of campaign type, past performance of buyer, and combinations thereof.

Additional steps include the following, either individually inclusive or in combination: generating an object identifier translation agreement for use between distributed signal buyers and signal sellers within the federated data marketplace; defining a signal translation and a signal translation mechanism for use with the raw signal data in translating anonymized object identifiers from the format of the sender to format of the receiver; generating an attribution agreement for use between distributed signal buyers and signal sellers within the federated data marketplace; transmitting the translated identities to one or more measurement entities for determining a physical presence and/or a transaction of the translated identities; determining a best identity provider through a match rate signal; resolving household members by associating household members and consumer identities with the federated data marketplace; identifying a best measurement provider or measurement entity for a defined exposed group within the federated data marketplace.

Also, in preferred embodiments of the present invention the at least one remote server computer is operable for selecting an ID Broker and automatically generating a financial value or pricing for performing object identifier translation based upon a functional value associated with the object identifier translation. By way of example and not limitation, for the object identifier translation of objects that are cars, they can be identified by a license plate number, a Vehicle Identification Number (VIN), a model name, a model year, a location, and combinations thereof. If the signal sender knows only the license plate and the signal receiver knows only the VIN, and a third party possesses a directory that has both, then the third party may translate the object identifiers from license plate number to VIN without providing the license plate number to the receiver.

In methods and systems of the present invention, the steps described herein are provided within a federated community of signal sellers and signal buyers, and for a multiplicity of signal owner computers distributed throughout the network and in network-based communication with the remote server computer. Furthermore, these steps are provided within a federated data marketplace and provide for access management and associated policies impacting the availability of data within the data marketplace.

In any case, the at least one signal includes a signal type selected from the group consisting of: state signals, event signals, activity signals, behavior signals, relational signals, location signals, loyalty signals, purchase signals, social signals, and combinations thereof.

Object identifier translation is an important function within methods and systems for using, buying and selling distributed data through a federated data marketplace or exchange using signals or indicators that represent the data without disclosing the data. By way of background for federated data marketplace, the creators of signals are the sellers of information. The content of a seller's information based upon an historical interaction with one or more events, objects or activities that correspond to the behavior of a multitude of objects. Sellers of data or information have multiple requests to share their information. Signals or indicators are a mechanism to share derived information without disclosing the raw data. The value of any asset is highly correlated to the price that buyers are willing to pay.

There is a longstanding and unmet need for providing an automated, virtual signals data marketplace or exchange where signal creators (also the signal sellers and/or signal owners) selectively provide information of interest to signal buyers for defined uses, while protecting the underlying data and maintaining the control of the signal seller through its usage within a network-based, distributed data exchange where economic value of the data, as derived from its use, is the central pricing mechanism within agreements between the sellers and buyers. Nothing in infinite supply can have a price. Data may theoretically have an infinite value, but once it is shared, further dissemination is hard to prevent, thus the value of data quickly diminishes once it is shared. It is an objective of the Signals Exchange Marketplace to create a market for data within a signal or indicator framework, which protects the underlying data that the signals or indicators represent. This signals metaphor allows each signal or indicator provider/owner/seller the ability to construct, control and price their signals and protect further dissemination of both the signals, as well as the underlying data.

In one embodiment of the present invention for providing a signals marketplace or signal exchange for distributed signal sellers and signal buyers, a method for generating signals from distributed data sources controlled by a multiplicity of owners for selling in a signal marketplace is provided, including the steps of: providing at least one signal from a first data source and at least one signal from a second data source; wherein the signals originate from different distributed data sources controlled by different owners and the signals are registered in a centralized database and each of the signals is indexed in the centralized database based upon ownership, object relevance, behavior relevance, historical usage, performance, and correlation to other signals and data; and, wherein the value is automatically generated by a remote server computer associated with the remote database, based upon at least two factors associated with the value, and wherein the value includes relevance to a signal buyer and a buyer objective. By way of example and not limitation, the relevance to the signal buyer is based upon at least one objective, with the economic value of the signal based upon the measured performance of at least one signal toward at least one objective by the buyer. Preferably, the at least two factors are selected from: predictive accuracy, fidelity, relevance to an objective, near-real-timeliness, frequency, recency, state of an object, relationship of the source of the signal, reputation of the signal, reputation of the seller, affinity to a target, and/or usefulness to an objective. By way of example and not limitation, the relevance of a signal to the signal buyer based upon at least one objective may include marketing and/or advertising.

The method may include additional steps including: aggregating the signals; creating a new signal or a synthetic signal from one or more signals from at least one source; linking the indexed signals to relational databases, wherein the signals are locally indexed by each signal owner and/or each seller associated with the signals; the virtual marketplace server computer and/or the owners creating and tracking their corresponding indexed signals; updating the remote and centralized indices of signals; and/or tracking agreements for buying and selling signals.

A system for providing a signals marketplace in a virtualized computer network for generating signals from distributed data sources controlled by a multiplicity of owners and further includes at least the following components and their relationships with each other: a remote server computer constructed and configured in network-based communication with a centralized database further comprising at least one index for signals data, and operable to automatically generate an assigned value corresponding to each unique signal created by a signal seller within a remote index of signals data; wherein the remote indexed signals data are generated from remote structured and unstructured data. receiving at least one signal from a first data source and at least one signal from a second data source, wherein the marketplace registers remote signals, which originate from different distributed data sources controlled by different owners into a centralized database or signals index; wherein each of the registered signals has a corresponding assigned value stored in the central database and associated with its indexed corresponding remote signal; and, wherein each assigned value is based on at least two factors is dependent upon a signal source value and a buyer objective. Preferably, the signals marketplace system automatically recommends signals, and the price for a given usage for both signal buyers signal sellers or signal owners. Additionally or alternatively, the recommended pricing is automatically generated based upon a number of factors, including relevance to an objective, fidelity, near-real-timeliness or recency, affinity, predictive accuracy, and combinations thereof, and/or is negotiated in a bid-response exchange between the owners and buyers.

In the virtual marketplace, purchases of the owners' signals are tracked by the owners or sellers, within the remote server computer, and in the signals marketplace, which automatically tracks the signals data through its function of transferring signal information between buyer and seller within active agreements, and monitoring feedback on signal performance through observation of events, behaviors, environment and states of objects and objectives. The marketplace uses this feedback to update directories, indices, pricing, history, agreements, and correlations to an objective. Also preferably, the signals marketplace centralized server computer automatically tracks and manages signal and participant reputation for communication to other marketplace participants. The signals and their corresponding owners, as well as buyers, brokers, publishers, observers and other participants are registered and registration information is stored in the centralized database associated with the virtual marketplace remote server computer, and the registration information is stored in a shared directory associated with the centralized database.

The present invention also provides an embodiment including a method for creating and using a virtual marketplace for valuing and selling signals generated from distributed data sources that are controlled by a multiplicity of owners, the method steps including: providing at least one signal from a first data source and at least one signal from a second data source to a remote server computer for a signal marketplace or exchange; wherein the signals originate from different distributed data sources controlled by different owners and the signals are indexed and listed in a centralized database and each of the indexed signals is linked to corresponding relational databases; and, wherein a value for each centralized indexed signal is automatically generated by the remote server computer associated with the seller where terms of use have been agreed. The value of the signals is controlled by the seller and based upon at least two factors associated with each value, the at least two factors selected from the group consisting of: event, object state, change in state, behavior of an object, relationship to another object, relationship to a behavior, economic indicators, relevance to an objective, near-real-timeliness, frequency, recency, predictive accuracy, fidelity, reputation of the signal, reputation of the seller, affinity to a target, usefulness to an objective, and combinations thereof. Also, in this method embodiment, as with the systems of the present invention, the marketplace provides for participation and compensation of other parties that observe object behavior, object state or are otherwise capable of providing feedback signals corresponding to a state, behavior, activity, and/or an event. This observer feedback informs the agreements, economic value of the signals, object preferences, calculated correlation of signal information, environmental projections and other marketplace functions. The economic value of the observation can be calculated by the marketplace, and these observation feedback signals can be indexed and purchased within the marketplace. Advantageously, the listed index provides for automated matching with buyer candidates having corresponding objectives for buying signals and signals data, and wherein the objectives include consumer state, events and behavior(s). Additional method steps include: the step of automatically updating the listed index and/or creating new listings; receiving a defined use and an agreement to report on a result of use by a registered buyer with the server computer; releasing signal data to a registered buyer based upon the agreement between the signal owner and the registered buyer; monitoring performance of the at least one signal compared with a corresponding objective; automatically determining a relevance to an objective for the at least one signal based on comparison with consumer feedback and consumer behavior; and/or limiting signal availability based upon a rules engine that automatically considers buyer agreement, identity, campaign type, signal requested, price, redemption signal type, purchase quantity, past performance of signal, past performance of campaign type, past performance of buyer; automatically correlating how the value of the information decays over time and with respect to relevance to the objective; and combinations thereof.

According to the present invention, the signal owner controls how the at least one signal is created, generated and/or constructed and how the at least one signal is used by the buyer, although for facilitating the virtual marketplace or exchange between signal sellers and signal buyers, preferably the at least one signal includes a signal type selected from the group consisting of: event signals, activity signals, behavior signals, performance signals, relational signals, location signals, loyalty signals, purchase signals, social signals, and combinations thereof.

The federated data marketplace for signals is built on the framework of creating signals or indicators by their corresponding signal owners or signal sellers, the method steps performed by a signal owner include: constructing at least one signal associated with a behavior of an object and/or an activity and/or an event associated with the object in a signal owner computer that is constructed and configured for network-based communication with a remote server computer, wherein the at least one signal based upon at least two factors associated with each value, the at least two factors selected from the group consisting of: event, object state, change in state, behavior of an object, relationship to another object, relationship to a behavior, economic indicators, relevance to an objective, near-real-timeliness, frequency, recency, predictive accuracy, fidelity, reputation of the signal, reputation of the seller, affinity to a target, usefulness to an objective, and combinations thereof; generating a first value for each of the at least one signal; and tracking usage of the at least one signal. Also, the at least one signal provides a feedback corresponding to the behavior, state, activity, and/or the event. Additional steps include indexing the at least one signal; listing the indexed signals in a remote database associated with the remote server computer; communicating the remote index signal to the centralized data marketplace signal index, wherein the centralized signal index listing provides for automated discovery and matching with buyer candidates having corresponding objectives for buying signals and signals data, wherein the objectives may include object behavior(s), activities, performance, and/or events; and updating the listing of the indexed signals by the signal seller or signal owner.

The at least one signal includes a signal type selected from the group consisting of: event signals, activity signals, behavior signals, relational signals, location signals, loyalty signals, purchase signals, social signals, and combinations thereof. Signals are generated or constructed from both structured and unstructured data. Significantly, each signal owner controls how the at least one signal is created, generated and/or constructed; in embodiments of the present invention, methods of the present invention provide steps wherein signals or indicators are created by the signal owner transforming its own data into the signals or indicators through steps of automatically organizing structured data, unstructured data, external data based upon historical patterns, external usage, external feedback, external object observations, locally maintained correlation engines, centrally managed correlation engines, signal response management, and object estimators. In constructing the at least one signal or indicator, preferably the signal seller (or its system and seller correlation engine) automatically determines a relevance to an objective from historical performance and including external observations and feedback on object state, activity or behavior.

While the definition and construction of the signal is at the discretion of the Seller, generally signals conform to a common signal structure whose elements are named and formatted to marketplace conventions for the purpose of creating a common taxonomy for exchange of signal information. In the case of a signal exchange within a signals marketplace, but also for exchange outside of a marketplace, the signal structure provides for secure and reliable transportation and translation of an information payload contained with a signal. The signal construct defines the source, the destination, the delivery channel, the method for securing the data, the agreement under which the data is exchanged, a transaction identifier, a transaction time, information necessary to confirm receipt, template which describes the message type, and the payload of the message. Sellers and buyers use the signals construct to create, register, publish, discover, assess, sell, manage, and measure data exchange according to the systems and methods of the present invention. Signal types include both buyer-initiated and seller-initiated signals; some examples follow for illustration purposes, but are not intended to limit the claimed invention thereto.

Buyer Initiated Behavior Signal (BIBS). Behavior signals are published by sellers which observe object behavior. For a given buyer initiated behavior signal, the buyer of a behavior signal requests behavior signal from seller for a given event, object or category of objects. The content of the seller's signal is based upon an historical interaction with one or more events, objects or activities that correspond to the behavior of an object. To obtain the Seller's signal, the buyer must provide a reference point for the seller to create the behavior signal. In this model it is the request of the buyer triggers the exchange of data. For a given reference point, the seller's signal describes a behavior such and such information as the recency and the frequency of the behavior. By way of example and not limitation, a behavior name is illustrated by "Travel-To [Variable]". The buyer initiates the request and seeds the reference point variable for the signal. Each buyer could pay a different price depending on the value they derive from the signal.

Buyer Initiated Event Signal (BIES). Event signals are published by sellers which observe events. For a given buyer initiated event signal, the buyer of an event signal requests objects, or categories of objects from seller that have a relationship to a given event. The content of the seller's signal is based upon an historical interaction with one or more events, objects or activities that correspond to an event. To obtain the seller's signal, the buyer must provide a reference point for the seller to create the event signal. In this model it is the request of the buyer triggers the exchange of data. A signal request is initiated by the buyer asking the seller if a given reference event has occurred. The signal response can contain information on the event, objects within the event, recency, frequency, location, as well as specifics surrounding the event. By way of example and not limitation, consider "movie purchases in Cincinnati Ohio in last five minutes" as a signal request of this type, Each buyer could pay a different price depending on the value they derive from the signal.

Seller Initiated Behavior Signal (SIBS). In this case the seller is initiating (or publishing) that a behavior has occurred. The content of the seller's signal is based upon a current or historical interaction with one or more events, objects or activities which correspond to the behavior of an object. The signals can be published to one or more buyers, and prospective buyers as the activity occurs. Each buyer could pay a different price depending on the value they derive from the signal. By way of example and not limitation, consider "consumer [CONSUMER_NAME] is shopping in [Location]" as a signal.

Seller Initiated Event Signal (SIES). Seller is publishing an event to one or more buyers. The content of the seller's signal is based upon a current or historical interaction with one or more events, objects or activities which correspond to the behavior of an object. From a software design perspective, this model is consistent with software based publish/subscribe paradigm. Within commerce signals buyers "subscribe" to an event made known by the seller. Each buyer could pay a different price depending on the value they derive from the signal. The seller initiates the signal, and can communicate specifics about the event. By way of example and not limitation, consider "consumer [CONSUMER_NAME] purchased movie ticket" as a signal.

The signals may be directly derived, constructed, or generated from signal owner raw data (including data sourced by the signal seller) and/or synthetic signals may be constructed from at least one signal or a multiplicity of signals, i.e., one or more signals are used to construct additional signals, so the synthetic signals are not directly associated with the underlying raw data. Once again, signals or indicators according to the present invention are generated or constructed from both structured and unstructured data of the signal owner. Similarly, a consensus signal or a generalized signal from one or more signals. Note that the method steps of the present invention are made for a multiplicity of signals and corresponding signal owners, in particular in the case of distribution in the context of a virtual marketplace or exchange for signals.

Preferably, after constructing signals, their distribution or sale to buyers is controlled by the signal owner and rules governing seller signals or owner signals that provide for limiting signal availability based upon a rules engine that automatically considers buyer identity, campaign type, signal requested, price, redemption signal type, purchase quantity, past performance of signal, past performance of campaign type, past performance of buyer, and combinations thereof. The rules engine resides within a remote computer of the signal seller and is communicated through a distributed network, either directly and/or within a virtual marketplace having a centralized rules engine governing the management of the exchange of signals for a multiplicity of signal sellers and signal buyers.

Signal value cannot be established conclusively independently of a signal buyer's objective. Additionally the value of any of the signals depends upon signal relevance to the objective based upon a multiplicity of factors, including feedback such as time from last observation and/or interaction, effectiveness of consumer interaction, depth of interaction, consumer feedback, buyer behavior, and/or consumer reputation. The signal seller correlation engines provide options for automatically correlating how the signals or indicators relate to data held within the signal seller to data external to the signal seller. The present invention also provides an embodiment including a method for adjusting the correlation of data with time and with respect to relevance to the objective(s) of buyers. Significantly, regardless of the objectives, generally the value of the signal(s) depends upon the time of the signal construction from an event occurrence, wherein the value of the signal decays over time. Also, the present invention provides for the economic value of the signal to decay over time. By way of example and not limitation, consider a signal "Consumer [ID] Purchased Movie Ticket at TIME". This signal has relevance to a buyer's objective which is dependent on time since the observation. In other words a signal has a higher relevance if it is one second old, and a lesser relevance as time progresses. The economic value of a signal is in proportion to its relevance, hence the value of the signal is also higher if the signal is one second old, and a lesser value as time progresses.

Additionally, within the present invention systems and methods, each data owner controls access to signals associated with the data based upon an agreement for a given use for a given price within the rules of the agreement, policy, etc. In systems and methods of the present invention, the data owner controls who has access to the signal, for a given use, for a given price, within a set of rules. The constraints managing use, price, and rules are governed by signal access management.

The present invention relates to methods and systems to perform access management for signals or indicators, wherein the signals are provided by signal sellers for distribution and sale to signal buyers based upon agreements having parameters and rules created by signal sellers for automatically governing signal access management within a signals marketplace. More particularly, the present invention relates to methods and systems for gaining access to signals based upon rules, policies, exclusions, agreements, price, reputation, location, and combinations that govern signals access management. Signals access management is provided across a multiplicity of signal marketplace participants and agents of participants.

The distributed signals are constructed by signal sellers by transforming raw data into signals or indicators, which facilitate buying and selling distributed information through these signals or indicators without disclosing the underlying data. The signals are derived from data sources and abstracted to protect the underlying data. Signals are constructed in such a way that they protect the underlying data, but have consistency and relevance toward a given objective. Signal owners or sellers first convert data into a "signal" or indicator, the construction of the signal is in the control of the data owner, different signal constructs will have relevance toward different objectives and signal buyers. The signal or indicator construct allows the signal seller to abstract the underlying data without being or disclosing the actual data itself, i.e., the signal functions like metadata. The economic value of the signal depends on the price each buyer is willing to pay, which depends on the value that the signal has toward a given objective. The virtual marketplace brings buyers and sellers of signals together and communicates the history of signal effectiveness for each objective. Sellers of signals define rules governing how to sell signals directly to buyers and/or based upon virtual marketplace historical data, buyer, agreements, price, effectiveness, consumer permissions, local laws, regulation and other rules. Buyers have the opportunity to bid for information within the rules of the marketplace and the rules of the seller. Signals (or indicators of data that do not disclose the data), and the associated virtual marketplace facilitate the discovery of signals for a use, pricing of signals for a defined use, the creation of agreements for use, the regulatory and consumer permission of use, the transmission and tracking during use, the value created after the use, and for the clearing and settlement based upon observations after the use and under the terms of the agreement.

It is an aspect of this invention to provide methods and systems for providing and for managing access to signals that are controlled by agreements having parameters and rules created by their corresponding signal sellers or signal owners. Still another aspect of the invention is to provide signals access management within a virtual marketplace by which a prospective buyer can gain access to the signals. The present invention provides a mechanism for both the buyers and the sellers to create agreements, exchange information within the terms of agreement, ensure regulatory and consumer approval of use, track the performance of the usage, and settle under the terms of the agreement and the observed use.

In the present invention systems and methods, each data owner controls access to signals associated with the data based upon an agreement for a given use for a given price by a given buyer within the rules and terms of the signal exchange agreement, policy, etc. In systems and methods of the present invention, the data owner controls both the creation of the signal, the location of data from which the signal is created, and who has access to the signal, for a given use, for a given price, within a signal exchange agreement and this agreement's associated rules. The constraints within a signal exchange agreement manage use, price, time, volume, third parties, object identifier translation and other rules are governed by signal access management. According to the present invention, within the signal marketplace, a multitude of agreements are held within a federated data marketplace, each governing the exchange of signals between two or more parties. The agreements within the marketplace are used to manage the access, routing, transformation, security, encryption, receipt, settlement, exceptions, constraints, rules and policies of signal exchange between a multiplicity of buyers, sellers and their approved agents.

Each locally managed signal or indicator requires access management to govern the release of information to a multitude of buyers, which functions as a virtual gatekeeper.

The rules, approved usage, encryption, exceptions, pricing, and constraints are provided within an agreement that is generated and stored in a database associated with at least one server computer within the systems of the present invention. This system control provides for a "ripple effect" that extends through the system via networks into local access control by local computers. In methods of the present invention, each signal owner or seller first creates the parameters and constraints associated with each signal or indicator. Additionally, constraints include data policies and associated form or formats (e.g., German consumer laws or policy may have different restrictions on use which must be accepted by participants when transactions occur within Germany's regulatory purview). At least one policy, constraint, or rule governs each signal based upon the agreement established for the corresponding signal. Thus, each agreement may have multiple policies (policies are separate rule sets that may apply consistently across agreements). Constraints, exceptions, encryption, approved usage and policies are used within various steps of methods according to the present invention, including: signal discovery, signal agreements, signal exchange and signal analytics. For example a policy may to exclude named competitors from perspective buyers, this policy is in place within both the marketplace (which would govern discovery) and within the data or signal sellers locally managed agreement. These policies and constraints restrict the ability for prospective buyers to gain insight of and access to signals (by way of example and not limitation for discovery, use, or pricing) within the federated marketplace.

The present invention further provides for signal or indicator sellers to manage multiple layers of rules and constraints with access management graphic user interfaces (GUIs) which can be located either centrally within the marketplace, or locally within the sellers federated data systems.

The present invention is based upon methods and systems for using, buying and selling distributed data using signals or indicators that represent the data without disclosing the data, and the signal owner managing its proprietary signals. By way of background, creators of signals are the sellers of information. The content of a seller's information based upon an historical interaction with one or more events, objects or activities that correspond to the behavior of a multitude of objects. Sellers of data or information have multiple requests to share their information. Signals or indicators are a mechanism to share derived information without disclosing the raw data. The value of any asset is highly correlated to the price that buyers are willing to pay.

There is a longstanding and unmet need for providing signal management by signal creators (also the signal sellers and/or signal owners) who selectively provide information of interest to signal buyers for defined uses, while protecting the underlying data and maintaining the control of the signal seller through its usage within a network-based, distributed data exchange where economic value of the data, as derived from its use, is the central pricing mechanism within agreements between the sellers and buyers. Nothing in infinite supply can have a price. Data may theoretically have an infinite value, but once it is shared, further dissemination is hard to prevent, thus the value of data quickly diminishes once it is shared. The signals exchange marketplace or federated data marketplace of the present invention creates a virtual market for data within a signal or indicator framework, which protects the underlying data that the signals or indicators represent. This signals metaphor allows each signal or indicator provider/owner/seller the ability to construct, control and price their signals and protect further dissemination of both the signals, as well as the underlying data.

The present invention further includes a method for managing signals by corresponding signal owners in a virtualized or cloud-based computing system for the federated data marketplace including methods steps of: providing a signal index associated with at least one signal corresponding to a behavior of an object and/or an activity and/or an event, wherein the signal index includes a proposed signal value for a predetermined signal use, and wherein the signal index is stored in a memory of a signal owner computer that is constructed and configured for network-based communication with a remote server computer; transmitting the signal index to the remote server computer, which is accessible by distributed signal buyers via the network; delivering signals to the signal buyers; tracking the signals; and monitoring use of the signals for the predetermined signal use by the signal buyers.

Additional steps may include the following: providing a feedback corresponding to the use of the signal, wherein the feedback includes object behavior, or activity, economic measurements, and/or event measurements; automatically adjusting the correlation of the signal(s) based on the feedback; updating the signal index to include the feedback; receiving information from signal buyers confirming receipt of signal, and compliance with the predetermined signal use; automatically correlating the indexed signals to requests of distributed signal buyers.

From the beginning, the signal owner controls how the at least one signal is created, generated and/or constructed; however, for most signals, the at least one signal includes information about object state, activity, behavior recency, behavior frequency, and behavior affinity; and further includes a signal type selected from the group consisting of: state signals, event signals, activity signals, behavior signals, relational signals, location signals, loyalty signals, purchase signals, social signals, and combinations thereof. Significantly, the signal owner has further steps in managing its signals, including: retaining control of signal data within a defined use of the signal by a registered buyer; selectively sharing information with buyers; defining use and an agreement to report on a result of use with a registered buyer or counterparty; releasing signal data to a registered buyer based upon the agreement; monitoring performance of the at least one signal compared with a corresponding objective; generating a unique identifier associated with each signal owner for exchange with the signal buyers; the signal owner limiting signal availability to signal buyers and/or to a signal marketplace based upon a rules engine that enforces limitations by any party in a transaction for the signal(s), wherein the rules engine includes rules regarding: buyer identity, campaign type, signal requested, price, redemption signal type, purchase quantity, past performance of signal, past performance of campaign type, past performance of buyer, and combinations thereof; linking the indexed signals to relational databases; and each signal owner tracking agreements for buying and selling signals.

For the signal owner's management of the signals, preferably each of the signals is indexed in the centralized database based upon ownership, object relevance, behavior relevance, historical usage, performance, and correlation to other signals and data, wherein the value is automatically generated by a remote server computer associated with the remote database, based upon at least two factors associated with the value, and wherein the value includes relevance to a signal buyer and a buyer objective. By way of example and not limitation, the relevance to the signal buyer is based upon at least one objective, with the economic value of the signal based upon the measured performance of at least one signal toward at least one objective by the buyer. Preferably, the at least two factors used for generating a signal value are selected from: predictive accuracy, fidelity, relevance to an objective, near-real-timeliness, frequency, recency, state of an object, relationship of the source of the signal, reputation of the signal, reputation of the seller, affinity to a target, and/or usefulness to an objective. By way of example and not limitation, the relevance of a signal to the signal buyer based upon at least one objective may include marketing and/or advertising. In a non-advertising use, the exchange of data within the data marketplace can also take place between a buyer and a seller, without the participation of other entities such as a publisher, retailer or consumer. For example, a farmer has created data on the average yield of corn per acre during the harvesting of the corn crop. The farmer also has data on the type of corn seed used in the field, and the precipitation (total rainfall) on each acre he manages. A signal buyer seeks the average yield of that farmer's seed by acre, by precipitation. The farmer will sell the data through a signal agreement. The signal agreement will specify the terms by which the signal can be used, price, time, retention and other terms necessary.

The methods for signal management by the signal owner may further include additional steps including: aggregating the signals; creating a new signal or a synthetic signal from one or more signals from at least one source; linking the indexed signals to relational databases, wherein the signals are locally indexed by each signal owner and/or each seller associated with the signals; the virtual marketplace server computer and/or the owners creating and tracking their corresponding indexed signals; updating the remote and centralized indices of signals; and/or tracking agreements for buying and selling signals.

In another embodiment of a method for managing signals by signal owners, the method steps include: constructing at least one signal and saving the signal(s) to a signal owner computer, wherein the signal owner controls how the at least one signal is created, generated and/or constructed and how the at least one signal is used by the buyer; generating a signal index and listing the index in a centralized database; generating a signal value based upon at least two factors associated with each value, the at least two factors selected from the group consisting of: predictive accuracy, fidelity, relevance to an objective, near-real-timeliness, frequency, recency, relationship of the source of the signal, reputation of the signal, reputation of the seller, affinity to a target, usefulness to an objective, and combinations thereof.

Additional steps may further include: automatically updating the listed index and/or creating new listings; receiving a defined use and an agreement to report on a result of use by a registered buyer with the signal owner computer; releasing signal data to a registered buyer based upon the agreement between the signal owner and the registered buyer; monitoring performance of the at least one signal compared with a corresponding objective; the signal seller providing each of the signals with a unique identifier associated with each signal owner/seller for exchange with a buyer via the marketplace; automatically determining a relevance to an objective for the at least one signal based on comparison with consumer feedback and consumer behavior; limiting signal availability based upon a rules engine that automatically considers buyer identity, campaign type, signal requested, price, redemption signal type, purchase quantity, past performance of signal, past performance of campaign type, past performance of buyer, and combinations thereof; automatically correlating how the value of the information decays over time and with respect to relevance to the objective; generating a value of signal relevance to the objective based upon consumer feedback, buyer behavior, and/or consumer reputation; receiving feedback from the buyer regarding qualities of relevance, correlation, and/or strength of the at least one signal; and/or receiving inputs from third party observers that inform the efficacy of signal use and correlation across a multitude of participants and multitude of signal uses.

The present invention system for managing signals by corresponding signal owners in a virtualized or cloud-based computing environment includes the following components and their relationships: a remote server computer constructed and configured for network-based communication with at least one signal owner computer and at least one signal buyer computer; at least one signal associated with a behavior or state of an object and/or an activity and/or an event; a signal index associated with the at least one signal, which is stored in a memory of the signal owner computer; and a proposed signal value for a predetermined signal use corresponding to the at least one signal, thereby delivering signals to the signal buyers, tracking the signals, and monitoring use of the signals for the predetermined signal use by the signal buyers. Additionally, the signals are indexed, abstracted and/or anonymized from their data source to protect the identity of the signal owner. Also, preferably, the remote server computer is constructed and configured to receive inputs via a communications network from third party observers that inform the efficacy of signal use and correlation across a multitude of participants and multitude of signal uses.

In another embodiment of systems for managing signals by signal owners includes engagement or interaction with a signals marketplace in a virtualized computer network for generating signals from distributed data sources controlled by a multiplicity of owners and further includes at least the following components and their relationships with each other: a remote server computer constructed and configured in network-based communication with a centralized database further comprising at least one index for signals data, and operable to automatically generate an assigned value corresponding to each unique signal created by a signal seller within a remote index of signals data; wherein the remote indexed signals data are generated from remote structured and unstructured data. receiving at least one signal from a first data source and at least one signal from a second data source, wherein the marketplace registers remote signals, which originate from different distributed data sources controlled by different owners into a centralized database or signals index; wherein each of the registered signals has a corresponding assigned value stored in the central database and associated with its indexed corresponding remote signal; and, wherein each assigned value is based on at least two factors is dependent upon a signal source value and a buyer objective. Preferably, the signals marketplace system automatically recommends signals, and the price for a given usage for both signal buyers signal sellers or signal owners. Additionally or alternatively, the recommended pricing is automatically generated based upon a number of factors, including relevance to an objective, fidelity, near-real-timeliness or recency, affinity, predictive accuracy, and combinations thereof, and/or is negotiated in a bid-response exchange between the owners and buyers.

In the virtual marketplace, purchases of the owners' signals are tracked by the owners or sellers, within the remote server computer, and in the signals marketplace, which automatically tracks the signals data through its function of transferring signal information between buyer and seller within active agreements, and monitoring feedback on signal performance through observation of events, behaviors, environment and states of objects and objectives. The marketplace uses this feedback to update directories, indices, pricing, history, agreements, and correlations to an objective. Preferably, the signals marketplace centralized server computer automatically tracks and manages signal and participant reputation for communication to other marketplace participants. The signals and their corresponding owners, as well as buyers, brokers, publishers, observers and other participants are registered and registration information is stored in the centralized database associated with the virtual marketplace remote server computer, and the registration information is stored in a shared directory associated with the centralized database.

The present invention also provides an embodiment including a method for creating and using a virtual marketplace for valuing and selling signals generated from distributed data sources that are controlled by a multiplicity of owners, the method steps including: providing at least one signal from a first data source and at least one signal from a second data source to a remote server computer for a signal marketplace or exchange; wherein the signals originate from different distributed data sources controlled by different owners and the signals are indexed and listed in a centralized database and each of the indexed signals is linked to corresponding relational databases; and, wherein a value for each centralized indexed signal is automatically generated by the remote server computer associated with the seller where terms of use have been agreed. The value of the signals is controlled by the seller and based upon at least two factors associated with each value, the at least two factors selected from the group consisting of: event, object state, change in state, behavior of an object, relationship to another object, relationship to a behavior, economic indicators, relevance to an objective, near-real-timeliness, frequency, recency, predictive accuracy, fidelity, reputation of the signal, reputation of the seller, affinity to a target, usefulness to an objective, and combinations thereof. Also, in this method embodiment, as with the systems of the present invention, the marketplace provides for participation and compensation of other parties that observe object behavior, object state or are otherwise capable of providing feedback signals corresponding to a state, behavior, activity, and/or an event. This observer feedback informs the agreements, economic value of the signals, object preferences, calculated correlation of signal information, environmental projections and other marketplace functions. The economic value of the observation can be calculated by the marketplace, and these observation feedback signals can be indexed and purchased within the marketplace. Advantageously, the listed index provides for automated matching with buyer candidates having corresponding objectives for buying signals and signals data, and wherein the objectives include consumer state, events and behavior(s). Additional method steps include: the step of automatically updating the listed index and/or creating new listings; receiving a defined use and an agreement to report on a result of use by a registered buyer with the server computer; releasing signal data to a registered buyer based upon the agreement between the signal owner and the registered buyer; monitoring performance of the at least one signal compared with a corresponding objective; automatically determining a relevance to an objective for the at least one signal based on comparison with consumer feedback and consumer behavior; and/or limiting signal availability based upon a rules engine that automatically considers buyer agreement, identity, campaign type, signal requested, price, redemption signal type, purchase quantity, past performance of signal, past performance of campaign type, past performance of buyer; automatically correlating how the value of the information decays over time and with respect to relevance to the objective; and combinations thereof.

According to the present invention, the signal owner controls how the at least one signal is created, generated and/or constructed and how the at least one signal is used by the buyer. To facilitate the virtual marketplace or exchange between signal sellers and signal buyers, preferably the at least one signal includes a signal type selected from the group consisting of: event signals, activity signals, behavior signals, performance signals, relational signals, location signals, loyalty signals, purchase signals, social signals, and combinations thereof.

Methods of the present invention further include the step of generating a value of signal relevant to an objective based upon consumer feedback, consumer behavior and/or consumer reputation; and, more particularly, wherein the value of the at least one signal depends upon the time of the at least one signal from an event occurrence, and wherein the value of the at least one signal decays over time. Also, the methods include the step of automatically correlating how the value of the information decays over time and with respect to relevance to the objective.

Preferably, the virtual marketplace or exchange server computer receives feedback from the buyers and observers regarding qualities of relevance, correlation, and/or strength of each of the at least one signal. In preferred embodiments of the present invention, a signal quality and a signal reputation are automatically generated by the virtual marketplace based upon an assessment of signal performance compared with an objective and/or based on the feedback received.

The present invention including signals management within the context of a virtual data marketplace for signals is built on the framework of creating signals or indicators by their corresponding signal owners or signal sellers, the method steps performed by a signal owner include: constructing at least one signal associated with a behavior of an object and/or an activity and/or an event associated with the object in a signal owner computer that is constructed and configured for network-based communication with a remote server computer, wherein the at least one signal based upon at least two factors associated with each value, the at least two factors selected from the group consisting of: event, object state, change in state, behavior of an object, relationship to another object, relationship to a behavior, economic indicators, relevance to an objective, near-real-timeliness, frequency, recency, predictive accuracy, fidelity, reputation of the signal, reputation of the seller, affinity to a target, usefulness to an objective, and combinations thereof; creating agreement terms for managing access to the at least one signal; generating a first value for each of the at least one signal; and tracking usage of the at least one signal. Also, the at least one signal provides a feedback corresponding to the behavior, state, activity, and/or the event. Additional steps include indexing the at least one signal; listing the indexed signals in a remote database associated with the remote server computer; communicating the remote index signal to the centralized data marketplace signal index, wherein the centralized signal index listing provides for automated matching with buyer candidates having corresponding objectives for buying signals and signals data, wherein the objectives include consumer behavior(s); and updating the listing of the indexed signals by the signal seller or signal owner. The methods and systems of the present invention provide for automated signals access management with the agreement terms adopted by both signal buyers and signal sellers; the agreement governs the exchange of signals for all participants in the signal marketplace.

The at least one signal includes a signal type selected from the group consisting of: event signals, activity signals, behavior signals, relational signals, location signals, loyalty signals, purchase signals, social signals, and combinations thereof. Signals are generated or constructed from both structured and unstructured data. Significantly, each signal owner controls how the at least one signal is created, generated and/or constructed; in embodiments of the present invention, methods of the present invention provide steps wherein signals or indicators are created by the signal owner transforming its own data into the signals or indicators through steps of automatically organizing structured data and unstructured data by a correlation engine. In constructing the at least one signal or indicator, preferably the signal seller (or its system and seller correlation engine) automatically determines a relevance to an objective from historical performance and including external observations and feedback on object state, activity or behavior.

While the definition and construction of the signal is at the discretion of the Seller, generally signals conform to a common signal structure whose elements are named and formatted to marketplace conventions for the purpose of creating a common taxonomy for exchange of signal information. In the case of a signal exchange within a signals marketplace, but also for exchange outside of a marketplace, the signal structure provides for secure and reliable transportation and translation of an information payload contained with a signal. The signal construct defines the source, the destination, the delivery channel, the method for securing the data, the agreement under which the data is exchanged, a transaction identifier, a transaction time, information necessary to confirm receipt, template which describes the message type, and the payload of the message. Sellers and buyers use the signals construct to create, register, publish, discover, assess, sell, manage, and measure data exchange according to the systems and methods of the present invention. Signal types include both buyer-initiated and seller-initiated signals; some examples follow for illustration purposes, but are not intended to limit the claimed invention thereto.

Buyer Initiated Behavior Signal (BIBS). Behavior signals are published by sellers which observe object behavior. For a given buyer initiated behavior signal, the buyer of a behavior signal requests behavior signal from seller for a given event, object or category of objects. The content of the seller's signal is based upon an historical interaction with one or more events, objects or activities that correspond to the behavior of an object. To obtain the seller's signal, the buyer must provide a reference point for the seller to create the behavior signal. In this model it is the request of the buyer triggers the exchange of data. For a given reference point, the seller's signal describes a behavior such and such information as the recency and the frequency of the behavior. By way of example and not limitation, a behavior name is illustrated by "Travel-To [Variable]". The buyer initiates the request and seeds the reference point variable for the signal. Each buyer could pay a different price depending on the value they derive from the signal.

Buyer Initiated Event Signal (BIES). Event signals are published by sellers which observe events. For a given buyer initiated event signal, the buyer of an event signal requests objects, or categories of objects from seller that have a relationship to a given event. The content of the seller's signal is based upon an historical interaction with one or more events, objects or activities that correspond to an event. To obtain the seller's signal, the buyer must provide a reference point for the seller to create the event signal. In this model it is the request of the buyer triggers the exchange of data. A signal request is initiated by the buyer asking the seller if a given reference event has occurred. The signal response can contain information on the event, objects within the event, recency, frequency, location, as well as specifics surrounding the event. By way of example and not limitation, consider "movie purchases in Cincinnati Ohio in last five minutes" as a signal request of this type. Each buyer could pay a different price depending on the value they derive from the signal.

Seller Initiated Behavior Signal (SIBS). In this case the seller is initiating (or publishing) that a behavior has occurred. The content of the seller's signal is based upon a current or historical interaction with one or more events, objects or activities which correspond to the behavior of an object. The signals can be published to one or more buyers, and prospective buyers as the activity occurs. Each buyer could pay a different price depending on the value they derive from the signal. By way of example and not limitation, consider "consumer [CONSUMER_NAME] is shopping in [Location]" as a signal.

Seller Initiated Event Signal (SIES). Seller is publishing an event to one or more buyers. The content of the seller's signal is based upon a current or historical interaction with one or more events, objects or activities, which correspond to the behavior of an object. From a software design perspective, this model is consistent with software based publish/subscribe paradigm. Within commerce signals buyers "subscribe" to an event made known by the seller. Each buyer could pay a different price depending on the value they derive from the signal. The seller initiates the signal, and can communicate specifics about the event. By way of example and not limitation, consider "consumer [CONSUMER_NAME] purchased movie ticket" as a signal.

The signals may be directly derived, constructed, or generated from signal owner raw data and/or synthetic signals may be constructed from at least one signal or a multiplicity of signals, i.e., one or more signals are used to construct additional signals, so the synthetic signals are not directly associated with the underlying raw data. Once again, signals or indicators according to the present invention are generated or constructed from both structured and unstructured data of the signal owner. Similarly, a consensus signal or a generalized signal from one or more signals. Note that the method steps of the present invention are made for a multiplicity of signals and corresponding signal owners, in particular in the case of distribution in the context of a virtual marketplace or exchange for signals.

Preferably, after constructing signals, their distribution or sale to buyers is controlled by the signal owner and rules governing seller signals or owner signals that provide for limiting signal availability based upon a rules engine that automatically considers buyer identity, campaign type, signal requested, price, redemption signal type, purchase quantity, past performance of signal, past performance of campaign type, past performance of buyer, and combinations thereof. The rules engine resides within a remote computer of the signal seller and is communicated through a distributed network, either directly and/or within a virtual marketplace having a centralized rules engine governing the management of the exchange of signals for a multiplicity of signal sellers and signal buyers.

Signal value cannot be established conclusively independently of a signal buyer's objective. Additionally, the value of any of the signals depends upon signal relevance to the objective based upon a multiplicity of factors, including feedback such as time from last observation and/or interaction, effectiveness of consumer interaction, depth of interaction, consumer feedback, buyer behavior, and/or consumer reputation. The signal seller correlation engines provide options for automatically correlating how the signals or indicators relate to data held within the signal seller to data external to the signal seller. The present invention also provides an embodiment including a method for adjusting the correlation of data with time and with respect to relevance to the objective(s) of buyers. Significantly, regardless of the objectives, generally the value of the signal(s) depends upon the time of the signal construction from an event occurrence, wherein the value of the signal decays over time. Also, the present invention provides for the economic value of the signal to decay over time. By way of example and not limitation, consider a signal "Consumer [ID] Purchased Movie Ticket at TIME". This signal has relevance to a buyer's objective, which is dependent on time since the observation. In other words, a signal has a higher relevance if it is one second old, and a lesser relevance as time progresses. The economic value of a signal is in proportion to its relevance; hence the value of the signal is also higher if the signal is one second old, and a lesser value as time progresses.

Feedback is a form of signal sourced from observers of objects. Observers typically have no need to maintain historical information, but rather report on current object state or activity. By way of example and not limitation, consider a Wi-Fi hotspot at LOCATION that has a current request for access from COMPUTER_ID. If the objective of a signal buyer was for COMPUTER_ID presence at LOCATION, then this observation is relevant to the buyer. Furthermore, the process of receiving feedback from observers, pertaining to object state, activity, performance and behavior, provides a mechanism to assess and adjust performance of marketplace participants, marketplace systems, signals and campaigns operating within a federated data marketplace. And so evolving the at least one signal based upon the feedback received is an additional step in methods of the present invention. Additionally, a signal quality and a signal reputation is automatically generated (by the correlation engine of the signal seller and/or by the signal marketplace or signal exchange) based upon an assessment of signal feedback. The signal feedback may provide information useful for evaluating performance of the signal compared with the buyer's objectives; the virtual marketplace will determine what feedback is relevant toward any objective. By way of example, a correlation engine is described within U.S. Pat. No. 5,504,839 for "Processor and processing element for use in a neural network" by inventor Mobus, filed Aug. 29, 1994, which is incorporated herein by reference in its entirety.

The present invention provides methods for creating signals or indicators by corresponding signal owners, the method steps performed by a signal owner includes: constructing at least one signal associated with a behavior of an object and/or an activity and/or an event associated with the object in a signal owner computer that is constructed and configured for network-based communication with a remote server computer, wherein the value of the signals is controlled by the seller and based upon at least two factors associated with each value, the at least two factors selected from the group consisting of: event, object state, change in state, behavior of an object, relationship to another object, relationship to a behavior, economic indicators, relevance to an objective, near-real-timeliness, frequency, recency, predictive accuracy, fidelity, reputation of the signal, reputation of the seller, affinity to a target, usefulness to an objective, and combinations thereof; generating a first value for each of the at least one signal; and tracking usage of the at least one signal. Also, the at least one signal provides a feedback corresponding to the behavior, activity, and/or the event. Additional steps include indexing the at least one signal; listing the indexed signals in a remote database associated with the remote server computer, communicating the remote index to the centralized data marketplace signal index, wherein the centralized signal index listing provides for automated matching with buyer candidates having corresponding objectives for buying signals and signals data, wherein the objectives include consumer behavior(s), events, object states, object performance; and updating the listing of the remote and centralized indices by the signal seller or signal owner.

The content of the seller's signal is based upon the seller's interaction with one or more events, objects or activities. Signals are generated or constructed from both structured and unstructured data, which contain records of interaction. Significantly, each signal owner controls how the at least one signal is created, generated and/or constructed; in embodiments of the present invention, methods of the present invention provide steps wherein signals or indicators are created by the signal owner transforming its own data into the signals or indicators through steps of automatically organizing structured data and unstructured data by a correlation engine. While the definition and construction of the signal is at the discretion of the Seller, generally signals conform to a common signal structure whose elements are named and formatted to marketplace conventions for the purpose of creating a common taxonomy for publishing, discover and exchange of signal information. By way of example and not limitation, the taxonomy of the at least one signal includes a signal type selected from the group consisting of: state signals, event signals, activity signals, behavior signals, relational signals, location signals, loyalty signals, purchase signals, social signals, and combinations thereof.

The present invention provides for the signal owner selectively sharing signals information with signal buyers in a virtual marketplace or exchange, wherein the signals information includes a unique identifier associating each signal transmitted by an owner and/or signal seller for exchange with a signal buyer and/or signal data marketplace and agreement within which the data exchange was governed. Preferably, the information shared provides privacy protection for the signal owner. Furthermore, each signal includes and defines the source, the destination, the delivery channel, the method for securing the data, the agreement under which the data is exchanged, a transaction identifier, a transaction time, information necessary to confirm receipt, template which describes the message type, and the payload of the message. In any case, the signals or indicators constructed by the signal seller (signal owner) provide the seller with a mechanism to protect the underlying data from which the signals or indicators are derived. Also, in preferred embodiments, additional privacy protection may be provided by at least one of: screening, anonymizing, and/or using hashed values. For example, with hashed values, methods provide for matching credit card objects with MD5 hash of a credit card number allowing signal sellers to identify behavior on the match of hash values versus the match of actual credit card numbers; importantly the MD5 hash cannot be easily reversed (except by the NSA). Both entities or parties to the transaction are doing consistent hash, but neither one disclose a number. The same methods and systems are used with email hash; it confirms the match, but only discloses the encrypted information.

Systems and methods of the present invention provide for releasing signal data to a registered buyer based upon an agreement between the signal owner and the registered buyer. Before an agreement is generated, the signal seller retains control of the signal data until after receiving a defined use by a registered buyer, which provides one of the key terms for the agreement. Preferably, the agreement also provides requirements for feedback and/or measurement of objective, such as by way of example and not limitation, to report on a result of use by a registered buyer. Also, the release of the signal data is can be either based upon an observance by the seller or by a request of the buyer. In another embodiment, the release of signal data is based upon a trigger. Preferably, the release of signal data or signals to registered buyer(s) is automatic based upon detection of the trigger.

The systems and methods of the present invention for signals management also provide for automatically confirming receipt of the at least one signal by a destination or signal buyer(s); this step is achieved by automated messaging generated from the buyer computer and communicated automatically through the network to the seller computer directly and/or to the signal marketplace server computer for tracking of all signals distribution based upon unique signal identifiers and the agreements between signal sellers and signal buyers for predetermined uses of the signals.

As set forth in the foregoing, the construction of signals is provided for use between signal sellers and signal buyers via the virtual marketplace through a network for communication between their distributed computers and a remote server computer associated with the virtual marketplace for signals data. The present invention further provides methods and systems for establishing and using a virtual marketplace for value-based exchange of those constructed signals, wherein the value of the signals is determined in the context of willing signal buyers and signal sellers for the signals. The signals of the present invention are derived from data sources that are owned by a multiplicity of entities and/or individuals, and the signals are abstracted from distributed information and data associated with the multiplicity of entities and/or individuals to protect the underlying information and data. Each entity or individual that sells signals data in the virtual marketplace first converts or transforms their unique raw data (or underlying data) into a "signal" or signals, which are indicators associated with object behavior as observed by their respective owners. The value of any signal cannot be determined separate from one or more buyers, their objectives, and the corresponding use of the signals toward those objectives. Signal sellers create and define rules in which to sell signals. Rules can be based upon requestor, usage, object, behavior, performance, reputation or any other attribute available in the market. By way of example and not limitation, Barclays Bank will only allow consumer travel signals to be used by approved vendors and with explicit consumer permission for hotel reservation use. Buyers have the opportunity to request access to signals within the rules of the marketplace seller, consumer and other regulatory authority. Sellers may choose to accept requests within the terms of an agreement, which is maintained in the marketplace or directly between the 2 parties. In the case of a signals marketplace or exchange for the signals, the marketplace centralized server computer retains the information on the agreement, signal requests, signal exchanges, feedback, historical data, buyer, seller, seller reputation, signal reputation, price, effectiveness, rules, constraints, and combinations thereof.

According to the present invention, signal creators (signal sellers) or signal owners retain control of their respective data and the signals constructed therefrom, until a registered buyer defines use of the signals, agrees to report on result (by way of example and not limitation, reports on effectiveness for a given use) and other terms, and an agreement is created between buyer and seller. This method for creating and using signals or indicators establishes control, value, and price for those signals between the signal seller and signal buyer(s), and/or the signal sellers and signal buyers who are the participants in a virtual marketplace or signals exchange. The signal supplier or signal seller (or signal owner) controls how each signal is constructed or generated; the underlying data or information owned by the signal seller may be reconstructed or regenerated into more than one signal for use by third parties for different purposes. Marketplace rules govern construction, transmission and tracking of signal information and the associated object throughout their defined use; this allows signals to be correlated to object behavior. Tying signal performance to object behavior and object events subsequently provides for measurement of value and subsequent market based pricing of signals within the virtual marketplace. Object behavior may take the form of feedback from parties, which are external to any given agreement between buyer and seller. This object behavior obtained from external third party observers inform and correct the correlation of signals to objects and behavior within the marketplace. Importantly this correlation is external to information available to either buyer or seller independently. Third party observers thus participate in the marketplace to provide feedback on objects, which may be covered within a multitude of agreements between a multitude of sellers and buyers. Thus the present invention, provides for the interaction of third party observers across the entire marketplace participants. The signal construct defines the source, the destination, the delivery channel, the method for securing the data, the agreement under which the data is exchanged, a transaction identifier, a transaction time, information necessary to confirm receipt, template which describes the message type, and the payload of the message. The construction of a signal by a signal seller will have varying degrees of relevance to any given signal buyer and that buyer's objective, thus the value of the information and data, as well as the signals generated therefrom, will vary with its correlation and fidelity. This provides a natural feedback loop in the virtual marketplace or exchange. Signals that have poor fidelity or poor correlation with an objective will have poor performance, and thus a correspondingly poor price.

Signal sellers have minimal insight into prospective buyers, and the value of their signals in any given context. Visibility is further limited into competing data. For example, if an advertiser intends to sell hotels to frequent travelers of a predetermined destination, they have the choice of seeking information from flight records, geo location, rental car records, credit card issuers, etc., and combinations thereof. Buyers of information also have interests to optimize price for a given performance or quality of correlation. If a signal buyer could obtain geographic location information for $0.05 with a 70% correlation, it may well be a preferred purchase to flight records, which cost $5.00 and have a 100% correlation. Within a signals advertising application embodiment, the signal marketplace assumes the primary role in directing and optimizing the purchase of signals for targeted advertising, including campaigns across multiple prospective sources, to determine which signals (if any) have relevance to a given advertising campaign, and providing both buyers and sellers with a liquid market in which to exchange, and protect, information, while providing and purchasing use of the signals within the marketplace or exchange. Significantly, a category of signals that represents real time or near real time activity, events, states and behavior have values that decay quickly with time. In this instance a signal that represents an object's activity one second ago has a greater value than the same signal that is one hour old. The signals marketplace enables the transmission of these real-time signals within the rules and constraints of the participants, consumers, marketplace and regulatory authorities.

Furthermore, the marketplace for signals includes a signals index for discovery, tracking and comparing signals and their historical value, reputation and performance. Categories or groups of signals by type, behavior, seller, and usage are also provided. By way of example and not limitation, signals include an expression of frequency and relevance toward an input variable (e.g., affinity to a city, type of food, automobiles, sports, etc.). Also, signals responses are based upon the object identifier which the seller uses internally to uniquely identify a given object. By way of example and not limitation, internally held object identifiers include encrypted forms of e-mail address, phone number, location, loyalty card number, etc. Correlation between signals and their performance is represented by the signal pricing and trading (buying/selling) within the virtual marketplace, third party observers, and/or directly between signal sellers and signal buyers. Additionally, initial rating for expected correlation between signals and their performance is provided by the seller. A new signal will have no historical performance and thus buyers will likely minimize their purchase until the performance can be validated.

In the embodiment having a signals marketplace or exchange, the centralized server computer associated with the signals marketplace maintains a master directory of signals and associated correlations in order to facilitate automated signal seller to signal buyer matching. Historical performance of a signal, signal seller and third party observer information may be used to correlate between signals based upon buyer and usage. Additionally, initial rating for expected correlation between signals and their performance is provided by the seller. A new signal will have no historical performance and thus buyers may likely minimize their purchase or until the performance can be validated.

As illustrated in FIG. 1, the flow diagram indicates signal construction or generation method steps. As illustrated in the FIG. 1, the system provides data mining 364 on the unstructured data and data mapping 366 on the structured data. Signals are based on structured 380 and unstructured 370 data. The content of the seller's signal is based upon an historical interaction with one or more events, objects or activities that correspond to the behavior of an object. To obtain the seller's signal, the buyer must provide a reference point for the seller to create a signal. For example, a signal of AFFINITY_TO_CITY may require input of ID, and CITY_NAME. A plane, a phone, a consumer, a computer could all have an affinity to a city. Similarly a phone company, an airline, a rental car company, a bank, a search engine, a restaurant, or similar entity could all have a set of data that would inform the affinity toward a city. The signal seller has multiple options when constructing a signal of "AFFINITY_TO_CITY", sellers could use consumer billing records, flight records, payment records, location records, in sourcing data for to respond to this request. In order to protect consumer information, the signal seller may use any source of information in constructing a response and a signal response is typically normalized to be between 0 and 1, or otherwise created in a way to abstract the underlying data in a way that makes the signal relevant to a specific request. For example, an airline may use flight information to determine that a consumer has traveled to NYC five times in the last year and has set AFFINITY_TO_CITY for New York equal to 0.5. The value of this information is completely dependent on its quantity, accuracy, recency, competing information sources, price and intended use. The marketplace 250 informs the rules and pricing engine 320 of relevant information to set price.

Signal sellers have control over how they sell their signals data within the rules engine 320. These rules can be constructed based on any marketplace attribute. For example, if United Airlines bought signals data within the signal marketplace, or directly from signals seller(s), and receives a response from a signals data seller that is a competing airline for a particular traveler, United Airlines could surmise the this particular traveler uses the competing airline for travel to that city and could thus directly market to the that consumer. In one embodiment of the present invention, the signals data seller rules engine 320 is within the control and ownership of each signal seller. In this case, the marketplace data is not held centrally; significantly, raw data, signal construction, signal indexing, signal rules, and signal indexing are managed remotely across each data exchange participant. Each participant leverages a common taxonomy for constructing signals, which provides for remote discovery in remote indexes, or centrally when remote indexes are combined or transferred to the common centralized server computer for the signals market. Significantly, this federated model provides for control of the data by the owner, allowing the marketplace to establish linkage to federated data owners, with each data owner in control of rules and parameters for the release of information to approved buyers; allowing the centralized market to manage rules during the exchange and provide for clearing and settlement of federated data (signals) for multiple participants and/or multiple federated data sources which act in concert toward a common objectives, with each participant paid based upon value delivered, observed externally or price agreed to.

By way of example and not limitation, the signal marketplace rules include registration of participants, construction of signals, management of agreements, enforcement of rules, destruction and safeguarding of data, purchase of signals, use of signals, tracking of signal performance, clearing and settlement, marketplace history, tracking reputation of signals and all participants, involvement of indirect specialists and agents, dispute process, participant responsibilities, and other significant areas. Given that the price of signals is unknown to any given buyer, the prospective buyer must first issue a request for the signal combined with an offer or request for quote to a signal seller. The request for quote contains information necessary for the seller to determine price and establish bid-response communication protocol. Sellers respond with a request for quote (RFQ) response or no response. If there is an RFQ response it can include acceptance or alternate terms. Upon receiving the RFQ response the buyer may propose alternate terms until an acceptance is issued by the seller via the network-based communications between distributed computing devices. Upon receiving the accepted RFQ message from the seller, the buyer issues a binding purchase confirmation after which the seller confirms receipt and respond with the delivery of the signal(s) in the timeframe specified. Signals can be transmitted in any volume defined within the purchase confirmation. By way of example and not limitation signal pricing can consist of both fixed price and price based upon an objective measured within the marketplace. The marketplace embodying the invention provides an anonymous trading system having a communicating network for transmitting electronic messages between distributed computers of signal sellers and signal buyers. A plurality of order input devices such as buyer and seller terminals are connected to the communication network. Each signal order device may generate price quotation messages, which include bid and/or offer prices and may communicate estimated price and analytics information to a buyer, or work with a central marketplace for order matching. A plurality of seller rules and pricing engines are connected to the network, to discover data, optimize purchases, and match bids and offers. Exchange of signals information can be accomplished in a locally managed agreement with a buyer outside of the marketplace. Or within marketplace which serves as the central clearing and settlement system for the execution of contracts and exchange of signals, during which history and transaction records are maintained. Within an advertising use of signals, at least one of party within the transaction is a publisher 400 (illustrated in FIG. 2), which is responsible for communicating with one or more consumers. The use of signal information, or activity by the publisher which was the result of signal information is tracked separately by the seller, the buyer and the marketplace. By way of example and not limitation, a grocery store X is a signal seller of men's shaving preferences, with Proctor and Gamble's Gillette as the signal buyer, in an advertising campaign managed by Ogilvy and Mather, and published in Facebook. Olgivy and Mather request signals from Store X Affinity to a competitor Schick for use to promote Gillette. Store X enters into an agreement to sell the shaving signal and responds to requests for any given consumer AFFINITY TO SCHICK [Value, Frequency, Recency] for each consumer. This signal data is combined with other data within the campaign manager and an offer is sent to each targeted consumer. Each offer contains a unique code or identifier, tying it to the campaign and to the signals usage. The signals used within the campaign can be tracked for each offer published, and for Consumers who redeem the offer with the unique code or identifier.

Trackable behaviors are defined within the marketplace and may include by way of example and not limitation: purchase with one time use code, purchase with credit card, location, registration, viewing of a web site, opening of email, phone call or viewing of a television show or commercial. Marketplace rules require participants to record defined behaviors and object identifiers, which are correlated to a signal, object, event or behavior. By way of example and not limitation, an objective behavior for an automotive advertiser is consumer presence in an automotive show room. The automotive show room has a Wi-Fi hot spot which identifies devices which are present. The Wi-Fi hotspot is a signal provider. The presence signal for any given device identified by the Wi-Fi provider is of value to the campaign manager. Hence the Wi-Fi provider sells data to the automotive campaign manager.

Within the signals marketplace or virtual marketplace or exchange, signals from multiple sources can be combined to identify objects. Similarly, object correlation to other objects, object correlation to behaviors, object correlation to events, object correlation to states, are tracked so that the marketplace requests will match corresponding data. By way of example and not limitation, objects such as: a person, a car, and a computer can all be correlated. Each of these objects can also have behaviors that can be correlated using a correlation engine, which may be provided in the centralized server computer or distributed among computers in communication over a network.

By way of example and not limitation if the signal AFFINITY_TO_CITY (New York) was combined with AFFINITY_TO_THEATER the target audience of likely Broadway ticket purchasers could be developed. A statistical engine within the marketplace cross correlates signal performance for any given objective. The statistical engine assesses the performance of signals both in isolated and combined usage, thus retaining the ability to assess value for a single signal within the marketplace and its participants. In addition to combining signals, the marketplace statistical engine also includes random samples of other signals. Thus, signal sellers are required to support analytics driven requests for their signals data to assess the cross correlation of signals. In this way the marketplace may make automated suggestions of alternate data sources which may improve price-performance of a given objectives.

Figure 2:
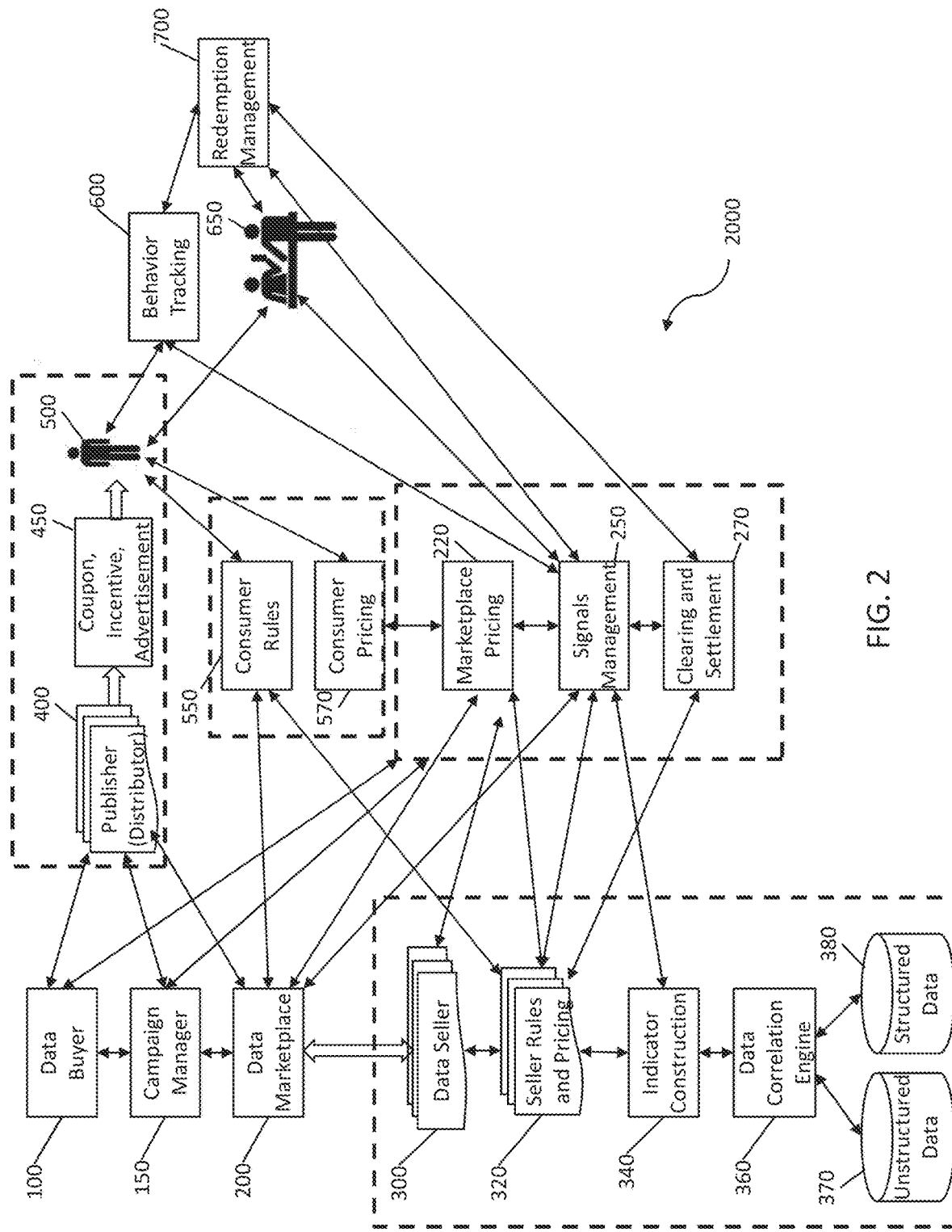
FIG. 2 is a schematic diagram of an embodiment of the invention.

As illustrated in FIG. 2, the schematic diagram illustrates components within a signal marketplace and/or exchange of signals between signal sellers and signal buyers, and methods or processes associated with their interaction.

Federated Data Centralized Intelligence. With any given seller, correlations can be held remotely with object behavior and state estimated from both internal and external data. Significantly, this remote data correlation is shared with the centralized marketplace to assist with buyer discovery and object feedback. This approach allows each signal seller to control their data within their own environment, and perform analysis locally to provide a standardized result set to data buyers. This standardized result set provides security to the owner of the data as to not allow unapproved usage and further dissemination. The result set and marketplace allow for the tracking of the benefit that this signal or indicator provided to a given objective (example: marketing campaign). It also allows the seller to control the price of the response based upon the benefit to which it provides, understanding that it will provide different benefits to different buyers and different usages.

The computer-implemented method for indexing distributed data in a distributed data network in which file metadata and signal types related to unique keys are temporarily centralized within a marketplace. The method of invention calls for assigning and using a unique key to identify signals, which correlates to the key and returns it to the marketplace where it can be combined with other data sources. A key-value store built up in rows for the marketplace metadata, and updated by each node through response and direct participant edits. Each of the rows has a composite row key and a row value pair, also referred to herein as key-value pair.

Also, as illustrated in the figures, in particular in FIG. 1 and FIG. 2, a method of construction of signals/indicators directly between signal sellers and signal buyers and/or within a data marketplace to express: event, object state, change in state, behavior of an object, relationship to another object, relationship to a behavior, economic indicators, relevance to an objective, near-real-timeliness, frequency, recency, predictive accuracy, fidelity, reputation of the signal, reputation of the seller, affinity to a target, usefulness to an objective, and combinations thereof of a given input value is illustrated (generally referenced 2000 in FIG. 2), including the following:

Pricing signals data (signals) within a market of buyers and sellers based upon performance of indicators toward an objective.

A self-organizing network for construction and exchange of signal information between signal sellers and signal buyers.

A method of using data indicators from one or more sources each source priced separately within a data marketplace to target consumers in campaigns operating through one or more advertising publishers. (Advertiser 100, Campaign Manager 150, Signal Data Marketplace 200, Marketplace Analytics 250, Publisher (Distributor) 400), in particular for campaign management, which may further include consumer 500 permissions including Consumer Rules 550 and Consumer Pricing 570, and other Seller-based components 300, including Seller Rules and Pricing 320, Signal or Indicator Construction 340, Seller Data Correlation Engine 360, Seller Unstructured Data 370, and Seller Structured Data 380).

The present invention systems and methods may further include the following: Performance based advertising within a signal data marketplace 200 with publishing targeted and traceable advertising based upon information sourced from the signals marketplace or exchange. Examples of traceable advertising include one-time use codes, coupons, discounts, loyalty, mobile application behavior, location, digitally stored incentives, and combinations thereof 450.

Registration of signal providers (data sellers) in a shared directory 200-300.

Registration of signal types offered by signals providers in a shared directory 300, 320, 340, 360.

Registration and participation of advertisers (signal buyers) in a signals marketplace or exchange 100, 150, 200.

Registration and participation of content distributors in a signals marketplace or exchange 400, 200.

Registration and participation of consumers in a signals marketplace or exchange 500-550, 200.

Method of governing exchange of consumer information within a data marketplace that is dependent on consumer permission and consumer defined fees 550-200.

Rules governing the exchange of signals in a marketplace 200.

Creation of advertising campaigns using distributed signals, i.e., wherein the signals are provided from different sources.

Method of automated signal selection within a data marketplace, based upon signal price performance and relevance.

The Method of communicating signal performance and pricing information within a marketplace (marketplace analytics 250).

The method of purchasing remote signals via dynamic pricing in a bid/response within a federated marketplace 220.

Method of tracking the performance of federated indicators/signals within a data marketplace, based upon behavior (e.g., web site visit), location, card transaction information, redemption codes, loyalty cards or other external object observations, and events.

Method of pricing indicators within a data marketplace based upon behavior 600 web site visit, social sharing, location, card transaction information 650, redemption codes, and loyalty cards, as illustrated in FIG. 2.

Method of settling payment between buyer and seller 700, 320, 270, 150, 100 based upon redemption, coupon, one time code, payment, location, registration or other purchase information to confirm consumer behavior within a distributed data marketplace.

Identification of consumer marketing channel preference through signal availability, point of sale purchase information and other redemption information.

Use of consumer location information to inform effectiveness of advertising within a signals marketplace.

Use of encrypted credit card to confirm purchase within an advertising campaign in a federated signals marketplace.

Use of encrypted credit card information to inform object behavior for multiple buyers in a federated marketplace.

Use of encrypted consumer ID within retailer purchase history to confirm purchase within a signals based advertising campaign Technical interaction and message exchange between signal buyers and sellers.

Process of exchanging requested purchase of data from a data provider within a data marketplace.

Statistical method for optimizing signal selection for advertising campaigns operating with a signals marketplace or exchange.

Statistical method for optimizing advertising distribution channel based upon signal information held by a multitude of participants in a federated signals marketplace.

Method of defining campaign types supported by signal marketplace. Campaigns can begin with target or campaigns can be managed by distributor in a bid for consumer access by competing campaigns.

Protection of consumer information in shared signals, and further including steps for protecting consumer anonymity in the exchange of signal information.

Clearing and settlement of signal exchange between participants in a marketplace based upon signal purchase agreements and signal performance information.

Method restraining signal exchange through rules based upon local laws of each transaction participant.

Method of selling indicators through marketplace agreements with price based upon advertising performance.

Method of Sharing revenue for consumer purchases with signal providers based upon measured object behavior, events, object states, or object performance 600.

Method of Settlement of financial obligations in a data marketplace which may include unique signal identifiers, signal agreements, consumer behavior, consumer payment, seller flat fees, seller performance fees, and consumer revenue sharing 270.

Figure 3:
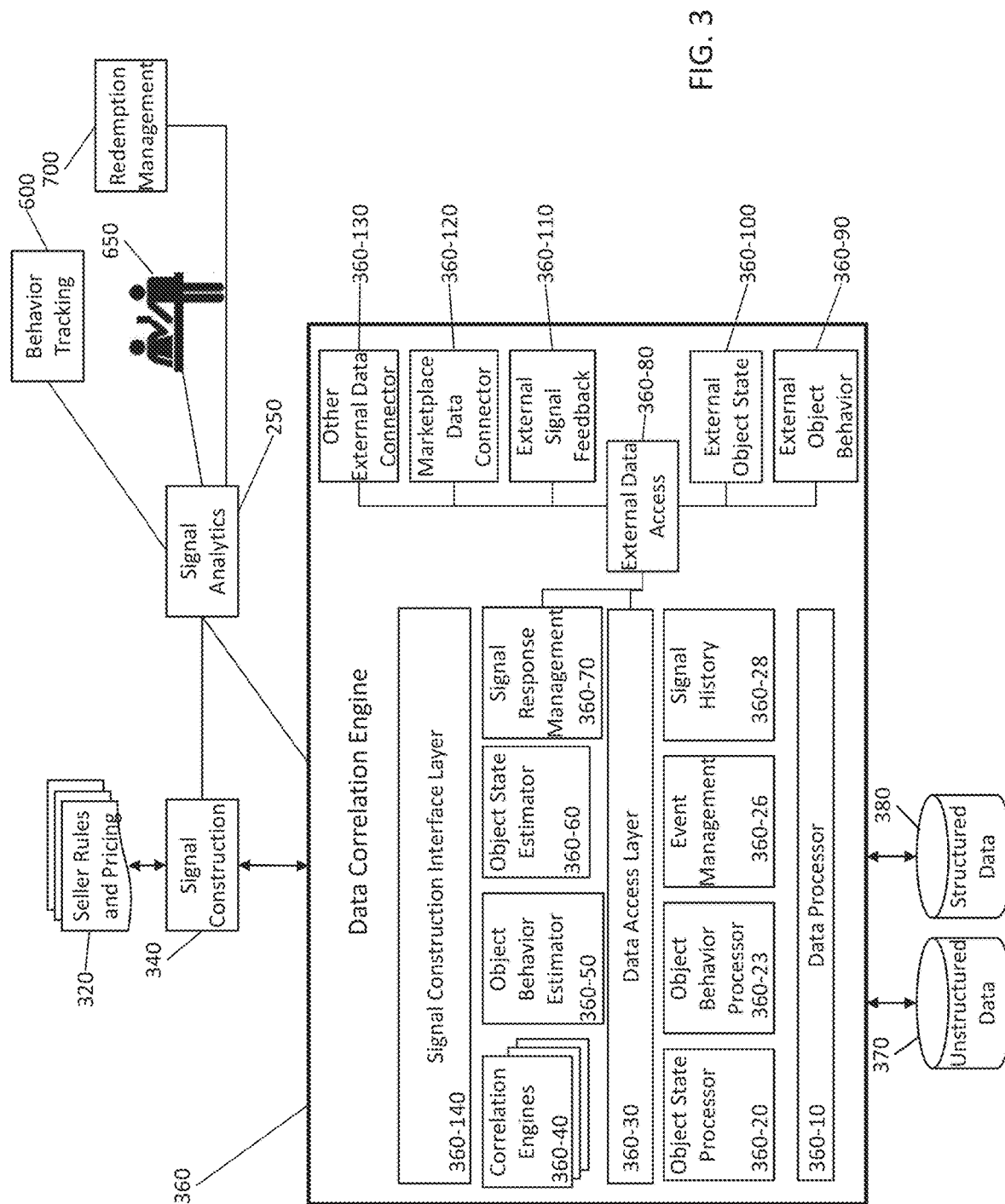
FIG. 3 is a schematic diagram of an embodiment of the invention.

Referring now to FIG. 3, a signal data correlation engine 360 is illustrated including the components of a signal correlation interface layer 360-140, a signal data access layer 360-30 and a data processor 360-10; wherein the signal correlation interface layer 360-140 further includes: a correlation engine 360-40, an object behavior estimator 360-50, an object state estimator 360-60, a signal response management 360-70 having external data access 360-80. The signal data access layer further including an object state processor 360-20, an object behavior processor 360-23, an event manager 360-26, and signal history 360-26. The external data access is further related to external signal feedback 360-110, a marketplace data connector 360-120, an other external data connector 360-130, an external object state 360-100, and an external object behavior 360-90. The signal construction 340 from unstructured data 370 and structured data 380 also relates to the signal/seller data correlation engine 360 and seller rules and pricing 320. Signal analytics 250 is related to the data correlation engine 360 as well as behavior tracking 600 of behavior (including by observer) 650 and in the case of advertising, redemption management 700.

The object behavior estimator uses one or more statistical engines to predict behavior of an object based upon remote data, history and external signals (which represent events or stimuli). Objects such as people have a current state (in transit, having a baby, sitting at home) and historical behavior patterns that are both dynamic and complex. For example, historically when a person (Joe) travels to Chicago he has historically flown by United Airlines, stays at a Marriott, and eats at a steak chain restaurant for dinner. This information is held by many observers such as airlines, credit card companies, hotel chains, mobile phone companies, etc. Thus the object Joe has behaviors that are correlated to travel to Chicago. One observation of Joe in Chicago, or traveling to Chicago may be sufficient to estimate behavior by a multitude of observers.

Observers which sell their observations in the data marketplace are signal sellers. There are two primary flows by which a Signal Sellers (or signal owners) interact with a Signal Buyer: Buyer Initiated Request for Signal, and Seller Initiated Signal.

A Buyer Initiated Signal typically requests predict behavior of an object from historical observation information. For example, the signal request of affinity to City, with the object context of the city of Chicago for object Joe, could be sent to an Airline Observer. In this example, the airline observer would correlate their historical travel data on passenger travel to Chicago for object Joe and return information regarding the recency and frequency of Joe's travel to Chicago. An Object Behavior Estimator could further predict the future travel based not only on an Airline observer's historical data, but their data correlated to external data such as a business conference, or another objects actions and behaviors (example Joe always travels with Susan to Chicago). Within the distributed (or federated) signals marketplace, each observer retains the correlation to external data signals, not based upon the data itself. For example, the Correlation engines for the airline above would hold both internal correlation of Joe's travel preferences toward an external signal request, and the correlation of airline data to other external objects and behaviors (Susan's travel and conference events). The airline would not know the identity of the object Susan, but only that there is a strong correlation to an external object behavior (Susan is traveling to Chicago). Neither would the airline know that the external event was a specific conference. To summarize, the statistical machines within the data correlation engines and the estimators provide correlation of internal data to external objects and behaviors. These correlations allow for prediction of current state and behavior to external stimuli, with external information protected by the signals construct.

In a Seller Initiated Signal, the observation signal has buyers that have registered for the observation, without historical context. In this model, it is the buyer that has correlated an external signal (from the seller) toward an objective. An example of a Seller Initiated Signal is an Airline with a signal Airline-Ticket-Purchase by Object at Time. In this example, the Seller Initiated Signal is an Event, which one or more buyers have chosen to register for within the Signals Marketplace, and the Seller has agreed to terms, which are contained within the Marketplace Contract Management System. For example, when Joe purchases an airline ticket, the Airline (acting as Signal Seller) informs approved signal buyers Marriott and Hilton that Joe will be traveling to Chicago. Event signals are a primary real time mechanism for selling and transferring observations. The signals marketplace provides for the dissemination of approved real time data within the signals metaphor to protect the contents of the information (or underlying data), its usage and performance, and realize value of the information based upon time decay. The signal Purchased-Airline-Ticket has a higher value within 1 second of the event, than at 10 minutes, 10 hours, or 10 days. The marketplace provides for price prediction based upon the time decay, and for measurement of performance of the event signal during its use. For example, if the hotel chain Hilton was able to use the signal Purchased-Airline-Ticket to secure a reservation by Joe, where Joe had previously stayed at Marriott, Hilton received a known value in the incremental sale of that Chicago room. If the Signal Purchased-Airline-Ticket was the only signal used in a campaign to Joe, than the performance of the signal toward the objective is known. If Purchased-Airline-Ticket was used in conjunction with other information the marketplace will calculate the proportional effectiveness of the Airline signal in the context of other signals used.

Figure 4:
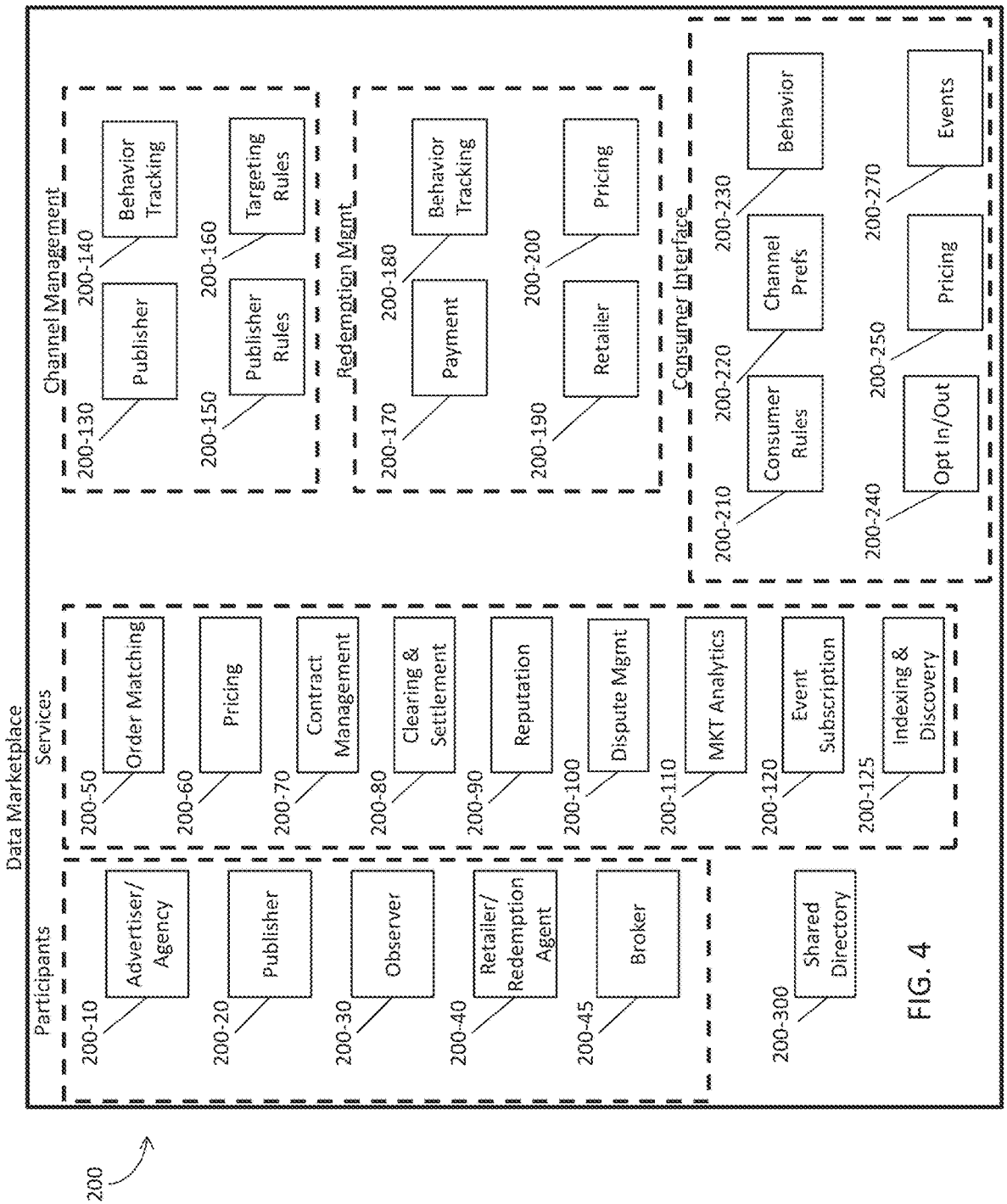
FIG. 4 is a schematic diagram of an embodiment of the invention illustrating components and functions of the signals data marketplace.

Referring now to FIG. 4, the signal data marketplace 200 is illustrated, providing components and relationships for participants, services, channel management, registration management, and consumer interface. For the participants, general examples within and advertising context are illustrated for an advertiser and/or agency 200-10, a publisher 200-20, an observer 200-30, a retailer and/or redemption agent 200-40, and a broker 200-45. For the automated services provided by the remote/centralized server computer for the virtual signal marketplace or exchange, examples are illustrated for order matching 200-50, pricing 200-60, contract management 200-70, clearing and settlement 200-80, reputation 200-90, dispute management 200-100, market analytics 200-110, event subscription 200-120, and indexing and discovery 200-125. For channel management provided by the virtual signal data marketplace 200, a publisher 200-130, behavior tracking 200-140, publisher rules 200-150, and targeting rules 200-160 are provided for automated steps within the signals marketplace or exchange. Functions of redemption management further include payment 200-170, behavior tracking 200-180, retailer 200-190, and pricing 200-200. Functions of consumer interface provided by the virtual signal marketplace include consumer rules 200-210, channel preferences 200-220, behavior 200-230, opt in/opt out 200-240, pricing 200-250, and events 200-270.

By way of additional background for the signal marketplace of the present invention, it is a significant factor how the federated data for the distributed signals is used. As opposed to "sharing lists" and joining information within a single database. Federated data keeps raw data localized with the owner responsible for disclosure, usage, pricing, security, and privacy. Within a data marketplace federated data providers (sellers) use signals as a way to protect sensitive information. Signals (or indicators described hereinabove) are a type of meta data indicators that are based upon information in control of the data sellers. These signals or indicators require input context and are sold for purposes explicitly defined within the signal marketplace. For example, in an AFFINITY_TO_CITY signal example, consumer flight records are never shared nor is the traveler's current location, rather the signal response can reflect how often or how recently an object was associated with a given city. Signals create scarcity and enable control both of which are critical in any functional marketplace. The value of any good is dependent on quality, availability, use, alternatives and price. The virtual signal marketplace performs analysis on signal results to determine effectiveness and value. This analysis and effectiveness information is communicated to all participants, which informs the market of potential buyers and sellers.

The efficacy of a signal is dependent upon the following factors or considerations: a) the signal's owner must have sole discretion to permission access, price, restrict usage and dissemination; b) the exchange of signal information must be and secured from external observation to protect against data leakage and tampering, since there can be no efficient market for the data or signals if they can be obtained elsewhere at a lower cost; c) each signal must be retain information on its identity, ownership, destination, rules and usage constraints enforced through its life cycle of usage by all parties that leverage signals directly or indirectly, d) The signal must contain information that the owner can create and release, e) the use of signal information must be measured which includes information on the buyer, objects, behaviors, states, events, status of agreement with marketplace, agreement with the buyer (if any), consumer constraints (if any), price offered, planned usage, and combinations thereof; the marketplace processes, systems, and services to protect the exchange, assure secure delivery, track usage, track value generated, settle funds, issue receipt, deliver auditability; and combinations thereof.

There are different control requirements on "consumer information" (or personally identifiable information or PII), proprietary information, object behavior information, object state information and other generic information. Some of these control requirements are driven by regulatory issues or requirements. Some information can only be exchanged to another party where an agreement is in place (i.e., a closed market). The control elements of a signal include the following: a) Signal type: Open, Restricted, PII; b) Signal Price: Market, floor; value generated c) Buyer Information or profile; c) consumer consent information (if any).

Figure 5:
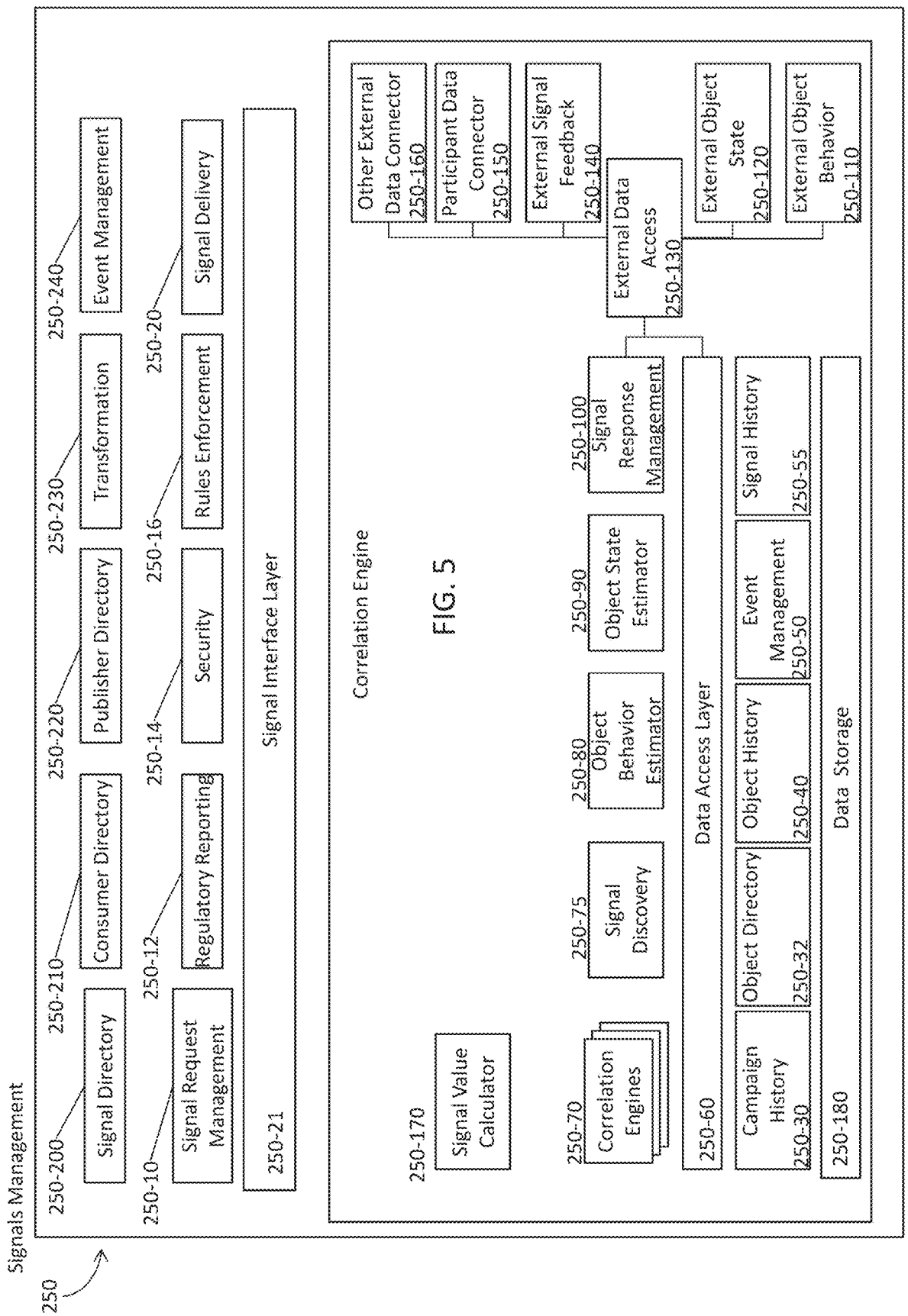
FIG. 5 is a schematic diagram of an embodiment of the invention illustrating components and functions relating to signals management.

FIG. 5 is a schematic diagram of an embodiment of the invention illustrating components and functions relating to signals management, generally referenced 250. The components include: Signal Directory 250-200; consumer Directory 250-210; Publisher Directory 250-220; Transformation 250-230; Event Management 250-240; Signal Request Management 250-10; Regulatory Reporting 250-12; Security 250-14; Rules Enforcement 250-16; Signal Delivery 250-20; Signal Interface Layer 250-21; and a Signal Management Correlation Engine further including 250-170; Correlation Engines 250-70; Signal Discovery 250-75; Object Behavior Estimator 250-80; Object State Estimator 250-90; Signal Response Management 250-100; External Data Access 250-130; External Object State 250-120; External Object Behavior 250-110; Other External Data Connector 250-160; Participant Data Connector; 250-150; External Signal Feedback 250-140; and Data Storage 250-170.

After defining the signals to sell, and registering their corresponding rules and constraints, signals information is exchanged within the virtual signal marketplace. There are five (5) primary data flows between a signal provider and the signal marketplace or signal exchange, including:

1) RFQ. Request for quote. In this data flow, a prospective buyer will request a price from the signal provider. The signal buyer provides: ID, signal(s) requested, input parameters (e.g., destination city, campaign type, price offered (per item and per success), time, expiry time, minimum fill, maximum, settlement. Along with this information the signal marketplace or signal exchange will also provide Buyer ID reputation information.
2) RFQ Response. Signal provider will either respond with an acceptance of order and time/quantity to fill, or a respond with alternate price/denial. The signal marketplace or signal exchange provides "optional" seller side software to manage this interaction. Rules surrounding minimum price, data effectiveness and buyer ID are incorporated to response. If offer is accepted, signal marketplace or signal exchange will begin tracking of the transaction order.
3) Purchase Confirmation. Buyers will issue purchase confirmation for approved RFQs. Within our marketplace agreement, a purchase confirmation is a commitment by the buyer to pay for information within the terms of the Commerce Signals Marketplace Agreement.
4) Signal Delivery. Signal provider provides the signals and buyer confirms receipt
5) Settlement. Transaction Reference number, quantity provided, time provided, item fees (if any), redemption fees (if any), redemptions to date, redemption expiry period, amount paid, amount paid to date, dispute reference numbers, receipt confirmed.

The present invention creates a virtual market for data, wherein the underlying or actual data has been transformed into signals or indicators to protect the underlying data, while still providing information relating to the data that is actionable by signal buyers. Each data seller can develop their own signals or indicators, controlled by their own rules and corresponding correlation engine(s), which data they wish to sell to the outside world. For example, a retailer could develop a signal "affinity for golf" with a result of 0-1. Consumers who buy golf balls, golf equipment would have a stronger signal based upon affinity. Golf marketers could subsequently use this information to better inform advertising, in particular for targeted advertising campaigns.

Signal buyers participate directly with signal sellers and/or in the marketplace to identify objects that they wish to influence or measure. Other entities, such as campaign managers, publishers, media companies take different roles in the measurement and influencing of the behavior of objects through the use of signal information. The virtual marketplace supports both buyer led transactions and seller led transactions. By way of example and not limitation seller led campaigns can begin with a publisher that has a relationship with a consumer of a given profile. Buyers can bid for the influencing the behavior of that consumer through the marketplace. Marketplace participants can assume multiple roles such as buyer, seller, and distributor.

Regardless of signal or indicator construction, signals must be registered to participate in the signal marketplace. To provide security to protect the signals within the marketplace, and to control signal dissemination or access and distribution to signals registered in the signal marketplace, multiple object identifiers can be used. By way of example and not limitation these include encrypted forms of e-mail address, card number, phone numbers, device ID, location, loyalty card and address as key for purchase of information from a seller. Thus, the data seller or signal provider controls the information that is shared within the marketplace and with prospective buyers. These controls relate to access, viewing, downloading, copying, etc. and combinations thereof.

Technical communication protocols for signals include writing data of the buyer into a buyer computer application; notifying buyer computer application to send XML file when data has been written to the marketplace order computer application data file by the buyer computer application; monitoring the marketplace order computer application queue from the marketplace execution application for notification that data has been written to the data file by the buyer computer application; reading the data of the buyer computer application data file from the marketplace execution computer application upon detection of notification; notifying marketplace order computer application to send XML file when data has been written to the seller computer application data file by the marketplace order computer application; monitoring the seller computer application queue from the marketplace order application for notification that data has been written to the data file by the marketplace order computer application; notifying a buyer computer application read file when data has been read by the seller computer application from the marketplace order computer application data file; monitoring the seller read file from the marketplace order computer application for notification that data has been read from to the buyer computer application data file by the seller computer application to initiate further writing to the marketplace order computer application data file.

Figure 6:
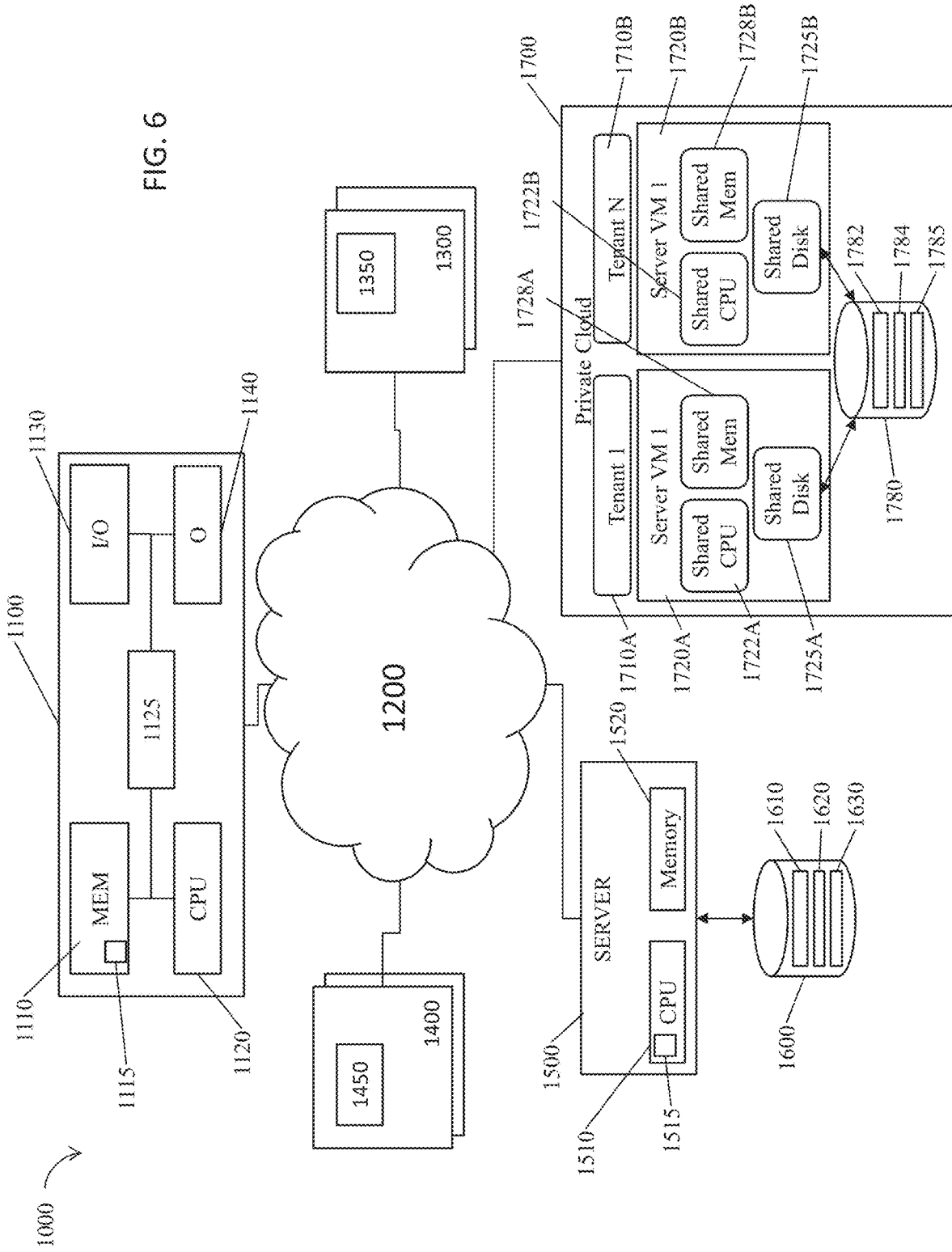
FIG. 6 is a schematic diagram illustrating a virtualized system for the present invention.

As illustrated in FIG. 6, the system 1000 is comprised of both dedicated servers 1500 and servers operating within a private cloud 1700. The dedicated servers 1500 contain: processing units 1510, memory 1520 data storage 1600. Dedicated servers 1500 are constructed, configured and coupled to enable communication over a network 1200. Servers 1720 operating within a private cloud 1700 leverage shared processing units 1722A, shared memory 1725A and shared disk 1728A are also configured and coupled to enable communications over a network 1200. The dedicated servers 1500 and cloud servers 1700 provide for user interconnection over the network 1200 using computers 1110 positioned remotely from the servers. Furthermore, the system is operable for a multiplicity of remote computers or terminals 1300, 1400 to access the dedicated servers 1500 and servers 1720A operating within a private cloud 1700 remotely. For example, in a request and reply architecture devices registered to marketplace participants may interconnect through the network 1200 to access data within dedicated servers 1600 and within the private cloud 1780. In preferred embodiments, the network 1200 is the Internet, or it could be an intranet, or any other network suitable for searching, obtaining, and/or using information and/or communications, including receiving the notification and providing a response.

The system of the present invention further includes an operating system 1515 installed and running on the dedicated servers 1500, enabling servers 1500 to communicate through network 1200 with the remote, registered devices. The operating system may be any operating system 1515 known in the art that is suitable for network communication. A memory within dedicated servers 1520 is interconnected with the server 1500. Memory 1520 may be integral with server 1500 or may be external to the server and interconnected therewith. A program of instruction 1620 is resident in memory 1520 within the parameters set by the operating system 1515 which accesses persistent storage 1600.

The system of the present invention further includes servers 1720A which support multiple tenants 1710A within a private cloud 1700 that share system resources through multiple virtual machines 1720A. Each virtual machine 1720A consists of an operating system installed and running on shared processing units 1722A, shared memory 1725A, shared persistent storage 1728A which access programmatic and user data 1782. The private cloud 1700 communicates through the network 1200 with remote registered devices. The operating system and virtual machines 1720A may be any such kind known in the art that is suitable for managing multi-tenant cloud services and network communication. Memory 1725A within shared cloud infrastructure is interconnected with each associated virtual machine 1720A according to the operating system running within the processing unity 1722A. A program of instruction 1782 is managed within memory 1725A upon retrieval by disk management 1728A within the parameters set by the operating system 1720 and virtual machine. Additionally, the following components are illustrated in FIG. 6: device 1100, instructions 1115, processor 1120, input/output interface 1130, bus 1125, memory 1350, 1450, instructions 1610, 1785 applications 1630, 1784, tenant N 1710B, server VM N 1720B, shared memory 1722B, shared disk 1728B and shared CPU 1725B.

Figure 7:
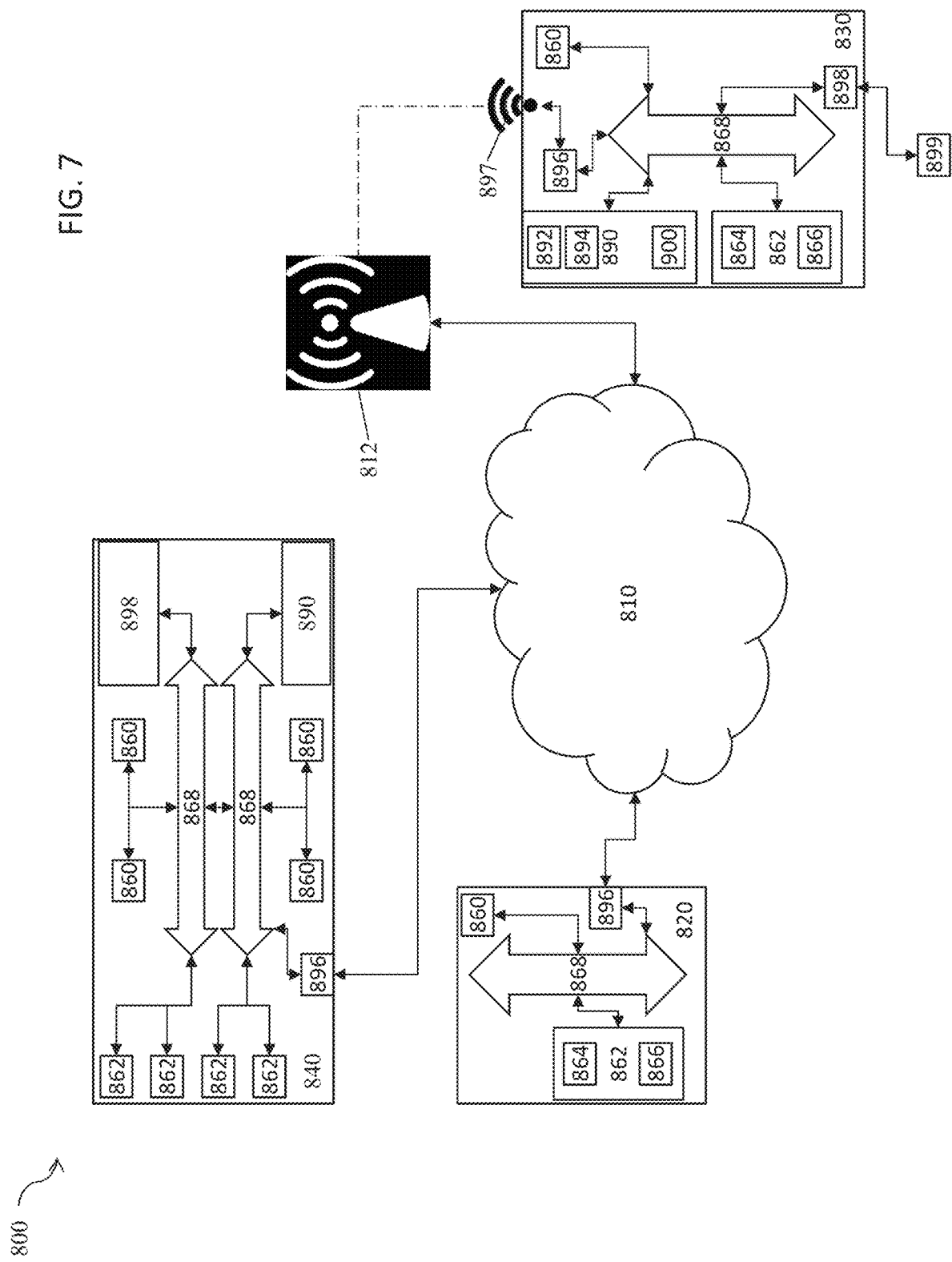
FIG. 7 is another schematic diagram illustrating a virtualized system for the present invention.

Additionally or alternatively to FIG. 6, FIG. 7 is a schematic diagram of an embodiment of the invention illustrating a computer system, generally described as 800, having a network 810 and a plurality of computing devices 820, 830, 840. In one embodiment of the invention, the computer system 800 includes a cloud-based network 810 for distributed communication via the network's wireless communication antenna 812 and processing by a plurality of mobile communication computing devices 830. In another embodiment of the invention, the computer system 800 is a virtualized computing system capable of executing any or all aspects of software and/or application components presented herein on the computing devices 820, 830, 840. In certain aspects, the computer system 800 may be implemented using hardware or a combination of software and hardware, either in a dedicated computing device, or integrated into another entity, or distributed across multiple entities or computing devices.

By way of example, and not limitation, the computing devices 820, 830, 840 are intended to represent various forms of digital devices 820, 840, 850 and mobile devices 830, such as a server, blade server, mainframe, mobile phone, a personal digital assistant (PDA), a smart phone, a desktop computer, a netbook computer, a tablet computer, a workstation, a laptop, and other similar computing devices.

The components shown here, their connections and relationships, and their functions, are meant to be exemplary only, and are not meant to limit implementations of the invention described and/or claimed in this document.

In one embodiment, the computing device 820 includes components such as a processor 860, a system memory 862 having a random-access memory (RAM) 864 and a read-only memory (ROM) 866, and a system bus 868 that couples the memory 862 to the processor 860. In another embodiment, the computing device 830 may additionally include components such as a storage device 890 for storing the operating system 892 and one or more application programs 894, a network interface unit 896, and/or an input/output controller 898. Each of the components may be coupled to each other through at least one bus 868. The input/output controller 898 may receive and process input from, or provide output to, a number of other devices 899, including, but not limited to, alphanumeric input devices, mice, electronic styluses, display units, touch screens, signal generation devices (e.g., speakers) or printers.

By way of example, and not limitation, the processor 860 may be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that can perform calculations, process instructions for execution, and/or other manipulations of information.

In another implementation, shown in FIG. 7, a computing device 840 may use multiple processors 860 and/or multiple buses 868, as appropriate, along with multiple memories 862 of multiple types (e.g., a combination of a DSP and a microprocessor, a plurality of microprocessors, one or more microprocessors in conjunction with a DSP core).

Also, multiple computing devices may be connected, with each device providing portions of the necessary operations (e.g., a server bank, a group of blade servers, or a multi-processor system). Alternatively, some steps or methods may be performed by circuitry that is specific to a given function.

According to various embodiments, the computer system 800 may operate in a networked environment using logical connections to local and/or remote computing devices 820, 830, 840, 850 through a network 810. A computing device 830 may connect to a network 810 through a network interface unit 896 connected to the bus 868. Computing devices may communicate communication media through wired networks, direct-wired connections or wirelessly such as acoustic, RF or infrared through a wireless communication antenna 897 in communication with the network's wireless communication antenna 812 and the network interface unit 896, which may include digital signal processing circuitry when necessary. The network interface unit 896 may provide for communications under various modes or protocols.

In one or more exemplary aspects, the instructions may be implemented in hardware, software, firmware, or any combinations thereof. A computer readable medium may provide volatile or non-volatile storage for one or more sets of instructions, such as operating systems, data structures, program modules, applications or other data embodying any one or more of the methodologies or functions described herein. The computer readable medium may include the memory 862, the processor 860, and/or the storage device 890 and may be a single medium or multiple media (e.g., a centralized or distributed computer system) that store the one or more sets of instructions 900. Non-transitory computer readable media includes all computer readable media, with the sole exception being a transitory, propagating signal per se. The instructions 900 may further be transmitted or received over the network 810 via the network interface unit 896 as communication media, which may include a modulated data signal such as a carrier wave or other transport mechanism and includes any delivery media. The term "modulated data signal" means a signal that has one or more of its characteristics changed or set in a manner as to encode information in the signal.

Storage devices 890 and memory 862 include, but are not limited to, volatile and non-volatile media such as cache, RAM, ROM, EPROM, EEPROM, FLASH memory or other solid state memory technology, disks or discs (e.g., digital versatile disks (DVD), HD-DVD, BLU-RAY, compact disc (CD), CD-ROM, floppy disc) or other optical storage, magnetic cassettes, magnetic tape, magnetic disk storage or other magnetic storage devices, or any other medium that can be used to store the computer readable instructions and which can be accessed by the computer system 800.

It is also contemplated that the computer system 800 may not include all of the components shown in FIG. 7 may include other components that are not explicitly shown in FIG. 7 or may utilize an architecture completely different than that shown in FIG. 7. The various illustrative logical blocks, modules, elements, circuits, and algorithms described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application (e.g., arranged in a different order or partitioned in a different way), but such implementation decisions should not be interpreted as causing a departure from the scope of the present invention.

In access management for signals within the signals marketplace according to the present invention, the following method is provided for granting access to signals controlled by corresponding signal owners in a virtualized or cloud-based computing system, the method steps within a signal owner computer constructed and configured for network-based communication with a remote server computer including the steps of: generating or constructing at least one rule associated with constraining or governing access to at least one signal, wherein the at least one signal corresponds to or represents a behavior of an object and/or an activity and/or an event associated with the object, wherein the at least one signal includes information about recency, frequency, and affinity, and wherein the behavior includes information about behavior recency, behavior frequency, and behavior affinity; storing the rule in a memory of the signal owner computer; receiving a request for access to the at least one signal by a buyer; automatically processing the request based on the at least one rule associated with the at least one signal; if the request complies with the at least one rule, then releasing the signal to the buyer; and tracking usage of the at least one signal via the network. Preferably, the at least one rule governs access to the at least one signal for a defined buyer and a defined use for the defined buyer.

The methods of the present invention may further include the steps of: granting or denying access to the at least one signal based upon the at least one rule for a defined use of the at least one signal by the corresponding at least one buyer; tracking access to the at least one signal in a database associated with the remote server computer; generating a listing that provides automated matching of the at least one signal with buyer candidates; automatically updating the at least one rule; providing and updating the at least one rule and updating constraints, exceptions, policies, pricing, competitors, reputation and/or availability of listings. The method may further include the steps of: transmitting the at least one signal and the at least one rule to the remote server computer, which is accessible by distributed signal buyers via the network; delivering the at least one signal to a signal buyer; monitoring use of the at least one signal by the signal buyers; receiving information from signal buyers confirming receipt of the at least one signal, and compliance with the at least one rule; retaining control of signal data within a defined use of the signal by a registered buyer, based upon the at least one rule; and/or the signal owner limiting signal availability to signal buyers and/or to a signal marketplace based upon the at least one rule.

In the methods of the present invention, the steps are provided within a federated community of signal providers within a data marketplace and provide for access management and associated policies impacting the availability of data within the data marketplace. Also, the methods of the present invention, the steps are provided within a community of federated signal buyers or a marketplace, and are operable to provide access management to the at least one signal locally by a signal provider or an indictor provider within the community or the marketplace.

Also, in methods for access to signals controlled by corresponding signal owners in a virtualized or cloud-based computing system, the method steps within a signal owner computer constructed and configured for network-based communication with a remote server computer include: generating or constructing at least one rule associated with constraining or governing access to at least one signal, wherein the at least one signal corresponds to or represents a behavior of an object and/or an activity and/or an event associated with the object, wherein the at least one signal includes information about recency, frequency, and affinity, and wherein the behavior includes information about behavior recency, behavior frequency, and behavior affinity; storing the rule in a memory of the signal owner computer; receiving a request for access to the at least one signal by a buyer; automatically processing the request based on the at least one rule associated with the at least one signal; if the request complies with the at least one rule, then releasing the signal to the buyer; and tracking usage of the at least one signal via the network; and retaining control of signal data within a defined use of the signal by a registered buyer, based upon the at least one rule.

The method steps are provided for a multiplicity of signal owner computers distributed throughout the network and in network-based communication with the remote server computer. For the systems and methods of the present invention, the at least one signal includes a signal type selected from the group consisting of: state signals, event signals, activity signals, behavior signals, relational signals, location signals, loyalty signals, purchase signals, social signals, and combinations thereof.

A system for providing access management for signals by corresponding signal owners in a virtualized or cloud-based computing environment according to the present invention includes: a remote server computer constructed and configured for network-based communication with at least one signal owner computer and at least one signal buyer computer; the at least one signal owner computer having a memory storing at least one signal that corresponds to or represents a behavior of an object and/or an activity and/or an event associated with the object, wherein the at least one signal includes information about recency, frequency, and affinity, and wherein the behavior includes information about behavior recency, behavior frequency, and behavior affinity; at least one rule associated with the at least one signal, which is stored in a memory of the signal owner computer; and a first signal value for a predetermined signal use corresponding to the at least one signal and at least one rule. The remote server computer provides for access management within a federated community of signal providers, and the remote server computer monitors use of the at least one signal based upon the at least one rule. Preferably, the at least one rule includes factors regarding: buyer identity, campaign type, signal requested, price, redemption signal type, purchase quantity, past performance of signal, past performance of campaign type, past performance of buyer, and combinations thereof. Also, the at least one rule is associated with a type selected from the group consisting of: event signals, activity signals, behavior signals, relational signals, location signals, loyalty signals, purchase signals, social signals, and combinations thereof.

Also, the system provides for limiting signal availability based upon a rules engine that includes the at least one rule from each of the signal owners that automatically considers buyer identity, campaign type, signal requested, price, redemption signal type, purchase quantity, past performance of signal, past performance of campaign type, past performance of buyer, and combinations thereof. Additionally, preferably the at least one signal is indexed, abstracted and/or anonymized from their data source to protect the identity of the signal owner. As described hereinabove in the signals marketplace, the buyer candidates desiring access to the signals have corresponding objectives for buying signals and signals data that include consumer behavior(s).

For the systems and methods of the present invention, the at least one signal includes a signal type selected from the group consisting of: state signals, event signals, activity signals, behavior signals, relational signals, location signals, loyalty signals, purchase signals, social signals, and combinations thereof. Also, the systems and methods of the present invention include at least one control that impacts the availability of a signal corresponding to the behavior of the object, the activity, and/or the event.

Figure 8:
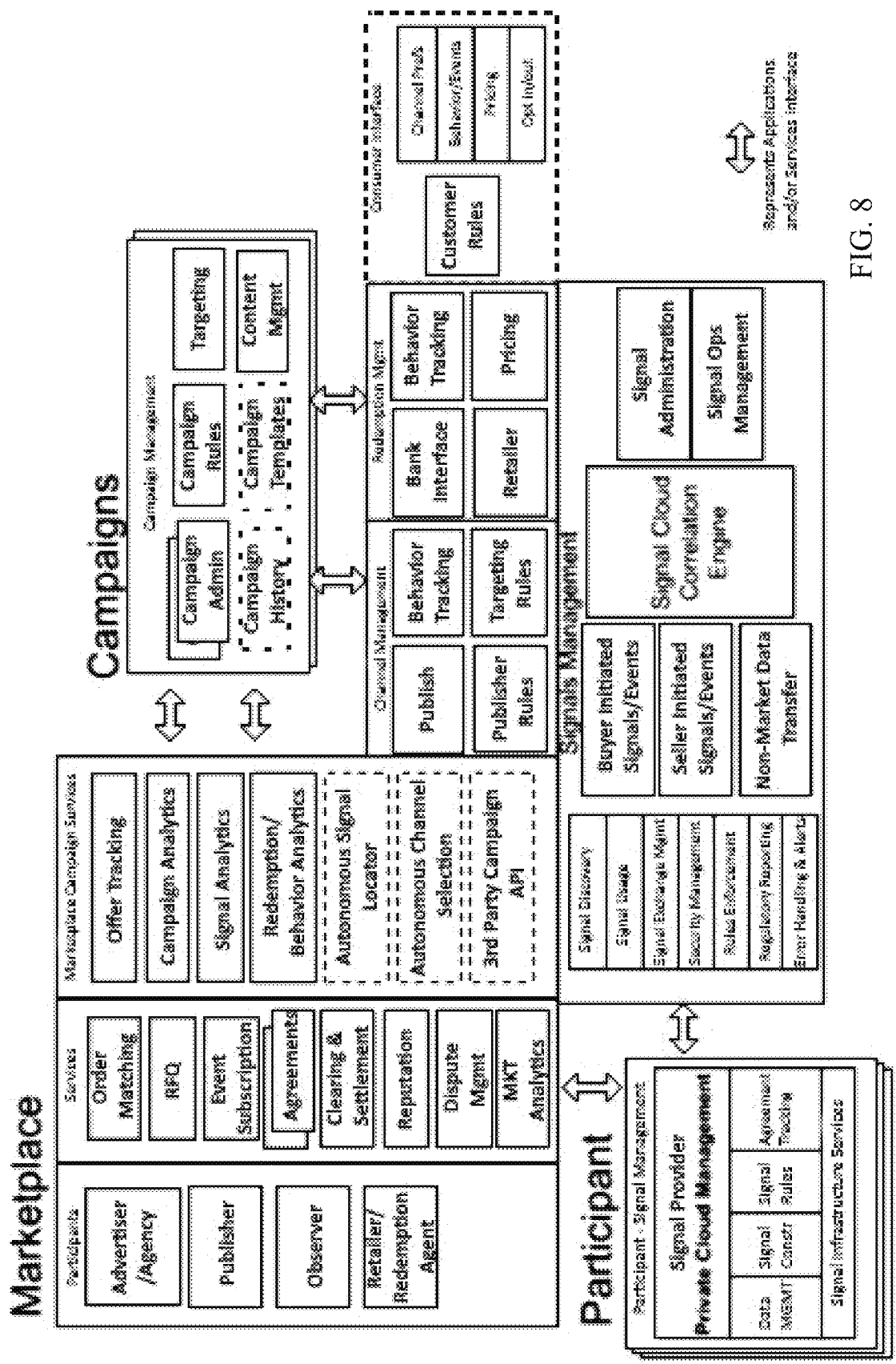
FIG. 8 is a schematic diagram of an embodiment of the invention illustrating components and functions of the signals data marketplace, campaigns, and participants in relation to signals management.

Referring again to the figures, consider in particular to FIGS. 8-12 which more particularly illustrate elements and steps of signals access management for the present invention systems and methods. FIG. 8 is a schematic diagram of an embodiment of the invention illustrating components and functions of the signals data marketplace, campaigns, and participants in relation to signals access management. Preferably, applications and/or services interfaces are provided between the signals marketplace, campaigns for advertising and marketing, participants including signal provider and signal infrastructure services for data management, signal construction, signal rules, and agreement tracking within a cloud-based computing system and constructed and configured in network-based communication with the signals marketplace and signals management and signals access management cloud-based systems and methods as described and claimed herein.

Figure 9:
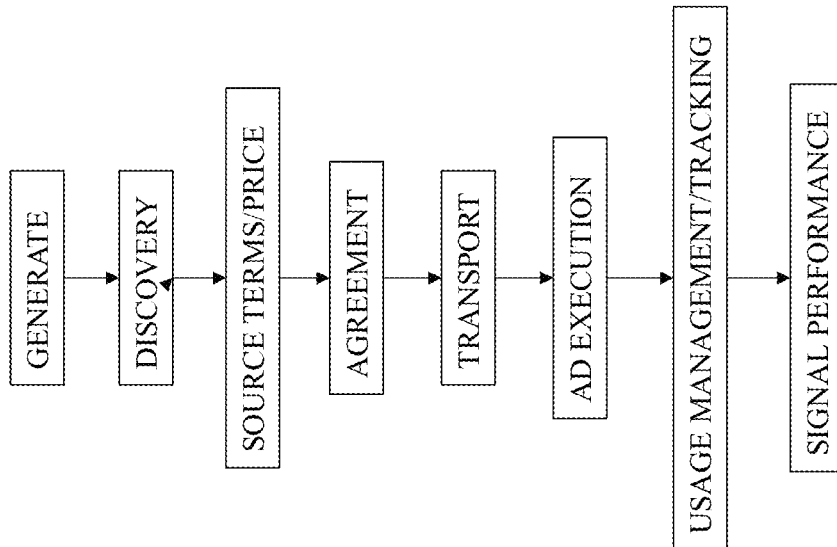
FIG. 9 is a flow diagram of an embodiment of the invention illustrating signal lifecycle.

FIG. 9 is a flow diagram of an embodiment of the invention illustrating signal lifecycle including steps associated with each signal within the signals marketplace: generate, discovery, source terms and price, agreement, transport, ad execution, usage management and tracking, and signal performance.

Figure 10:
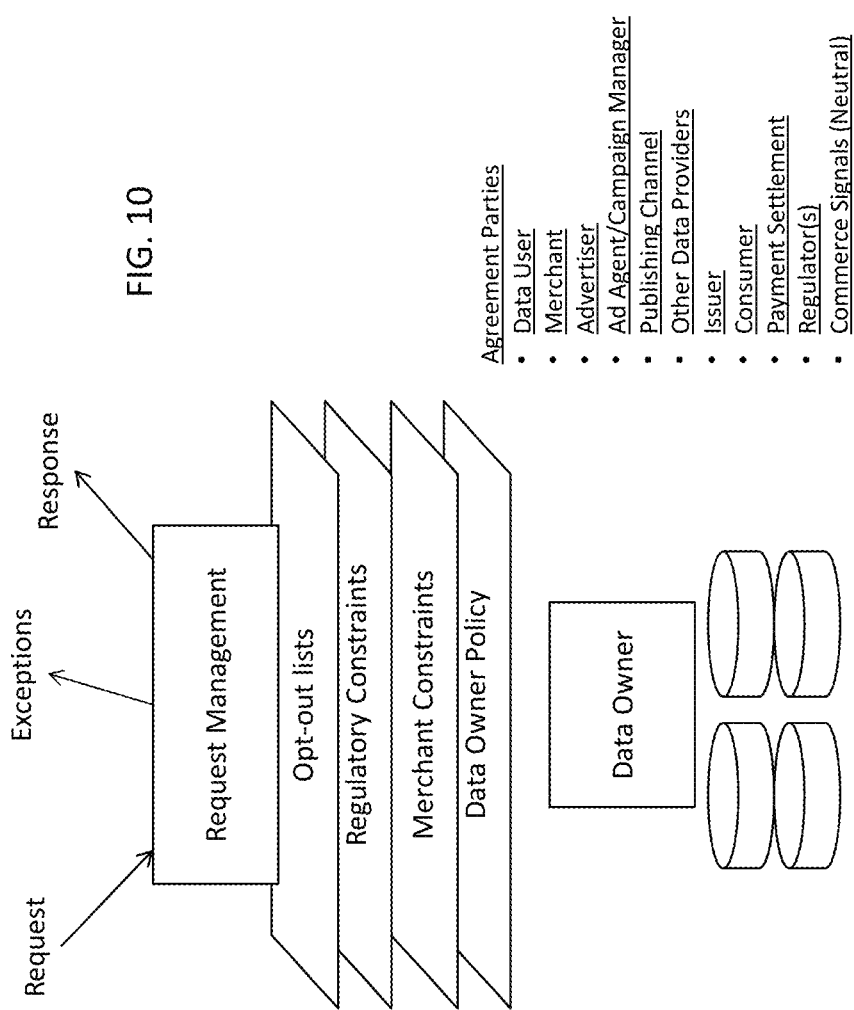
FIG. 10 is a schematic diagram of an embodiment of the invention illustrating components and functions relating to request management for signals.
Figure 12:
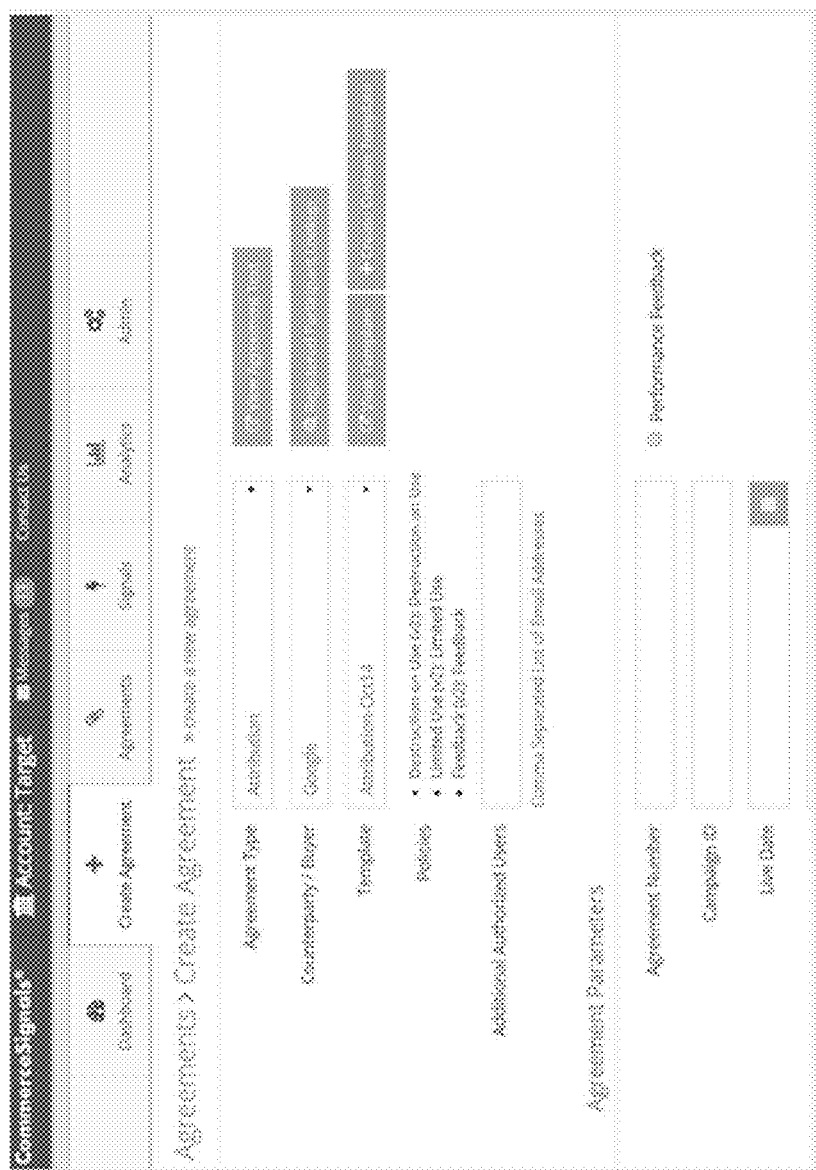
FIG. 12 is a graphic user interface (GUI) screen shot illustration of an embodiment of the invention showing inputs for creating agreements and parameters governing signals access and management.

The present invention further provides for signal or indicator sellers to manage multiple layers of rules and constraints with access management graphic user interfaces (GUIs) which can be located either centrally within the marketplace, or locally within the sellers federated data systems, as illustrated in FIG. 10 showing the layers of control provided by signals access agreements, and the GUI illustrated in FIG. 12. FIG. 10 is a schematic diagram of an embodiment of the invention illustrating components and functions relating to request management for signals based upon the request inputs received by the signals marketplace of the present invention. The request is received and processed by a server computer based upon the agreement terms stored in at least one database for governing the access to signals available. The request is considered based upon opt out lists, regulatory constraints, merchant constraints, at least one policy, and any exceptions are indicated along with a response output from the system. The agreements govern all parties within the marketplace, including data owners, merchants, advertisers, campaign managers, advertising agents, publishing channels, other data providers or data owners, issuers, consumers, payment settlement entities, regulators, and commerce signals or a neutral entity overseeing the signals marketplace and the federated signals data.

Figure 11:
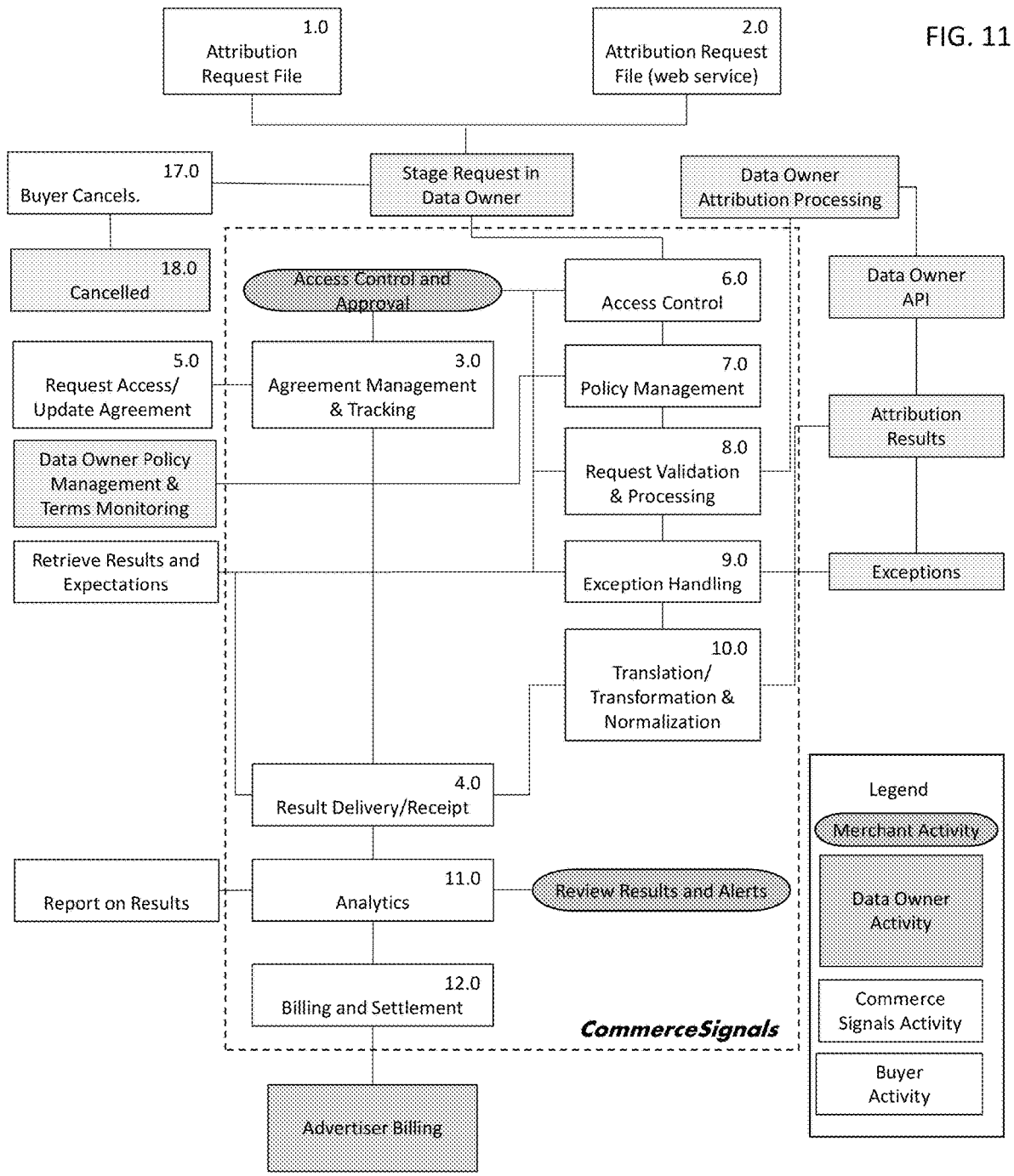
FIG. 11 is a schematic diagram of an embodiment of the invention illustrating components and functions relating to a use case for batch attribution request for signals management.

FIG. 11 is a schematic diagram of an embodiment of the invention illustrating components and functions relating to a use case for batch attribution request for signals access management, with the data owner illustrated by way of example as a corporate entity. An attribution request file 1.0 or attribution request file (web service) is input and the stage request in data owner is provided and considered automatically based upon the access control 6.0, policy management 7.0, request validation and processing 8.0, exception handling 9.0, and translation, transformation, and normalization 10. Agreement management and tracking 3.0 is also provided within the access control and approval, and includes request access and updating agreement processes. Buyer cancelation 17.0 and a corresponding request cancellation 18.0 is provided as an alternative to the access control and approval function within the system. Policy management and terms monitoring, and retrieving results and exceptions are provided in connection with their corresponding steps for processing the request through signals access control and approval of the present invention. Data owner attribution processing is provided via an API for attribution results and exceptions handling. If approval is provided, then result delivery and receipt 4.0 follow, as well as analytics 11.0 for reviewing results and alerts and reporting on results steps. Then, billing and settlement 12.0 including steps of payment for attribution and advertiser billing are provided.

FIG. 12 shows a graphic user interface (GUI) screen shot illustration of an embodiment of the invention showing inputs for creating agreements and parameters governing signals access and management. Remote inputs are provided by the data owner via computing device constructed and configured for communication via a network to the signals access management interface of the at least one server and database(s) of the systems of the present invention for a signals marketplace. The data owner provides inputs for generating and updating agreements governing signals representing the data. Agreement type is selected by predetermined agreements within the system; at least one counter-party or buyer is identified. Preferably, templates are provided for each agreement type within the system. Agreement parameters, policies, restrictions or limitations of use, feedback, and combinations are provided by the data owner for inclusion in the electronic agreement governing the signals use and access to signals according to the present invention systems and methods.

By way of example and not limitation, signal array object analysis is provided as follows for the present invention. A signal array object is an array of signals where each column corresponds to a signal source, typically from a multiplicity of signal providers, and each row corresponds to an individual person or aggregate of persons such as a household. A signal array is represented in one embodiment via the following:

$$\underline{S}=\{S_{ij}\} \text{ where } i=1 \text{ to N and } j=1 \text{ to M}$$

In the simple general linear equation for predictive analytics, $\hat{Y}=a\underline{X}+b$, setting $\underline{X}=\underline{S}$ provides a direct path to all analytic and predictive systems by organizing the dependent variable in a standard layout. The signals in the signal array object (SAO) are data, pointers and/or addresses and/or pointers and are static or real-time feeds. Signals from $\underline{S}$ can be batched to $\underline{X}$ in its entirety, or they can be a subsample according to an arbitrary application requirement. For example, a subset of a few hundred individuals may be obtained to obtain an estimate of the efficacy of the objective for using any mix of federated signals. Further, the individual observations can be parsed to obtain an $\underline{X}$ that provides estimates based upon the most current signals.

Figure 13:
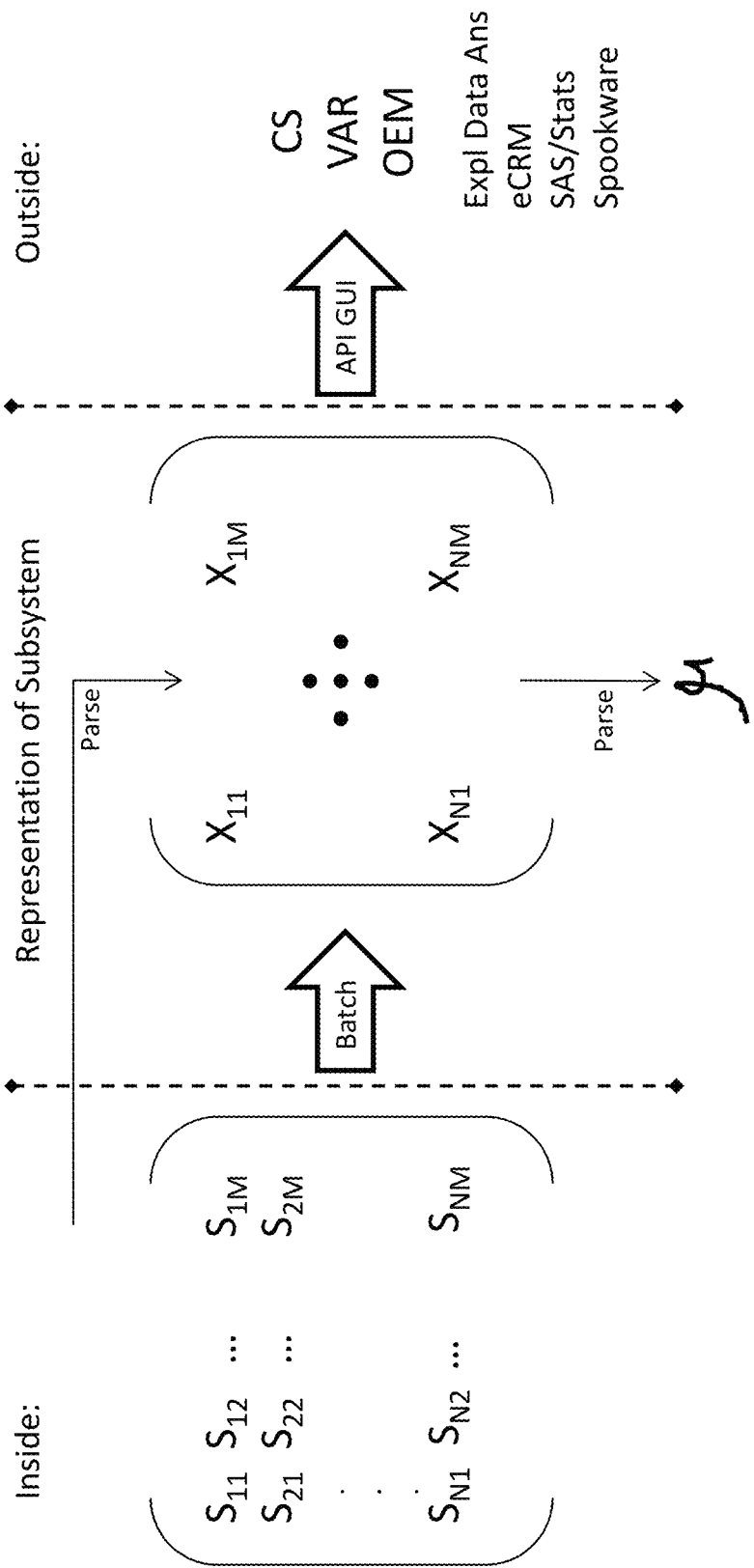
FIG. 13 shows formula illustrations used within the systems and methods of the present invention.

In FIG. 13, m is a subset of M and represent those signal types that advance the user's (requestor's objective. These can vary as the objective is refined. However, n is a subset of N and represents those individual observations both necessary and sufficient to advance the user's objective. These can vary as the objective is refined. Most any predictive system is a function of X using usual and customary algorithms for deriving m and n in innovative fashion.

Figure 14:
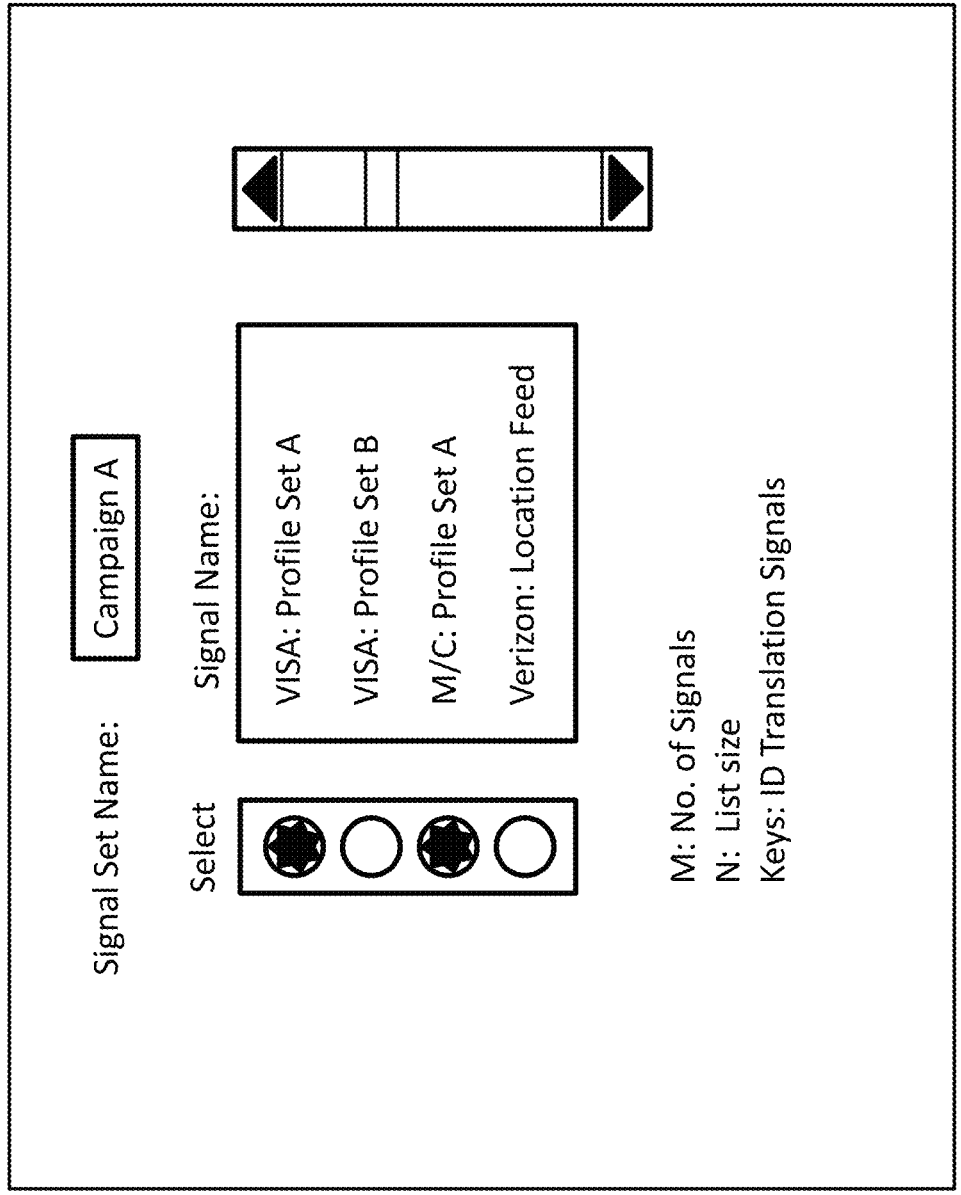
FIG. 14 is an illustration of a GUI of another embodiment within the present invention.

Referring now to FIG. 14, the Signal User selects from permissioned Signals. N, the list size, would be displayed and changed as additional signals are added and deleted. The ID Translation Signal used would be displayed. Autoselect could be the largest orthogonal data, and is set by default as the initial condition. Note that location feed or any zero variance and independent signal may best be handled in Decision Masks.

Figure 15:
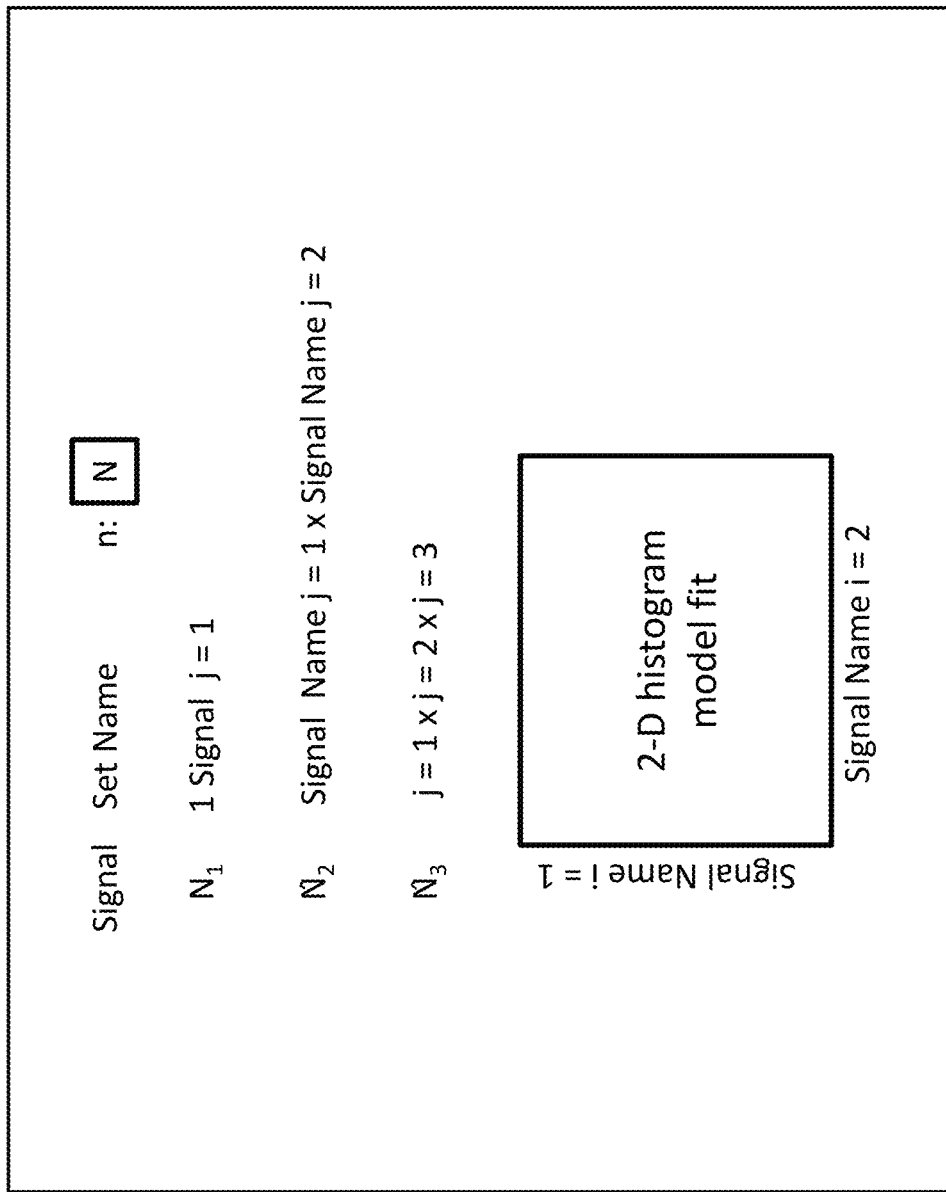
FIG. 15 is another GUI illustration continued from a selection within the FIG. Y interactive GUI.

Now referring to FIG. 15, the Signal User sets a sample size. The full population of signals is the default. $\hat{N}_2$ and $\hat{N}_3$ are a function of the $N_{i-1}$ and the signal match rate, as set forth hereinbelow in the match rate description. Considerable information is useful at this stage, before a signal response is available for dyadic functions such as predictive analytics. This is a minimalist representation. In one embodiment of the present invention, the API contains multidimensional array manipulation primitives. At this stage modatic functions of X precede dyadic functions of X and $\hat{Y}$. APL contains a robust selection, for which public domain libraries exits, and is the first implementation and background for the present invention. The largest subset of ? ⌈⌊ρ~ι ɩ *−+×÷, ⊞ ∘⊛⊕⊖⊘▲▽±∓⊘ ! among array manipulation functions is preferably utilized.

In another embodiment, methods of the present invention provide for determining the best ID Broker through a match rate signal and determining or identifying the best data provider for measurement for enabling the measurement of behavior for an aggregate exposed group within the federated data exchange or marketplace by using a platform for translating anonymized object identifiers and sending those translated anonymized object identifiers to at least one data provider or measurement entity, which include by way of example and not limitation, financial institutions or banks, retailers, and/or mobile communication operators or service providers, which are able to determine identify physical presence (or location), or identify transaction(s) or purchase(s). The methods also include automatically selecting at least one ID Broker as a service within the federated data exchange or marketplace, and the platform performing object identifier translation as a service (or including the service provided by approved service providers) within the federated data exchange or marketplace. Also, methods for pricing and billing for object identifier translation (preferably based upon the value provided by the object identifier translation) and for measurement of consumer behavior within the federated data exchange or marketplace are provided by the present invention.

According to the present invention, in a system operable for providing object identifier translation within a federated data marketplace in a virtualized or cloud-based computing environment with the following components are included: at least one platform server computer constructed and configured for network-based communication with a multiplicity of distributed data provider computers and a multiplicity of distributed requestor computers and at least one ID Broker server computer for mapping anonymized object identifiers and internally held object identifiers. The at least one platform server computer further includes at least one object identifier translation provider that is operable for automatically translating object identifiers.

Furthermore, a data correlation engine is provided on the at least one ID Broker server computer for automatically associating object identifiers with corresponding data provider data, which are stored remotely within the corresponding data provider computer(s).

Additionally, the at least one platform server computer is operable to automatically generate a financial value or pricing for performing object identifier translation based upon a functional value associated with the object identifier translation.

By way of example and not limitation, the following scenario is described to illustrate operation of the systems and methods of the present invention for object identifier translation within the federated data marketplace.

When determining what ID to use with what attribution provider there is first a one time "match rate" assessment where a sample size of 5,000-10,000 object identifiers are assessed; a match rate request signal is provided. After the match rate has proven adequate, then there is a separate request to request attribution on only object identifiers that match, since this is more valuable.

Figure 16:
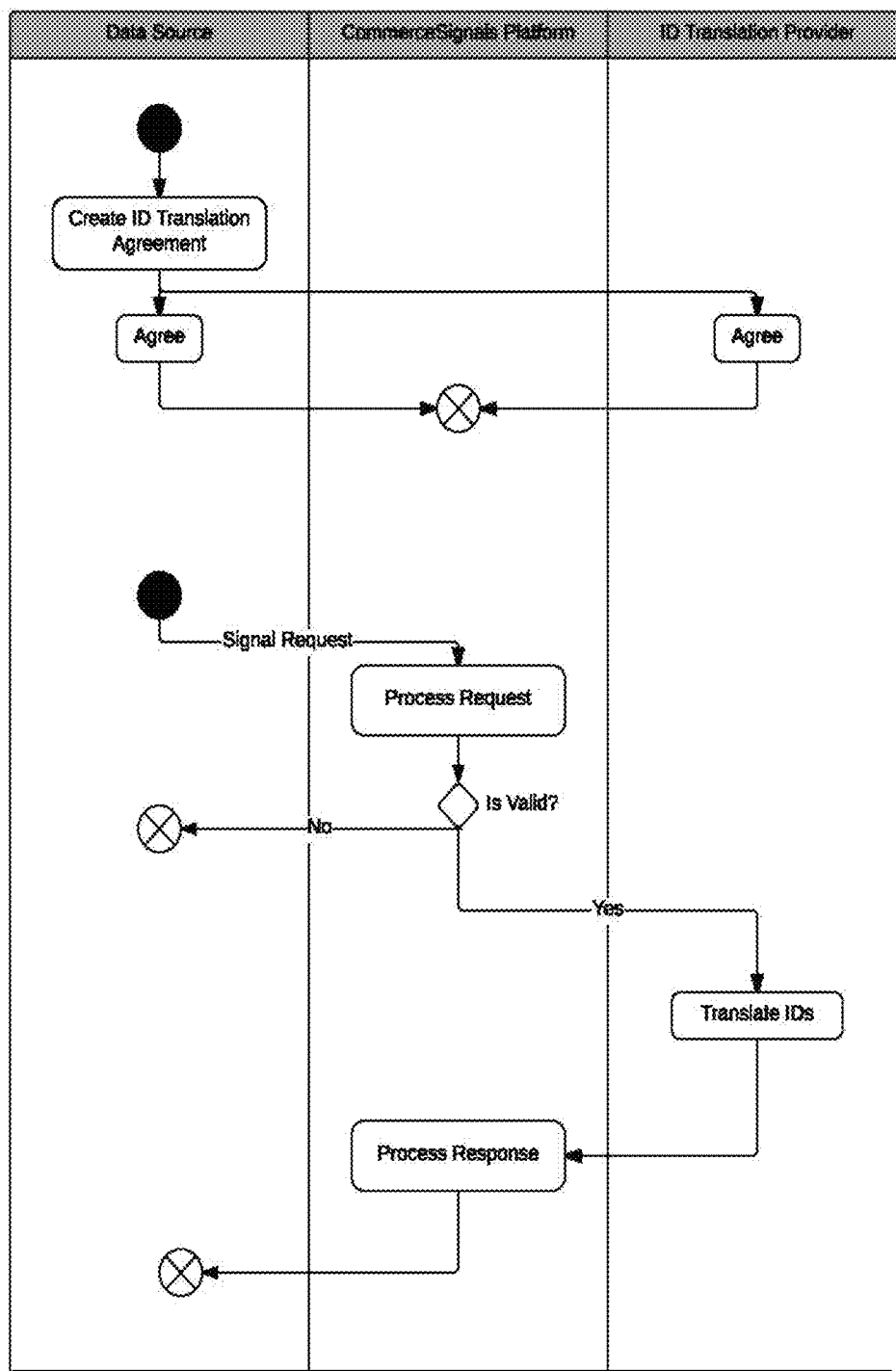
FIG. 16 is a flow diagram illustrating match rate signal.
Figure 17:
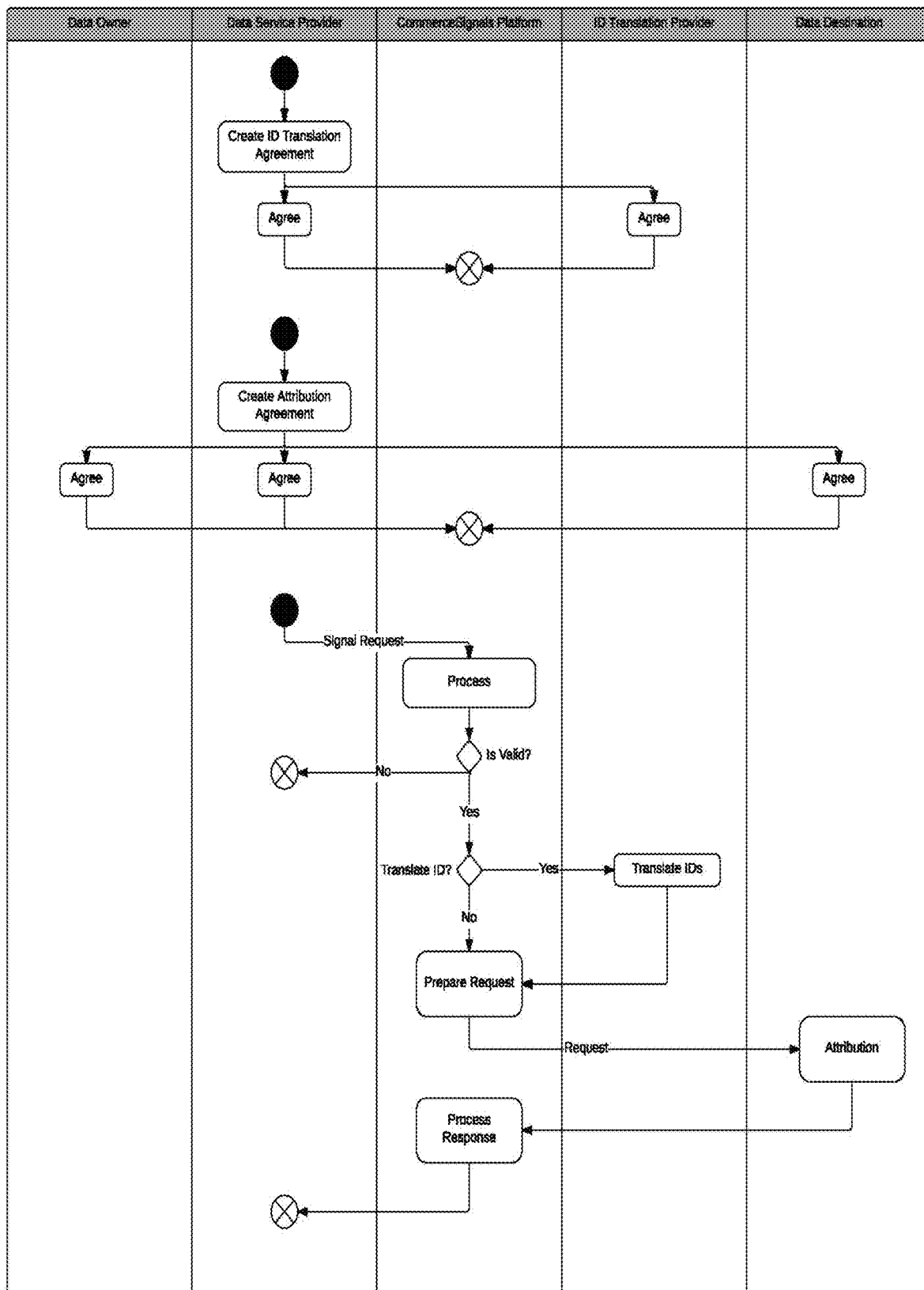
FIG. 17 is a flow diagram illustrating match rate signal for attribution with identity matching.

Method steps for determining the best identity translation provider through a match rate signal are illustrated by FIG. 16, which is a flow diagram for match rate, and by FIG. 17, which is a flow diagram illustrating match rate signal for attribution with identity matching. In a sample of a request sent to the system server computer(s) of the present invention for determining which identity translation provider to use, a match rate of a first object identifier to a second object identifier is provided and automatically compared, and a match rate response is also provided. Where the match rate is good or high, then that identity translation provider is selected or indicated for use; where a multiplicity of identity translation providers is considered, the match rate signal and response are used to determine the best identity translation provider. Preferably, the present invention systems and methods provide for real-time or near-real-time signal translation, and match rate is used for selecting the identity translation provider for use in the object identifier translation for the signal(s). Thus, the real-time or near-real-time translation of an ID vector from a first ID to a second ID for the purpose of attribution is achieved using the best identity translation provider for object identifier translation for the signal(s).

In a service for providing the match rate within the federated data marketplace, after match rate requests are received and the match rate assessment is provided, match rate results are stored, tracked, and mapped to provide intelligence for determining intersection of data sets. For every requestor and signal seller within the marketplace (and combinations of buyers and sellers), preferably identity mapping is provided for a multiplicity of ID Brokers to help system users within the marketplace identify the best object identifier to use, and then match with the services of object identifier providers to resolve the object identifier translation in real-time or near-real-time.

Key value pair translation or object identifier translation is a key function of the platform of the present invention. The key value pair platform system preferably includes at least a first set of anonymized object identifiers, a second set of anonymized object identifiers, and the key pair platform server computer operable to perform object identifier translation between the first set of anonymized object identifiers and the second set of anonymized object identifiers.

In one embodiment, a first set of anonymized object identifiers corresponding to a first set of internally held object identifiers is electronically held by a first party computer connected to the virtual key pair platform server computer over a network. The first set of internally held object identifiers corresponds to virtual object information internally held by the first party computer. Similarly, a second set of anonymized object identifiers corresponding to a second set of internally held object identifiers is electronically held by a second party computer connected to the virtual key pair platform server computer over the network. The second set of internally held object identifiers corresponds to virtual object information internally held by the second party computer. To protect the privacy and security of the object information, the first set of anonymized object identifiers and the first set of internally held object identifiers are never sent to the second party computer and the second set of anonymized object identifiers and the second set of internally held object identifiers are never sent to the first party computer. Preferably, the first set of anonymized object identifiers is only disclosed to a first computer, an identity broker computer, and the virtual key pair platform server computer, thereby providing anonymity and security for each object. Likewise, the second set of anonymized object identifiers is only disclosed to a second computer, an identity broker computer, and the virtual key pair platform server computer, thereby providing anonymity and security for each object.

In an exemplary embodiment, multiple ID brokers create anonymized object identifiers based on internally held object identifiers held internally by one or more parties. By way of example, a first set of anonymized object identifiers is constructed at a first identity broker computer and a second set of anonymized object identifiers is constructed at a second identity broker computer. The virtual key pair platform server computer is operable to send the second set of anonymized object identifiers to the second party computer, and upon receiving a report based on the second set of anonymized object identifiers, the virtual key pair platform server computer is further operable to send the report to the first party computer connected to the virtual key pair platform over the network, wherein the report does not disclose any object information, raw data, or underlying data relating to the multiplicity of objects and protects anonymity of the multiplicity of objects.

Permissions are essential in allowing object identifier translation according to the present invention. Preferably, permissions are maintained as permission files by the platform of the present invention. In one embodiment, permission files include a permission file from a first party computer, a permission file from a second party computer, and at least one permission file from at least one identity broker computer.

Figure 18:
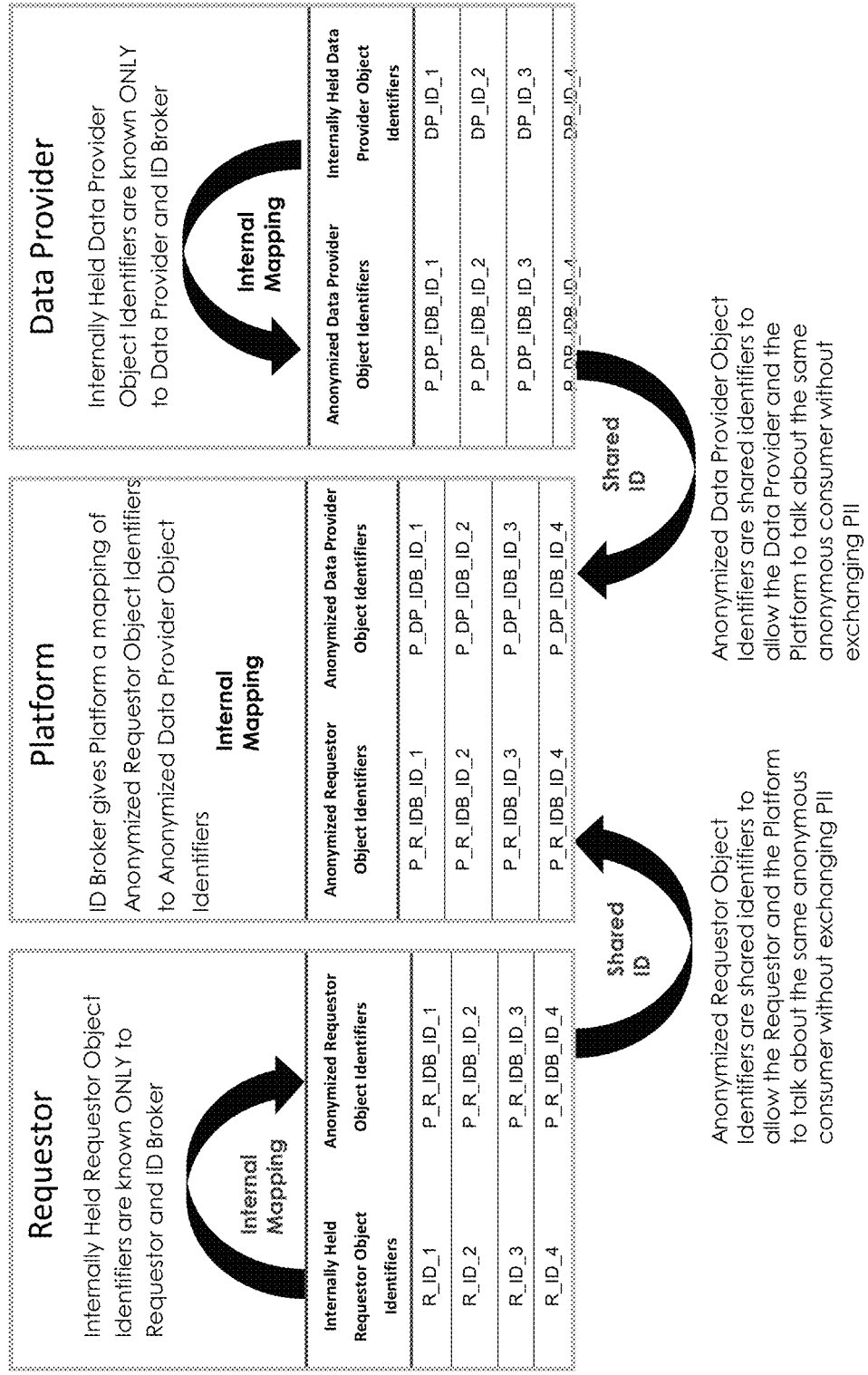
FIG. 18 is a diagram of the internal mapping of object identifiers and shared object identifiers between parties in a federated data exchange or federated data marketplace.

FIG. 18 is a diagram of the internal mapping of object identifiers and shared object identifiers between parties in a federated data exchange or federated data marketplace. The Requestor box shows the internal mapping between the internally held requestor object identifiers and the anonymized requestor object identifiers within a table stored on at least one requestor computer. Anonymized Requestor Object Identifiers are shared over a network between at least one requestor computer and the platform server computer. The Platform box shows the internal mapping between the anonymized requestor object identifiers and the anonymized data provider object identifiers within a table stored on at least one server computer of the platform. Anonymized Data Provider Object Identifiers are shared over a network between at least one data provider computer and the platform server computer. The Data Provider box shows the internal mapping between the anonymized data provider object identifiers and the internally held data provider object identifiers within a table stored on at least one data provider.

Figure 19:
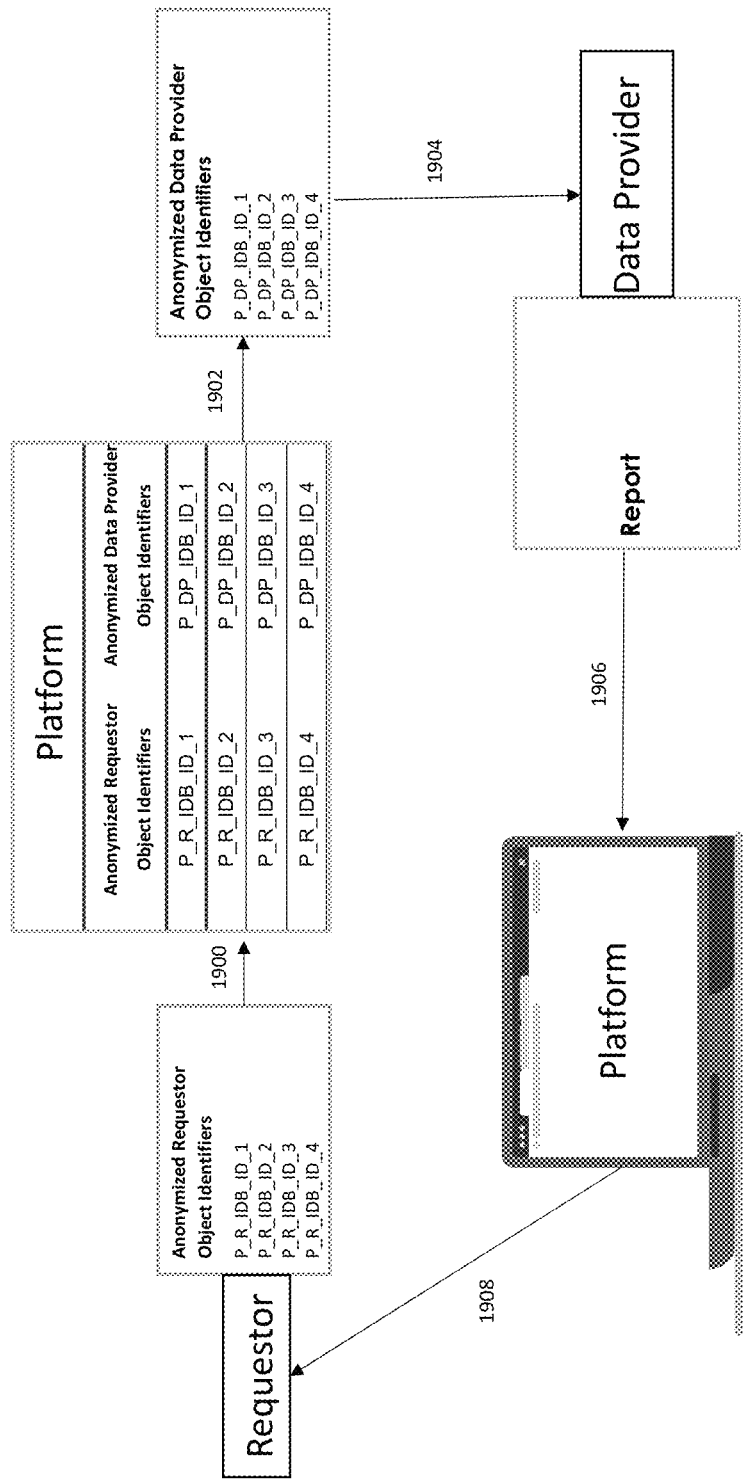
FIG. 19 is a flow diagram which shows an operational flow according to one embodiment of the present invention.

FIG. 19 is a flow diagram which shows an operational flow between entities in a federated data marketplace according to one embodiment of the present invention. The first flow 1900 between the requestor computer and the platform server computer includes a request file sent over a network from the requestor to the platform server computer with anonymized requestor object identifiers, date range, merchant identifiers, and additional metadata associated with the request. Upon receiving the request file, the platform server computer performs object identifier translation 1902 to translate the anonymized requestor object identifiers to anonymized data provider object identifiers. This is preferably performed using a single data table which contains a column of anonymized requestor object identifiers and a column of anonymized data provider object identifiers. After translating the anonymized requestor object identifiers to anonymized data provider object identifiers, the platform server computer sends the anonymized data provider object identifiers over the network to a data provider computer for processing 1904. The data provider computer processes the request by converting the anonymized data provider object identifiers to internally held data provider object identifiers and creating a report based on object information associated with the internally held data provider object identifiers. In one embodiment, the report includes spend based insights. The data provider computer then sends the report over the network to the platform server computer 1906. The platform server computer delivers the report via a web interface or a programmatic Application Program Interface (API) to the requestor computer 1908.

Figure 20:
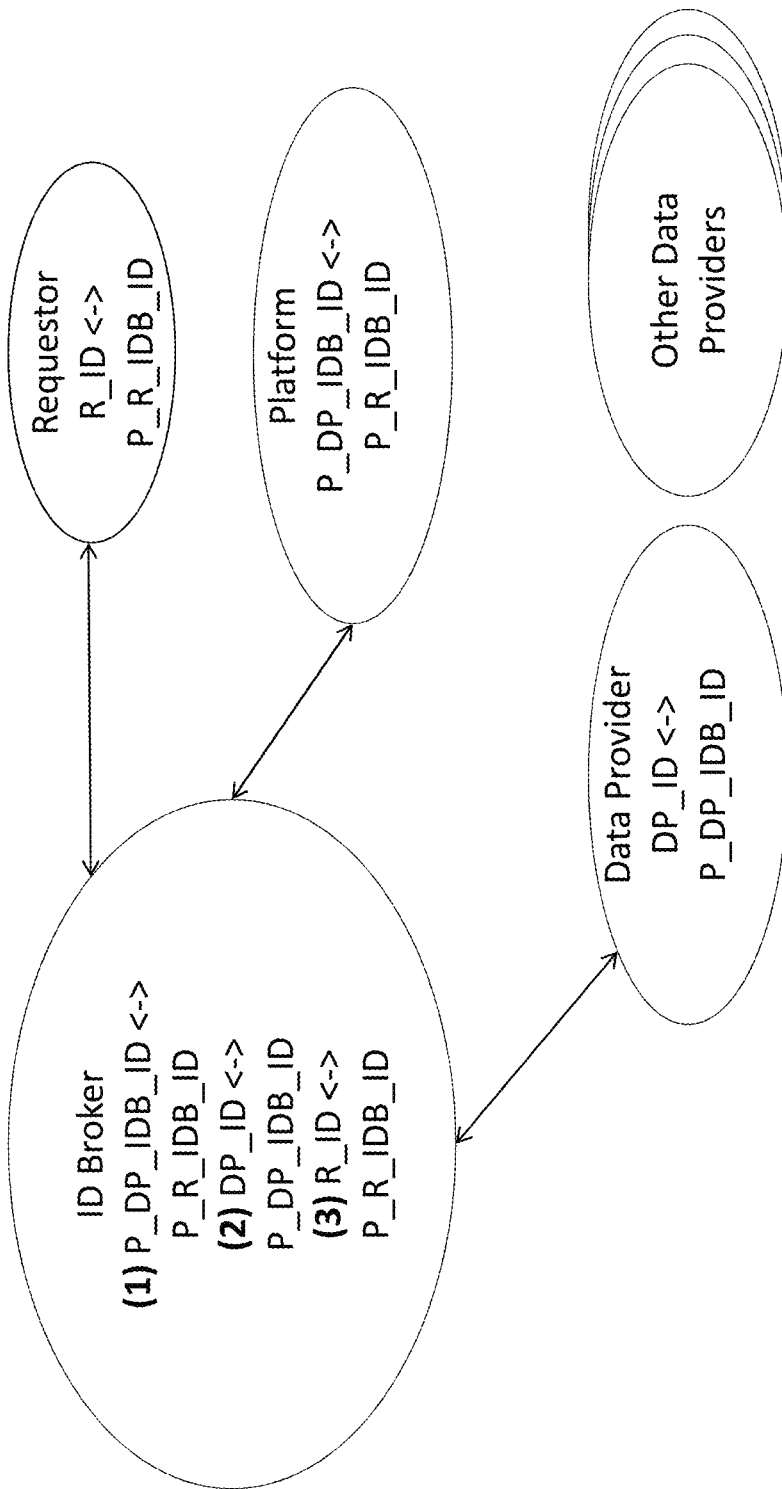
FIG. 20 is a mapping of the entity architecture which shows the communication paths among entities of the present invention and the key pair(s) held by each of the entities, the entities including the platform, a data provider, an identity broker (ID Broker), and a requestor.

FIG. 20 is a mapping of the entity architecture which shows the communication paths among entities of the present invention and examples of key pair(s) which are held by each of the entities in one embodiment. In one use case, the ID Broker is an established credit bureau, the data provider is a bank, the requestor is an advertiser, and the platform is Commerce Signals. No party in this diagram holds more than one type of key pair related to the data exchange (besides the ID Broker) in order to preserve privacy and to prevent holders of internally held object identifiers from reverse engineering into internally held object identifiers held by others. Notably, the ID Broker provides approval for the use and ownership of the anonymized object identifiers, preferably through one or more licenses. Preferably the use of the anonymized object identifiers is an aggregate measurement.

The following steps describe key pair creation in one embodiment of the present invention. A requestor formulates a request for a multiplicity of anonymized object identifiers for a multiplicity of objects and sends the request to the ID Broker. The objects are preferably objects exposed to one or more advertisements and are identified by the requestor using internally held object identifiers such as an email address. The ID Broker sends the multiplicity of anonymized object identifiers and the multiplicity of internally held object identifiers associated with the multiplicity of anonymized object identifiers to the requestor. The anonymized object identifiers and internally held object identifiers are sent as key value pairs to the requestor. The data provider, which will provide a report based on the request, also receives a key pair from the ID Broker in which the multiplicity of destination format anonymized object identifiers is mapped to a multiplicity of internally held object identifiers held by the data provider. In one embodiment, an internally held object identifier held by the data provider is a PAN, which is preferably hashed. Upon the ID Broker creating the anonymized object identifiers and the platform receiving the permission of the requestor and the data provider to receive the anonymized object identifiers, the ID Broker sends the translation key pairs which are comprised of destination format anonymized object identifiers and source format anonymized object identifiers to the platform.

In one embodiment, a method of requesting and receiving aggregate purchase data according to the entity and key pair architecture in FIG. 20 includes the following general steps. A requestor formulates a request for aggregate purchase data for a multiplicity of objects and sends the request to the platform. This permission includes a specific use and a specific destination for the multiplicity of anonymized object identifiers. Importantly, the internally held object identifiers held by the data provider and the internally held object identifiers held by the requestor is not sent to the platform to preserve the privacy and anonymity of the objects. The platform obtains permission, or has already obtained and stored permission, of the ID Broker to perform object identifier translation for a specific use to convert the multiplicity of anonymized object identifiers from the current source format (i.e. requestor format) to a destination format (i.e. data provider format). The platform sends the multiplicity of destination format anonymized object identifiers to the data provider along with other requested criteria including a time period of interest and a requestor identity. The data provider also receives the requestor's permission for the specific use of the anonymized object identifiers through the platform. Upon receiving the destination format anonymized object identifiers, the permission, the time period of interest, and the requestor identity, the data provider sends a report of an aggregate measurement of payment activity for the group of anonymized object identifiers in the destination format of the anonymized object identifiers. The report does not include the anonymized object identifiers or any indication of the basis of the request. In one embodiment, the report only includes aggregate data and analytics based on the aggregate data (such as a total spend amount, a number of total transactions for that spend amount, and a standard deviation for the spend amount). This advantageously prevents any party other than the requestor from deriving any meaningful information from the report. The platform then sends the report to the requestor.

Preferably, the request and receipt of the report are performed through a user interface on a web browser. Metadata relating to the transaction including source, destination, time period, price, number of objects aggregated, etc. is preferably retained by the platform after completion of the transaction. In one embodiment, the platform performs the above steps using RESTful API calls with OAuth2 for API authentication and authorization, with data encryption via SSl. SFTP authentication using user IDs, passwords, and public/private keys are also utilized in one embodiment. Dedicated JMS queues with full access controls are also implemented by the platform in one embodiment. Preferably, all parties involved in a transaction are PCI-DSS compliant.

Thus, the following key pairs are created in the above example:

Anonymized object identifier in a requestor format (P_R_IDBR_ID) and internally held object identifier held by the requestor (R_ID). This key pair is held by the ID Broker and the requestor. The key pair held by the ID Broker is the property of the ID Broker and the key pair held by the requestor is the property of the requestor.

Anonymized object identifier in a data provider format (P_DP_IDBR_ID) and anonymized object identifier in a requestor format (P_R_IDBR_ID). This key pair is the "translation" key pair and is held by the ID Broker and the platform for the counterparties (i.e. the data provider and the requestor). The translation key pair held by the ID Broker is the property of the ID Broker and the translation key pair held by the platform is the property of the platform.

Anonymized object identifier in a destination format (P_DP_IDBR_ID) and internally held object identifier held by the data provider (DP_ID). This key pair is held by the ID Broker and the data provider. The key pair held by the ID Broker is the property of the ID Broker and the key pair held by the data provider is the property of the data provider.

This key pair arrangement ensures that each anonymized object identifier is held by no more than three parties. Specifically, P_DP_IDBR_ID is held by the ID Broker, the platform, and the data provider and P_R_IDBR_ID is held by the ID Broker, the platform, and the requestor.

Figure 21:
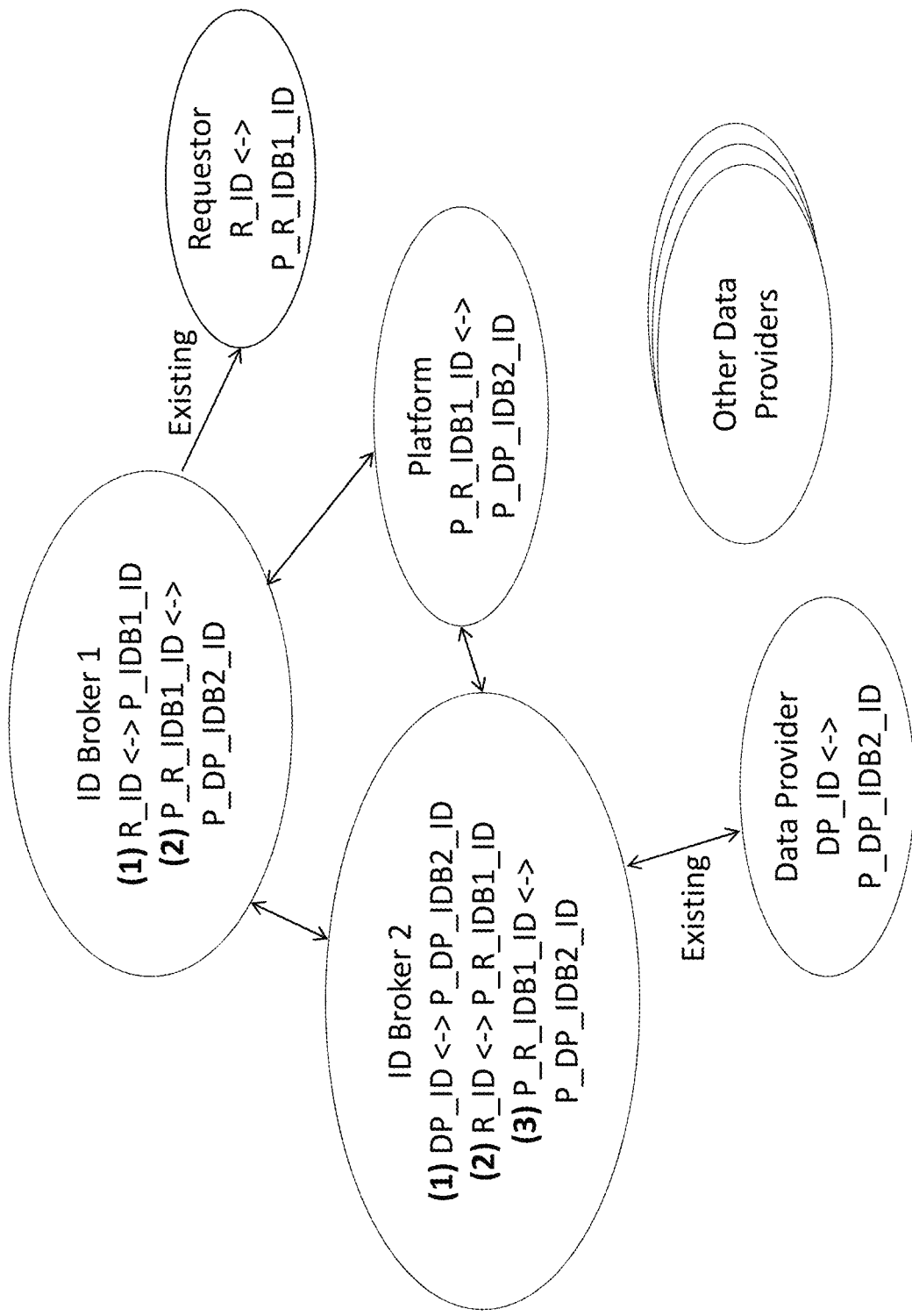
FIG. 21 is a mapping of the entity architecture which shows the communication paths among entities of the present invention and the key pair(s) held by each of the entities, the entities including the platform, a data provider, two ID Brokers, and a requestor.

FIG. 21 is a mapping of the entity architecture which shows the communication paths among entities of the present invention and the key pair(s) held by each of the entities. In one use case, ID Broker 1 is an entity with an inventory of digital identifiers, ID Broker 2 is an established credit bureau, the data provider is a bank, the requestor is a digital publisher, and the platform is Commerce Signals. As in the mapping of the key pairs in FIG. 20, the initial mapping of the key pairs is completed by an ID Broker. ID Broker 1 has the capability to match against data it holds and data it has associated with consumers through marketing data and a separate firewalled view with Banking and/or Credit Bureau data. ID Broker 1 preferably receives the approval for the use and ownership of the anonymized object identifiers, preferably through one or more licenses. This approval for use of the anonymized object identifiers is given by the requestor. Approval of the use of the anonymized object identifiers is also required from ID Broker 2. The approval for use and ownership is preferably given through separate agreements between and among the platform, ID Broker 1, and ID Broker 2 for specific, predefined uses of the data. ID Broker 1 manages the relationship with the data provider and ID Broker 2 manages the relationship with the requestor. No party in this diagram holds more than one key pair (besides an ID Broker) in order to preserve privacy and to prevent holders of internally held object identifiers from reverse engineering into internally held object identifiers held by others. Notably, ID Broker 2 and ID Broker 1 provide approval for the use and ownership of the anonymized object identifiers, preferably through one or more licenses. Preferably the use of the anonymized object identifiers is an aggregate measurement.

The following steps describe key pair creation in one embodiment of the present invention. A requestor formulates a request for a multiplicity of anonymized object identifiers for a multiplicity of objects and sends the request to ID Broker 1. ID Broker 1 also receives approval for the use and ownership of the anonymized object identifiers, preferably through one or more licenses. The approval for use and ownership is preferably given through separate agreements between and among the platform, ID Broker 1, and ID Broker 2 for specific, predefined uses of the data. ID Broker 1 manages the relationship with the requestor. The objects are preferably objects exposed to one or more advertisements and are identified by the requestor using an internally held object identifier such as an email address. Each internally held object identifier, which in one embodiment is an email address, preferably corresponds to advertising exposure data. In this case, the advertising exposure data is the property of the digital publisher. In one embodiment, the exposure files which include the email addresses and/or exposure data are made available to an identity broker via a direct feed from a publisher, through a publisher DMP (Data Management Platform), or through an exchange or RTB (real-time bidding) feed. In one embodiment, the exposure files relate to a specific time frame, such as from the launch of a specific advertising campaign through the end of said campaign or for a particular season, month, week, day, etc. In another embodiment, the multiplicity of objects is selected according to an object status, such as subscriber status (premium subscriber, normal subscriber, trial user), use status such as frequent user or infrequent user (defined by a certain number of visits to a site of the requestor within a certain time, such as within a month, week, day, etc.). ID Broker 1 sends the multiplicity of anonymized object identifiers and the multiplicity of internally held object identifiers associated with the multiplicity of anonymized object identifiers to the requestor. The anonymized object identifiers and internally held object identifiers are sent as key value pairs to the requestor. Upon ID Broker 1 creating the anonymized object identifiers and the platform receiving the permission of the requestor to receive the anonymized object identifiers, ID Broker 1 sends the multiplicity of anonymized object identifiers to the platform. The data provider to which the request is addressed receives a key pair from ID Broker 2 in which the multiplicity of destination format anonymized object identifiers is mapped to a multiplicity of internally held object identifiers held by the data provider. ID Broker 2 manages the relationship with the data provider. In one embodiment, the internally held object identifier held by the data provider is a PAN, which is preferably hashed. Upon the ID Broker(s) creating the anonymized object identifiers and the platform receiving the permission of the requestor and the data provider to receive the anonymized object identifiers, the ID Broker(s) send the translation key pairs which are comprised of destination format anonymized object identifiers and source format anonymized object identifiers to the platform.

Thus, the above example provides the following key pairs:

Anonymized object identifier in a requestor format (P_R_IDBR1_ID) and internally held object identifier held by the requestor (R_ID). This key pair is held by ID Broker 1, ID Broker 2, and the requestor. The key pair held by ID Broker 1 is the property of ID Broker 1, the key pair held by ID Broker 2 is the property of ID Broker 2, and the key pair held by the requestor is the property of the requestor.

Anonymized object identifier in a data provider format (P_DP_IDBR2_ID) and anonymized object identifier in a requestor format (P_R_IDBR1_ID). This key pair is the "translation" key pair and is held by ID Broker 3, ID Broker 2, and the platform for the counterparties (i.e. the data provider and the requestor). The translation key pair held by ID Broker 1 is the property of ID Broker 1, the translation key pair held by ID Broker 2 is the property of ID Broker 2, and the translation key pair held by the platform is the property of the platform.

Anonymized object identifier in a data provider format (P_DP_IDBR2_ID) and internally held object identifier held by the data provider (DP_ID). This key pair is held by ID Broker 2 and the data provider. The key pair held by ID Broker 2 is the property of ID Broker 2 and the key pair held by the data provider is the property of the data provider.

This key pair arrangement provides key pairs to the relevant parties to enable a transaction as illustrated in FIG. 22. The key pair arrangement also ensures that each anonymized object identifier is held by no more than three parties. Specifically, P_DP_IDBR2_ID is held by the ID Brokers, the platform, and the data provider and P_R_IDBR1_ID is held by the ID Brokers, the platform, and the requestor.

FIG. 22 is a mapping of the entity architecture which shows the operational data flows among entities of the present invention and the key pair(s) held by each of the entities after the initial mapping described in relation to FIG. 21. In one use case, ID Broker 1 is an entity with an inventory of digital identifiers, ID Broker 2 is an established credit bureau, the data provider is a bank, the requestor is a digital publisher, the merchant that advertises through the requestor is a retailer, and the platform is Commerce Signals. In this case, the exposure data which corresponds to the anonymized object identifiers is the exclusive property of the merchant. The present invention enables a merchant that advertises through the requestor to request information relating to the effectiveness of advertising.

In one embodiment, a method of requesting and receiving aggregate purchase data according to the entity architecture in FIG. 22 includes the following general steps.

2200: A requestor, which in this embodiment is a publisher of advertisements from a merchant, obtains permission from the merchant to obtain exposure data for a multiplicity of objects. The objects are preferably objects exposed to one or more merchant advertisements through the requestor and are identified by the requestor using an internally held object identifier such as an email address. Preferably, the exposure data includes exposure files grouped by merchant type, campaign name, advertiser, etc. ID Broker 1 obtains permission of the publisher to share exposure data in the form of anonymized object identifiers with the platform for one or more specific uses. ID Broker 1 then receives exposure files from the publisher and creates anonymized object identifiers for the exposure files. ID Broker 1 sends the anonymized object identifiers for the exposure files to the platform.

2202: The requestor formulates a request for aggregate purchase data for the multiplicity of objects and sends the request along with the multiplicity of requestor anonymized object identifiers which are obtained associated with the multiplicity of objects to the platform. The platform also receives or has stored permissions from the requestor and the merchant for sharing the data with ID Broker 1. The permissions include a specific use and a specific destination for the multiplicity of anonymized object identifiers. Importantly, the internally held object identifier of the objects is not sent to the platform to preserve the privacy and anonymity of the objects. Upon receiving the multiplicity of anonymized object identifiers, the platform translates the multiplicity of anonymized object identifiers from the current source format (i.e. requestor format) to a destination format (i.e. data provider format).

2204: The platform obtains or has obtained the data provider's permission to provide an aggregate measurement report to the merchant and their agents (including their publishers and the requestor). The merchant's permission to answer a specific aggregate measurement question, which was sent to the platform by the requestor, as well as the requestor's permission to answer the specific aggregate measurement question, are provided to the data provider. The platform sends the multiplicity of anonymized object identifiers in the destination format to the data provider along with other requested criteria including at least a time period of interest and a requestor identity. Upon receiving the multiplicity of anonymized object identifiers in the destination format, the permissions, the time period of interest, and the requestor identity, the data provider sends a report of an aggregate measurement of payment activity for the group of anonymized object identifiers to the platform. The report does not include the anonymized object identifiers or any indication of the basis of the request. In one embodiment, the report only includes aggregate data and analytics based on the aggregate data (such as a total spend amount, a number of total transactions for that spend amount, and a standard deviation for the spend amount). This advantageously prevents any party other than the requestor from deriving any meaningful information from the report. The platform then sends the report to the requestor, which sends the report to the merchant.

When considered together, the combination of features which make up the key pair platform and object identifier translation systems and methods of the present invention are not well-understood, routine, or conventional in the field of invention. In one embodiment, the field of invention is the technical field of advertising. Notably, the key pair platform provides for the use of a key pair of anonymized object identifiers which are anonymized such that underlying data, including personally identifiable information, is not disclosed by the key pair of anonymized object identifiers. This is a concept that is not known, used, or conventional in the prior art of any field. By using a key pair of anonymized object identifiers, the combination of the features of the present invention operates in a nonconventional and nongeneric way to ensure that the personally identifying information of consumers is securely held only the owner of the personally identifying information and an identity broker. The personally identifying information includes virtual identifying information and non-virtual identifying information. This prevents the personally identifying information from being disclosed to other parties in the transaction, including the platform and the recipient of the anonymized object identifiers which correspond to the personally identifying information. The use of the platform technology ensures that the identity of the consumer is protected and the personally identifiable information is not disclosed. Thus, the platform provides for more secure exchange of data than is conventionally provided in the prior art. To the extent that any generic computer components are utilized in the present invention, the present invention does not utilize the generic computer components in the same way as the prior art. Additionally, any computer automation used in the present invention does not involve merely automating what were previously manual processes. Instead, the present invention provides a novel and nonobvious solution to the problems of maintaining consumer privacy and maintaining the value of data by not disclosing the data using the technology-based solution of the key value pair platform and object identifier translation. The present invention also provides for an improvement in the technology of exchanging data over the Internet. The prior art required for personally identifiable information to be disclosed to parties from which data was requested. The present invention overcomes these disadvantages by using the key pair platform and object identifier translation.

The present invention represents specific asserted improvements in computer technology, namely data security and privacy. The present invention does not accomplish this by simply adding conventional computer components to well-known business practices. Rather, the present invention involves specific implementations of solutions to prior art problems in the software arts. Specifically, the present invention provides improvements over encryption technology by providing a higher level of security than is possible with existing encryption methods.

Certain modifications and improvements will occur to those skilled in the art upon a reading of the foregoing description. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

What is claimed is:

1. A method for facilitating secure electronic exchange of anonymized data via a key pair platform comprising:
    a virtual key value pair platform server computer receiving a request over a network for a report for a set of objects, wherein the request includes a source set of anonymized object identifiers, at least one permission file, and at least one destination;
    the virtual key pair platform server computer performing object identifier translation on the source set of anonymized object identifiers to convert the source set of anonymized object identifiers to a destination set of anonymized object identifiers; and
    based upon the destination set of anonymized object identifiers, the key pair platform receiving the report for the set of objects;
    wherein the report includes a result and does not include any personally identifiable information;
    wherein each anonymized object identifier in the source set of anonymized object identifiers is mapped to an internally held object identifier in a source set of virtual internally held object identifiers;
    wherein each anonymized object identifier in the destination set of anonymized object identifiers is mapped to an internally held object identifier in a destination set of virtual internally held object identifiers; and
    wherein the virtual key pair platform does not receive any source virtual internally held object identifiers, any destination virtual internally held object identifiers, raw data, or underlying data for any object.

2. The method of claim 1, further comprising:
    the virtual key pair platform server computer sending the destination set of anonymized object identifiers to the at least one destination computer;
    upon receiving the report based on the destination set of anonymized object identifiers from the at least one destination computer, the virtual key pair platform server computer sending the report to the at least one source computer connected to the virtual key pair platform over the network, wherein the report does not disclose any virtual internally held object identifiers, raw data, or underlying data relating to the set of objects and protects anonymity of the set of objects.

3. The method of claim 1, wherein the source set of anonymized object identifiers and the destination set of anonymized object identifiers are not encrypted, wherein no private key or public key is associated with the source set of anonymized object identifiers or the destination set of anonymized object identifiers, and wherein underlying data associated with the source set of anonymized object identifiers and the destination set of anonymized object identifiers cannot be derived through the source set of anonymized object identifiers or the destination set of anonymized object identifiers.

4. The method of claim 1, wherein both the source set of anonymized object identifiers and the destination set of anonymized identifiers are only disclosed to a maximum of three parties.

5. The method of claim 1, wherein the source set of anonymized object identifiers is constructed at a first identity broker computer and the destination set of anonymized object identifiers is constructed at a second identity broker computer.

6. The method of claim 1, wherein the virtual key pair platform server computer performs the object identifier translation using a key pair table, where the virtual key pair platform server computer maintains a separate key pair table for each source set of anonymized object identifiers and each destination set of anonymized object identifiers.

7. The method of claim 1, wherein the virtual key pair platform server performs the object identifier translation after receiving the at least one permission file over a network authorizing the object identifier translation, and wherein the at least one permission file includes a permission file from the at least one source computer, a permission file from the at least one destination computer, and a permission file from at least one identity broker computer.

8. The method of claim 1, wherein virtual internally held object identifiers comprise Primary Account Numbers (PANs), physical addresses, and email addresses.

9. The method of claim 1, wherein each virtual internally held object identifier is associated with the raw data or underlying data for a corresponding object, and wherein the raw data or underlying data comprises an on-line purchase history, an off-line purchase history, an advertisement exposure history, and/or a web browsing history.

10. The method of claim 1, wherein the virtual key pair platform includes checkpoints which verify a format of the anonymized object identifiers and other information sent with the anonymized object identifiers at predetermined steps in a transaction.

* * * * *